US012048857B2

(12) United States Patent
LaVergne et al.

(10) Patent No.: US 12,048,857 B2

(45) Date of Patent: Jul. 30, 2024

(54) METHOD FOR ADDITION OF FIRE SUPPRESSION ADDITIVE TO BASE FOAM SOLUTIONS

(71) Applicant: Tyco Fire Products LP, Lansdale, PA (US)

(72) Inventors: Eric LaVergne, Port Arthur, TX (US); John D. Morrison, Porterfield, WI (US); John P. Libal, Peshtigo, WI (US); Brent Gaspard, Port Arthur, TX (US); Adam Staszak, Marinette, WI (US)

(73) Assignee: Tyco Fire Products LP, Cranston, RI (US)

(*) Notice: Subject to any disclaimer, the term of this patent is extended or adjusted under 35 U.S.C. 154(b) by 814 days.

(21) Appl. No.: 17/089,365

(22) Filed: Nov. 4, 2020

(65) Prior Publication Data

US 2021/0046347 A1 Feb. 18, 2021

Related U.S. Application Data

(63) Continuation of application No. PCT/IB2020/050093, filed on Jan. 7, 2020, which is a continuation of application No. 16/410,638, filed on May 13, 2019, now Pat. No. 11,065,490.

(60) Provisional application No. 62/845,509, filed on May 9, 2019, provisional application No. 62/816,618, filed on Mar. 11, 2019, provisional application No. 62/789,792, filed on Jan. 8, 2019.

(51) Int. Cl.

| | |
|---|---|
| ***A62D 1/02*** | (2006.01) |
| ***A62C 5/02*** | (2006.01) |
| ***A62C 31/12*** | (2006.01) |

(52) U.S. Cl.

CPC .............. *A62D 1/0085* (2013.01); *A62C 5/02* (2013.01); *A62C 31/12* (2013.01)

(58) Field of Classification Search

CPC .................................................... A62D 1/0085

See application file for complete search history.

(56) References Cited

U.S. PATENT DOCUMENTS

| | | | |
|---|---|---|---|
| 5,174,383 | A | 12/1992 | Haugen et al. |
| 6,231,778 | B1 | 5/2001 | Hansen |
| 6,725,940 | B1 | 4/2004 | Klein et al. |
| 7,384,183 | B2 | 6/2008 | Smith |
| 7,758,315 | B2 | 7/2010 | Moskun |

(Continued)

FOREIGN PATENT DOCUMENTS

| | | |
|---|---|---|
| WO | WO-2017/161156 A1 | 9/2017 |
| WO | WO-2017/161162 A1 | 9/2017 |

(Continued)

OTHER PUBLICATIONS

International Search Report and Written Opinion for International Application No. PCT/IB2020/050093, mail date Apr. 23, 2020, 10 pages.

*Primary Examiner* — Peter F Godenschwager

(74) *Attorney, Agent, or Firm* — Foley & Lardner LLP

(57) ABSTRACT

A method of proportioning a finished foam at or near a hazard comprising proportioning and delivering a first finished foam to the hazard, determining if the first finished foam extinguishes or suppresses the hazard, if not, selecting an amount of a fluorinated additive, and proportioning a foam solution including the selected amount of the fluorinated additive to form a fluorinated finished foam. A foam injection system is also disclosed.

15 Claims, 16 Drawing Sheets

(56) References Cited

U.S. PATENT DOCUMENTS

| | | | |
|---|---|---|---|
| 8,065,110 | B2 | 11/2011 | Golinveaux et al. |
| 8,298,436 | B2 | 10/2012 | Michael |
| 8,307,907 | B2 | 11/2012 | Laskaris et al. |
| 8,524,104 | B1 | 9/2013 | Michael |
| 9,427,609 | B2 | 8/2016 | Springell et al. |
| 9,597,646 | B2 | 3/2017 | Springell et al. |
| 9,669,246 | B2 | 6/2017 | Bowen et al. |
| 9,956,447 | B2 | 5/2018 | Martin et al. |
| 9,956,448 | B2 | 5/2018 | Martin |
| 10,046,191 | B1 | 8/2018 | Hernandez et al. |
| 10,166,419 | B2 | 1/2019 | Springell et al. |
| 10,173,089 | B2 | 1/2019 | Xie |
| 2006/0097217 | A1 | 5/2006 | Clark |
| 2009/0095492 | A1 | 4/2009 | Waters et al. |
| 2011/0240309 | A1 | 10/2011 | Kingma et al. |
| 2016/0023032 | A1 | 1/2016 | Bowen |
| 2016/0030790 | A1 | 2/2016 | Libal et al. |
| 2016/0038778 | A1 | 2/2016 | Siem |
| 2016/0038779 | A1 | 2/2016 | Bowen et al. |
| 2017/0182341 | A1 | 6/2017 | Libal |

FOREIGN PATENT DOCUMENTS

| | | | |
|---|---|---|---|
| WO | WO-2018/022763 | A1 | 2/2018 |
| WO | WO-2018/157770 | A1 | 9/2018 |

METHOD FOR ADDITION OF FIRE SUPPRESSION ADDITIVE TO BASE FOAM SOLUTIONS

CROSS-REFERENCE TO RELATED APPLICATIONS

This application is a continuation of International Application No. PCT/IB2020/050093, filed Jan. 7, 2020, which claims benefit of and priority to U.S. patent application Ser. No. 16/410,638 entitled "Method for Addition of Fire Suppression Additive to Base Foam Solutions," filed on May 13, 2019, U.S. Provisional Patent Application Ser. No. 62/845,509 entitled "Single Point Foam Injection Systems and Methods," filed on May 9, 2019, U.S. Provisional Patent Application Ser. No. 62/816,618 entitled "Method for Addition of Fire Suppression Additive to Base Foam Solutions," filed on Mar. 11, 2019 and U.S. Provisional Patent Application Ser. No. 62/789,792 entitled "Method for Addition of Fluorine Additive to Base Foam Concentrations and/or Foam Solutions," filed on Jan. 8, 2019; the entire contents of which are hereby incorporated by reference, for any and all purposes.

BACKGROUND

The present disclosure relates generally to firefighting foams. More specifically, the present disclosure relates a method for addition of a fire suppression additive to a base foam concentrate and/or foam solutions to deliver a finished foam on a hazard, such as a flammable liquid or vapor fire and/or preventative vapor suppression.

Traditionally, firefighting foam products contain a fluorinated additive such as a perfluorinated surfactant. These perfluorinated surfactants are manufactured by two distinct processes: electrochemical fluorination (ECF) and telomerization. Electrochemical fluorination is the addition of fluorine to a hydrocarbon using hydrofluoric acid (HF). The ECF process produces branched fluorocarbon chains that can be even and odd numbered. Telomerization is the process of polymerizing perfluoroethylene and produces only straight chain and even numbered perfluorinated carbon molecules.

Aqueous Film-Forming Foam Concentrates (AFFF) and Alcohol Resistant Aqueous Film-Forming Foam Concentrates (AR-AFFF) products historically manufactured by the 3M Company were the primary source of firefighting foam products containing ECF produced perfluorinated surfactants. ECF perfluorinated surfactants break down into perflurooctane sulfonate (PFOS). PFOS is considered to be persistent, bioaccumulative, and toxic (PBT) and was designated as a Persistent Organic Pollutant (POP) at the 2001 Stockholm Convention.

In 2002, the 3M Company voluntarily phased out and ceased production of the ECF produced perfluorinated compounds. While PFOS chemistry is still used in some developing economies (most notably China), it is generally banned from production and use in economically developed regions.

Since 2002, virtually all perfluorinated surfactants contained in firefighting foam products have been produced exclusively by the telomerization process. Over the years, these perfluorinated surfactants have contained perfluorinated carbon chains ranging from C4 to C24 in length. The US Environmental Protection Agency (EPA) has indicated that some of the higher homologues can break down in the environment to produce perfluoroctanoic acid (PFOA) or other perfluorocarboxylic acids (PFCAs).

Consequently, the U.S. EPA's 2010/2015 PFOA Stewardship Program focused on reducing these longer chain (i.e., C8 or longer) perfluorinated chemicals and PFOA emissions, since existing data shows that shorter chain compounds (i.e., C6) have a lower potential for toxicity and bioaccumulation.

Further, other countries and member state unions such as European Chemicals Agency (ECHA) are issuing guidance and considering regulations similar to the U.S. EPA's 2010/15 PFOA Stewardship Program in an effort to limit PFOA and PFCAs.

Most of these initiatives do not ban or restrict the use of the shorter chain telomere-based foams (i.e., C6), and generally do not restrict the near-term use of existing inventories of the longer chain telomere-based foam concentrates (i.e., C8 or longer).

The last ~5 years, however, have seen an emphasis on environmental impacts of products containing or breaking down into PFOS/PFOA/PFAS and now PFHS. This has led to the rise of Fluorine Free Foams (F3), which are touted as a potential replacement for firefighting fluorinated foams.

The testing of the F3 foams has shown—and real-world aviation and bulk storage fire responses directly indicate—significant weaknesses and even failures of the F3 foams in flammable liquid fire response.

The properties of firefighting foam products may vary depending on the properties of the hazard. Traditionally, the properties of firefighting foams cannot be chemically altered on-the-fly in the field at or near the hazard without stopping to connect a different base foam concentrate. In the field, the properties of firefighting foams are generally altered by either changing the ratio of the base foam concentrate to water or mechanically adjusting a foam proportioning system to change the ratio.

SUMMARY

The present application provides a method of forming a fire fighting foam, which can allow the foam to be modified during the course of fighting a fire. For example, the method may include (a) foaming a first foam solution stream to provide a first finished foam, (b) modifying the first foam solution stream to include an additional fire suppression additive to form a modified foam solution stream; and (c) foaming the modified foam solution stream to form a second finished foam. The first foam solution stream comprises a base foam concentrate and a dilution water stream and the additional fire suppression additive may be a polysaccharide-based foam concentrate or a fluorinated additive. In some instances, the modified foam solution stream may be substantially free of fluorine-containing additive. In some instances, the modified foam solution stream may be substantially free of any additive, which contains a perfluoroalkyl group.

One embodiment provides a method of forming a fire fighting foam comprising: (a) adding a base foam concentrate and fire suppression additive to a dilution water stream to provide a foam solution stream; and (b) foaming the foam solution stream to form a finished foam. In an embodiment, the base foam concentrate and fire suppression additive are added sequentially to the dilution water stream. In an embodiment, the base foam concentrate and fire suppression additive are added simultaneously to the dilution water stream.

Another embodiment provides a method for addition of fluorine (e.g., perfluorinated surfactants) and other fire suppression additive (e.g., polysaccharide-based foam additive)

to a non-fluorinated base foam concentrate and/or a foam solution at or near a hazard, such as a flammable liquid or vapor fire and/or preventative vapor suppression. Such a method may enhance the safety of non-fluorinated foams (e.g., F3 foams) and low performing fluorinated foams in flammable liquid fire response. In an embodiment, the polysaccharide-based foam concentrate comprises: (a) a suspension system comprising water and at least one suspension agent; (b) a first polysaccharide that is soluble in the suspension system; and (c) a second polysaccharide that is insoluble in the suspension system but soluble in water alone. In an embodiment, the at least one suspension agent comprises a glycol, a glycol ether, a polyethylene glycol, or a combination thereof; the first polysaccharide comprises xanthan gum; and the second polysaccharide comprises guar gum, konjac gum, tara gum, methylcellulose, or a combination thereof.

In an embodiment, the modified foam solution stream is substantially free of any additive, which contains a perfluoroalkyl group. In an embodiment, the modified foam solution stream is free of any additive, which contains a perfluoroalkyl group.

In an embodiment, the fire suppression additive is a fluorine additive. In an embodiment, the fluorinated additive comprises a poly-perfluoroalkylated polyacrylamide type fluorosurfactant and/or a $C_6$-short chain perfluoro-based fluoropolymer surfactant. In an embodiment, the fluorinated additive comprises a $C_6$-fluorotelomer-based nonionic fluorosurfactant, an alkyl sodium sulfonate type anionic fluorosurfactant, a fluoroalkyl ammonium chloride type cationic fluorosurfactant, a fluorotelomer sulfonamide alkylbetaine fluorosurfactant or a combination thereof.

At least one embodiment relates to a method of proportioning a finished foam (e.g., a non-fluorinated finished foam or a low performing fluorinated finished foam) at or near a hazard comprises: (a) proportioning and delivering the finished foam to the hazard; (b) determining if the finished foam extinguishes or suppresses the hazard; (c) if not, selecting an amount of a fluorinated additive; and (d) proportioning a fluorinated finished solution with the amount of the fluorinated additive to form a fluorinated finished foam with the amount of the fluorinated additive. In an embodiment, the method further comprises: (e) delivering the fluorinated finished foam with the amount of the fluorinated additive to the hazard.

In an embodiment, step (d) comprises: (d-1) weighing a fluorine additive container to obtain an initial weight or determining an initial pressure of the fluorine additive container; (d-2) proportioning a fluorinated foam solution with the amount of fluorine additive to form a fluorinated finished foam with the amount of fluorine additive; (d-3) weighing the fluorine additive container to obtain a final weight or determining a final pressure of the fluorine additive container; and (d-4) using the final weight and the initial weight or the initial pressure and the final pressure to determine a total amount of fluorine additive.

In an embodiment, the method further comprises: (g) determining if the fluorinated finished foam with the amount of the fluorinated additive extinguishes or suppresses the hazard; (h) if not, selecting an increased amount of the fluorinated additive based on the type of hazard; and (i) proportioning a fluorinated foam solution with the increased amount of the fluorinated additive to form a fluorinated finished foam with the increased amount of the fluorinated additive. In an embodiment, the method further comprises: (j) delivering the fluorinated finished foam with the increased amount of the fluorinated additive to the hazard.

Another embodiment relates to a method of proportioning a finished foam comprising: (a) mixing a base foam concentrate and water in a foam proportioning system at or near a hazard to form a foam solution: (b) mixing the foam solution and air through a nozzle fluidly connected to an outlet of the foam proportioning system to form a first finished foam; (c) delivering the first finished foam to the hazard; (d) determining if the first finished foam extinguishes or suppresses the hazard; (e) if not, designating a Class B hazard profile and selecting an amount of a fluorine additive based on the Class B hazard profile; (f) mixing the amount of the fluorine additive, the base foam concentrate and water in the foam proportioning system to form a fluorinated foam solution; and (g) mixing the fluorinated foam solution and air through the nozzle to form a fluorinated finished foam. In an embodiment, the method further comprises: (h) delivering the fluorinated finished foam to the hazard.

In an embodiment, step (d) comprises targeting the hazard using a non-fluorinated foam base foam concentrate and delivering a non-fluorinated finished foam to the hazard.

In an embodiment, step (d) comprises targeting the hazard using a non-fluorinated base foam concentrate and delivering a non-fluorinated finished foam to the hazard; and step (i) comprises delivering a fluorinated finished foam to the hazard without retargeting the hazard.

In an embodiment, the method further comprises: (h) determining if the fluorinated finished foam extinguishes or suppresses the hazard; (i) if not, selecting an increased amount of the fluorine additive; (j) mixing the fluorine additive, the non-fluorinated base foam concentrate and water in the foam proportioning system at or near a hazard to form a fluorinated foam solution; (k) mixing the non-fluorinated foam solution and air through the nozzle to form a fluorinated finished foam; and (l) delivering a fluorinated finished foam to the target.

In a slight variation of the embodiment, the method of proportioning a finished foam comprises: (a) providing a foam proportioning system; (b) mixing a base foam concentrate and water in the foam proportioning system at or near a hazard to form a foam solution; (c) mixing the foam solution and air through a nozzle fluidly connected to an outlet of the foam proportioning system to form a finished foam; (d) delivering the finished foam to the hazard; (e) determining if the finished foam extinguishes or suppresses the hazard; (f) if not, designating a Class B hazard profile and selecting an amount of a fluorinated additive based on the Class B hazard profile; (g) mixing the amount of the fluorinated additive, the base foam concentrate and water in the foam proportioning system to form a fluorinated foam solution; and (h) mixing the fluorinated foam solution and air through the nozzle to form a fluorinated finished foam. In an embodiment, the method further comprises: (i) delivering the fluorinated finished foam to the hazard.

In an embodiment, wherein step (d) comprises targeting the hazard using a non-fluorinated foam base foam concentrate and delivering a non-fluorinated finished foam to the hazard.

In an embodiment, wherein step (d) comprises targeting the hazard using a non-fluorinated base foam concentrate and delivering a non-fluorinated finished foam to the hazard; and step (i) comprises delivering a fluorinated finished foam to the hazard without retargeting the hazard.

In an embodiment, the method further comprises: (h) determining if the fluorinated finished foam extinguishes or suppresses the hazard; (i) if not, selecting an increased amount of the fluorinated additive; (j) mixing the fluorinated additive, the non-fluorinated base foam concentrate and water in the foam proportioning system at or near a hazard to form a fluorinated foam solution; and (k) mixing the non-fluorinated foam solution and air through the nozzle to form a fluorinated finished foam.

In an embodiment, the method further comprises: (l) delivering a fluorinated finished foam to the target.

In an embodiment, the base foam concentrate is a low performing fluorinated base foam concentrate.

In an embodiment, the base foam concentrate is a non-fluorinated base foam concentrate.

In an embodiment, a non-fluorinated base foam concentrate does not have any fluorinated additive or fluorine.

In an embodiment, a fluorinated additive has from about 0.5 wt. % to about 25 wt. % of fluorine, and any range or value there between. In an embodiment, the fluorinated additive has from about 5 wt. % to about 20 wt. % of fluorine. In an embodiment, the fluorinated additive has about 10 wt. % of fluorine.

In an embodiment, the fluorinated foam solution has from about 0.05 wt. % to about 10 wt. % of base foam concentrate plus fluorinated additive, and any range or value there between. In an embodiment, the fluorinated foam solution has from about 1 wt. % to about 6 wt. % of base foam concentrate plus fluorinated additive.

In an embodiment, the base foam concentrate plus fluorinated additive has from about 0.5 wt. % to about 35 wt. % of fluorinated additive, and any range or value there between. In an embodiment, the base foam concentrate plus fluorinated additive has from about 1 wt. % to about 30 wt. % of fluorinated additive.

In an embodiment, the base foam concentrate plus fluorinated additive has from about 0.01 wt. % to about 10 wt. % of fluorine, and any range or value there between. In an embodiment, the base foam concentrate plus fluorinated additive has from about 0.05 wt. % to about 6 wt. % of fluorine.

In an embodiment, a fluorinated finished foam has from about 0.0001 wt. % to about 0.5 wt. % fluorine, and any range or value there between. In an embodiment, the fluorinated finished foam has from about 0.0005 wt. % to about 0.36 wt. % fluorine, and any range or value there between.

In an embodiment, the amount of fluorinated additive added or injected into the foam solution is selected based on a minimum amount of the fluorinated additive required to achieve fuel shedding and film formation.

In an embodiment, the amount of fluorinated additive is selected based on a chemical volatility formula.

Yet another embodiment relates to a method of proportioning a finished foam comprising: (a) providing a portable, mobile, or fixed foam proportioning system; (b) using the portable, mobile, or fixed foam proportioning system to proportion a base foam concentrate with Type I, Type II, or Type III applications for delivering a non-fluorinated finished foam for the purposes of Class B hazard response operations; (c) delivering a non-fluorinated finished foam to a hazard; (d) if the non-fluorinated finished foam is ineffective in extinguishing or suppressing the hazard due to chemistry and volatility of the hazard, designate a Class B hazard profile; (e) selecting an amount of fluorinated additive to non-fluorinated base foam solution to enhance foam suppression and/or extinguishing performance based on the Class B hazard profile; (f) using the portable, mobile, or fixed foam proportioning system to proportion the base foam concentrate and the amount of fluorinated additive with Type I, Type II, or Type III applications for delivering a fluorinated finished foam for the purposes of Class B hazard response operations; and (g) delivering the fluorinated finished foam to the hazard.

In an embodiment, the Class B hazard includes hydrocarbons and polar solvents.

In an embodiment, a method of fighting a flammable liquid fire comprises foaming a first foam solution stream to provide a first finished foam, wherein the first foam solution stream comprises a base foam concentrate and a dilution water stream, delivering the first finished foam at or near the flammable liquid fire, and, if the first finished foam does not extinguish or suppress the flammable liquid fire, modifying the first foam solution stream to include a selected amount of a fluorinated additive to form a fluorinated foam solution stream, foaming the fluorinated foam solution stream to form a fluorinated finished foam, and delivering the fluorinated finished foam at or near the flammable liquid fire.

In an embodiment, a method of forming a fire fighting foam comprises foaming a first foam solution stream to provide a first finished foam, wherein the first foam solution stream comprises a base foam concentrate and a dilution water stream, modifying the first foam solution stream to include a fire suppression additive to form a modified foam solution stream, and foaming the modified foam solution stream to form a second finished foam.

In an embodiment, a method of forming a fire fighting foam comprises foaming a first foam solution stream to provide a first finished foam, wherein the first foam solution stream comprises a base foam concentrate and a dilution water stream and wherein the base foam concentrate is a fluorinated base foam concentrate or a non-fluorinated base foam concentrate, adding a dual polysaccharide foam concentrate to the first foam solution stream to form a modified foam solution stream, and foaming the modified foam solution stream to form a second finished foam.

In an embodiment, the dual polysaccharide foam concentrate comprises a suspension system, wherein the suspension system comprises water and at least one suspension agent, a first polysaccharide that is soluble in the suspension system, and a second polysaccharide that is insoluble in the suspension system but soluble in water alone.

In an embodiment, a dual polysaccharide foam concentrate, comprises a suspension system comprising water and at least one suspension agent, wherein the at least one suspension agent comprises a glycol, a glycol ether, a polyethylene glycol, and combinations thereof, a first polysaccharide that is soluble in the suspension system, wherein the suspension system comprises from about 0.3 wt. % to about 0.8 wt. % of the first polysaccharide, a second polysaccharide that is insoluble in the suspension system but soluble in water alone, wherein the suspension system comprises from about 3 wt. % to about 12 wt. % of the second polysaccharide, wherein the dual polysaccharide foam concentrate has a viscosity of 1000 cPs to 6000 cPs, and wherein the weight ratio of water to suspension agent is at least 2:8.

In an embodiment, the at least one suspension agent comprises diethylene glycol n-butyl ether, ethylene glycol, propylene glycol, polyethylene glycol, and combinations thereof. In an embodiment, the first polysaccharide comprises xanthan gum. In an embodiment, the second polysaccharide comprises guar gum, konjac gum, tara gum, methylcellulose, and combinations thereof.

Still yet another embodiment relates to a foam injection system comprising: a foam concentrate pump fluidly connected to a foam concentrate supply; a fluorinated additive pump fluidly connected to a fluorinated additive supply; a water source; and a flow controller comprising one or more processors and computer-readable instructions that when executed by the one or more processors, cause the one or more processors to: determine a water flow rate outputted by the water source; determine a foam concentrate flow rate outputted by the foam concentrate pump; identify a target ratio of water and foam concentrate; control the foam concentrate flow rate based on the water flow rate and the target ratio of water and foam concentrate; optionally, identify a target ratio of water and fluorinated additive; and control an optional fluorinated additive flow rate outputted by the fluorinated additive pump based on the water flow rate and the target ratio of water and fluorinated additive.

In an embodiment, the flow controller determines the foam concentrate flow rate based on one or more of a foam concentrate pump speed of the foam concentrate pump, a discharge pressure of the foam concentrate pump, a displacement of the foam pump, and a volumetric efficiency of the foam concentrate pump.

In an embodiment, the water source is a water pump; and the flow controller determines the second flow rate based on one or more of a water pump speed of the water pump, a differential pressure of the water pump, and a shaft input power of the water pump.

In an embodiment, the foam concentrate pump is a positive displacement pump. In an embodiment, the foam concentrate pump has a manual override input.

Still yet another embodiment relates to a non-transitory computer-readable medium comprising processor-executable instructions that when executed by one or more processors, cause the one or more processors to: determine a first flow rate of foam concentrate outputted by a foam concentrate pump; determine a second flow rate of water outputted by a water source; identify a target ratio of water and foam concentrate; and control the first flow rate based on the second flow rate and the target ratio.

In an embodiment, the non-transitory computer-readable medium comprises instructions that cause the one or more processors to: determine the first flow rate based on one or more of a foam concentrate pump speed of the foam concentrate pump, a discharge pressure of the foam concentrate pump, a displacement of the foam concentrate pump, and a volumetric efficiency of the foam concentrate pump.

In an embodiment, the non-transitory computer-readable medium of claim 25, comprising instructions that cause the one or more processors to: determine the second flow rate based on one or more of a water pump speed of the water pump, a differential pressure of the water pump, and a shaft input power of the water pump.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

These and other objects, features and advantages will become apparent as reference is made to the following detailed description, preferred embodiments, and examples, given for the purpose of disclosure, and taken in conjunction with the accompanying drawings and appended claims.

BRIEF DESCRIPTION OF THE FIGURES

For a further understanding of the nature and objects, reference should be made to the following detailed disclosure, taken in conjunction with the accompanying drawings, in which like parts are given like reference numerals, and wherein.

DETAILED DESCRIPTION

Figure 1A:
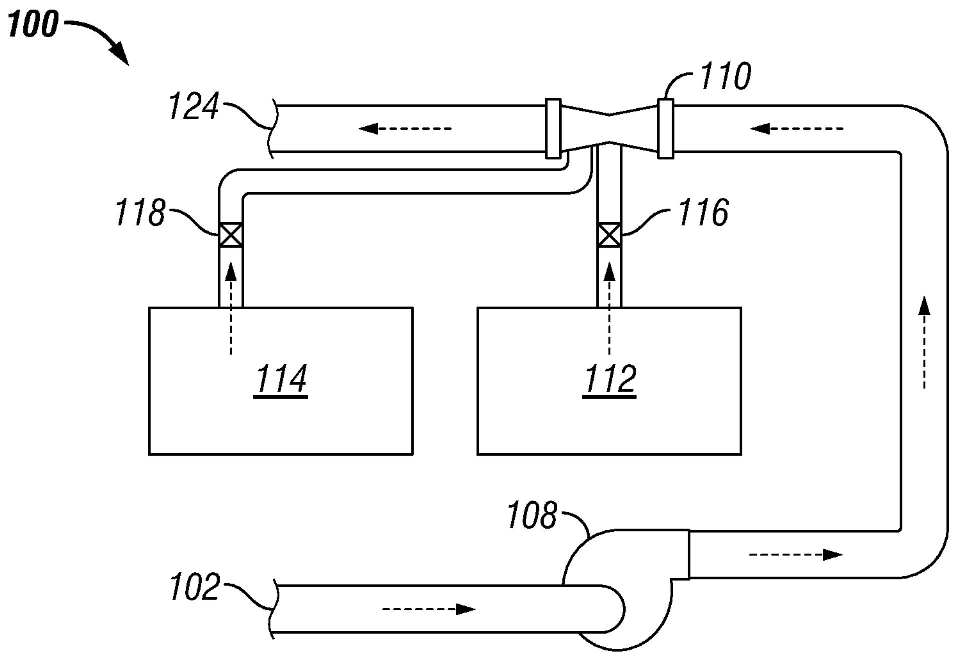
FIG. 1A is a schematic of an exemplary foam injection system according to an embodiment, showing a foam concentrate tank and a fluorinated additive tank.

The present application relates to a method for forming a modified fire fighting foam. The method can include (a)

foaming a first foam solution stream to provide a first finished foam, (b) modifying the first foam solution stream to include an additional fire suppression additive to form a modified foam solution stream; and (c) foaming the modified foam solution stream to form a second finished foam. The modified fire fighting foam may be used to suppress or extinguish a hazard, such as a flammable liquid or vapor fire, and/or for preventative vapor suppression. In some embodiments, the base foam concentrate may be a non-fluorinated base foam concentrate, such as a polysaccharide-based foam concentrate. In some embodiments, the additional fire suppression additive may be a fluorinated additive, such as a fluorinated base foam concentrate.

The present application provides a method for addition of a fluorinated additive to a base foam concentrate and/or foam solution to deliver a fluorinated finished foam on a hazard, such as a flammable liquid or vapor fire and/or preventative vapor suppression. In an embodiment, the base foam concentrate may be a fluorinated base foam concentrate or a non-fluorinated base foam concentrate.

In an embodiment, if a firefighter uses a non-fluorinated base foam concentrate or a lower performing fluorinated base foam concentrate on a hazard and the firefighter cannot extinguish or suppress the hazard, using a foam proportioning system, the firefighter adds or injects an amount of fluorinated additive into the foam solution to achieve an oleophopic blanket with the ability to form an aqueous film.

In an embodiment, the amount of fluorinated additive added or injected into the foam solution via the foam proportioning system may be a controllable and determinable amount based on a minimum amount required to achieve fuel shedding and/or film formation.

Different Class B hydrocarbons require different amounts of fluorinated additive (e.g., perfluorinated surfactants) to achieve these fuel sheading and film formation characteristics. By adding the fluorinated additive on an as needed basis, the firefighter can optimize the cost to produce an effective foam blanket for an economic advantage. The firefighter only needs to add or inject the amount of fluorinated additive required.

The environmental advantage is that only the required amount of fluorinated additive may be added or injected into a foam solution to effectively produce the foam characteristics required.

In an embodiment, the foam proportioning system may utilize safe points to prevent accidental spill and discharges. For example, the fluorinated additive may come from the manufacturer in a container that can only be discharged if mated up to the foam proportioning system. In an embodiment, there may be several actions required before the foam proportioning system adds or injects fluorinated additive into the foam solution (e.g., activate power to the foam proportioning system, detection of flow through the system, select amount of fluorinated additive from a default selection of no amount of fluorinated additive). In an embodiment, a manual valve may need to be operated as a final part of the sequence.

In an embodiment, the fluorinated additive container may be removed to determine a current weight of the container to ascertain an accurate amount of fluorinated additive discharged during the incident. Once depleted, the fluorinated additive container may be sent off to the supplier for recharge.

Foam Injection/Proportioning Systems

FIG. 1A is a schematic of a foam injection system 100 according to an embodiment, showing a foam concentrate tank 112 and a fluorinated additive tank 114. As shown in FIG. 1A, the foam injection system 100 may comprise a water source 102, a fire or water pump 108, an educator 110, a foam concentrate container or tank 112, a foam concentrate control valve 116 and a foam solution discharge 124. In an embodiment, an outlet to the foam concentrate control valve 116 may be fluidly connected to the educator 110.

In an embodiment, the water source 102 may be a pressurized water source, in which case, the water pump 108 would not be needed.

In an embodiment, the system 100 may further comprise a fluorinated additive container or tank 114, and a fluorinated additive control valve 118. See e.g., FIG. 1A. In an embodiment, an outlet to the fluorinated additive control valve 118 may be fluidly connected to the educator 110.

In an embodiment, a nozzle (not shown) may be fluidly connected to the foam solution discharge 124.

Figure 1B:
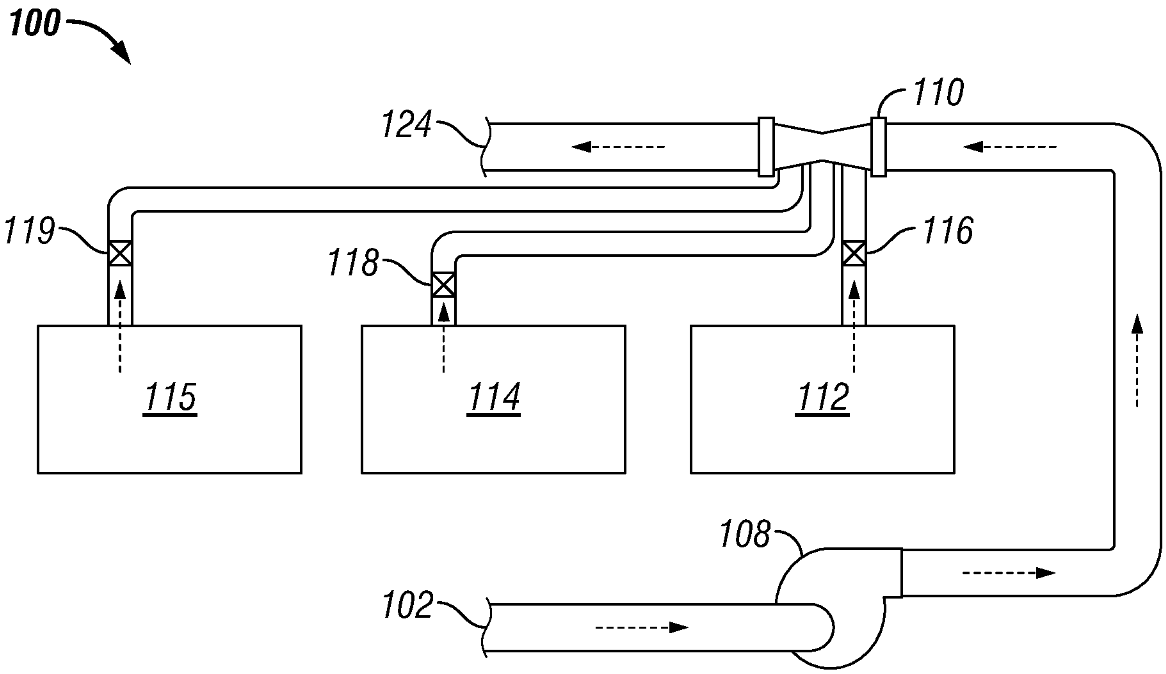
FIG. 1B is a schematic of an exemplary foam injection system according to an embodiment, showing a foam concentrate tank, a fluorinated additive tank and an other fire suppression additive tank.

FIG. 1B is a schematic of an exemplary foam injection system 100 according to an embodiment, showing a foam concentrate tank 112, a fluorinated additive tank 114 and an other fire suppression additive tank 115. As shown in FIG. 1B, the foam injection system 100 may comprise a water source 102, a fire or water pump 108, an educator 110, a foam concentrate container or tank 112, a foam concentrate control valve 116 and a foam solution discharge 124. In an embodiment, an outlet to the foam concentrate control valve 116 may be fluidly connected to the educator 110.

In an embodiment, the water source 102 may be a pressurized water source, in which case, the water pump 108 would not be needed.

In an embodiment, the system 100 may further comprise a fluorinated additive container or tank 114, and a fluorinated additive control valve 118. See e.g., FIG. 1B. In an embodiment, an outlet to the fluorinated additive control valve 118 may be fluidly connected to the educator 110.

In an embodiment, the system 100 may further comprise an other fire suppression additive container or tank 115, and an other fire suppression additive control valve 119. See e.g., FIG. 1B. In an embodiment, an outlet to the other fire suppression additive control valve 119 may be fluidly connected to the educator 110.

In an embodiment, a nozzle (not shown) may be fluidly connected to the foam solution discharge 124.

Figure 1C:
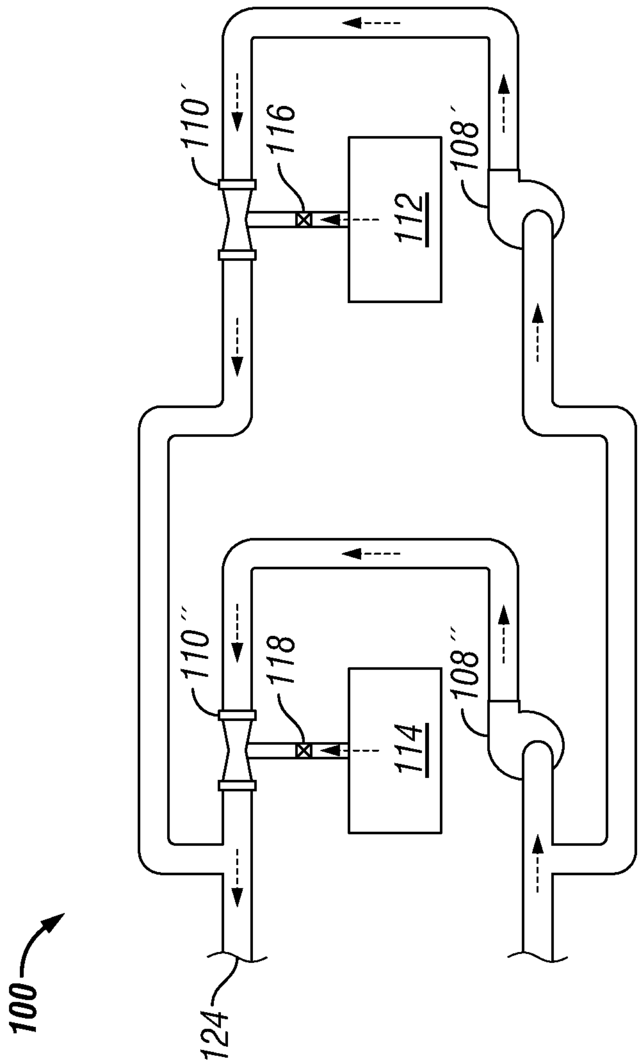
FIG. 1C is a schematic of an exemplary foam injection system according to an embodiment, showing a foam concentrate system and a fluorinated additive system.

FIG. 1C is a schematic of an exemplary foam injection system 100 according to an embodiment, showing a foam concentrate system 100' and a fluorinated additive system 100". As shown in FIG. 1C, the foam injection system 100 may comprise a foam concentrate system 100' and a fluorinated additive system 100".

In an embodiment, the foam concentrate system 100' may comprise a water source 102, a first fire or water pump 108', a first educator 110', a foam concentrate container or tank 112, a foam concentrate control valve 116 and a foam solution discharge 124. In an embodiment, an outlet to the foam concentrate control valve 116 may be fluidly connected to the first educator 110'.

In an embodiment, the water source 102 may be a pressurized water source, in which case, the first water pump 108' would not be needed.

In an embodiment, the fluorinated additive system 100" may comprise a water source 102, a second fire or water pump 108", a second educator 110", a fluorinated additive container or tank 114, a fluorinated additive control valve 118 and a foam solution discharge 124. In an embodiment, an outlet to the fluorinated additive control valve 118 may be fluidly connected to the second educator 110".

In an embodiment, the water source 102 may be a pressurized water source, in which case, the second water pump 108" would not be needed.

In an embodiment, a nozzle (not shown) may be fluidly connected to the foam solution discharge 124.

Figure 1D:
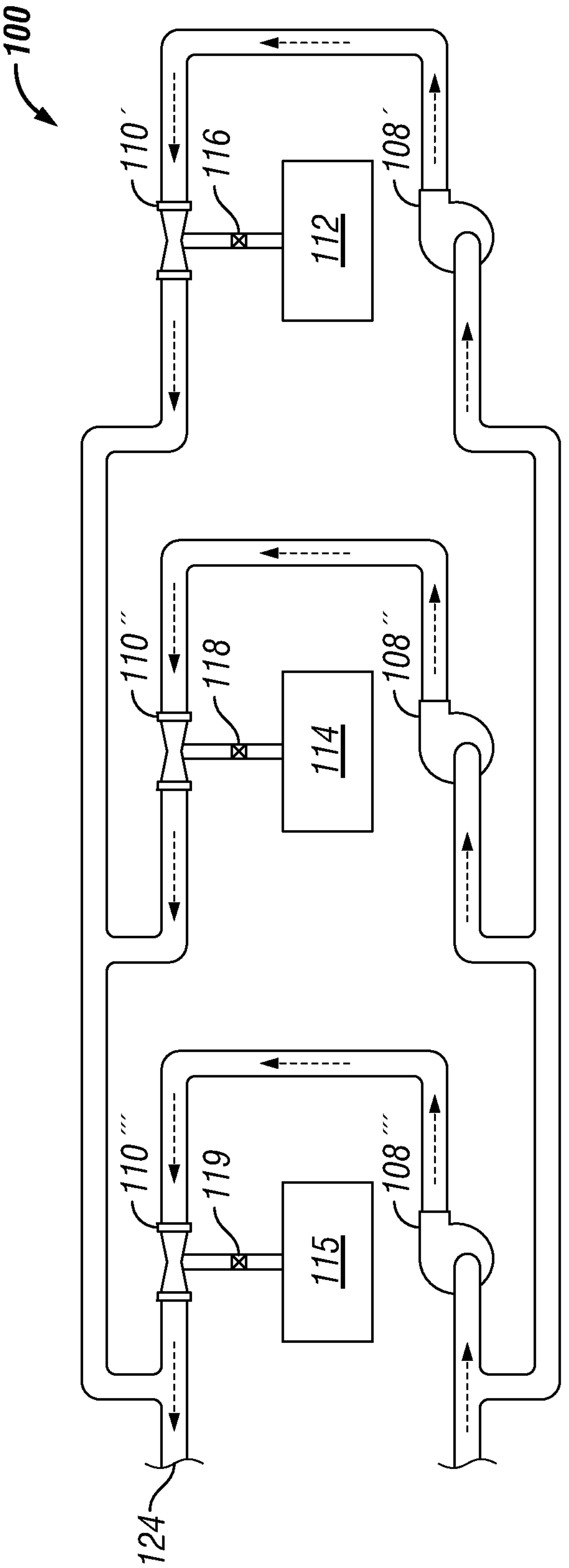
FIG. 1D is a schematic of an exemplary foam injection system according to an embodiment, showing a foam concentrate system, a fluorinated additive system and an other fire suppression additive system.

FIG. 1D is a schematic of an exemplary foam injection system 100 according to an embodiment, showing a foam concentrate system 100', a fluorinated additive system 100" and an other fire suppression additive system 100'". As shown in FIG. 1D, the foam injection system 100 may comprise a foam concentrate system 100', a fluorinated additive system 100" and an other fire suppression additive system 100'".

In an embodiment, the foam concentrate system 100' may comprise a water source 102, a first fire or water pump 108', a first educator 110', a foam concentrate container or tank 112, a foam concentrate control valve 116 and a foam solution discharge 124. In an embodiment, an outlet to the foam concentrate control valve 116 may be fluidly connected to the first educator 110'.

In an embodiment, the water source 102 may be a pressurized water source, in which case, the first water pump 108' would not be needed.

In an embodiment, the fluorinated additive system 100" may comprise a water source 102, a second fire or water pump 108", a second educator 110", a fluorinated additive container or tank 114, a fluorinated additive control valve 118 and a foam solution discharge 124. In an embodiment, an outlet to the fluorinated additive control valve 118 may be fluidly connected to the second educator 110".

In an embodiment, the water source 102 may be a pressurized water source, in which case, the second water pump 108" would not be needed.

In an embodiment, the other fire suppression additive system 100'" may comprise a water source 102, a third fire or water pump 108'", a third educator 110'", an other fire suppression additive container or tank 115, an other fire suppression additive control valve 119 and a foam solution discharge 124. In an embodiment, an outlet to the other fire suppression additive control valve 119 may be fluidly connected to the third educator 110'".

In an embodiment, the water source 102 may be a pressurized water source, in which case, the third water pump 108'" would not be needed.

In an embodiment, a nozzle (not shown) may be fluidly connected to the foam solution discharge 124.

Figure 2A:
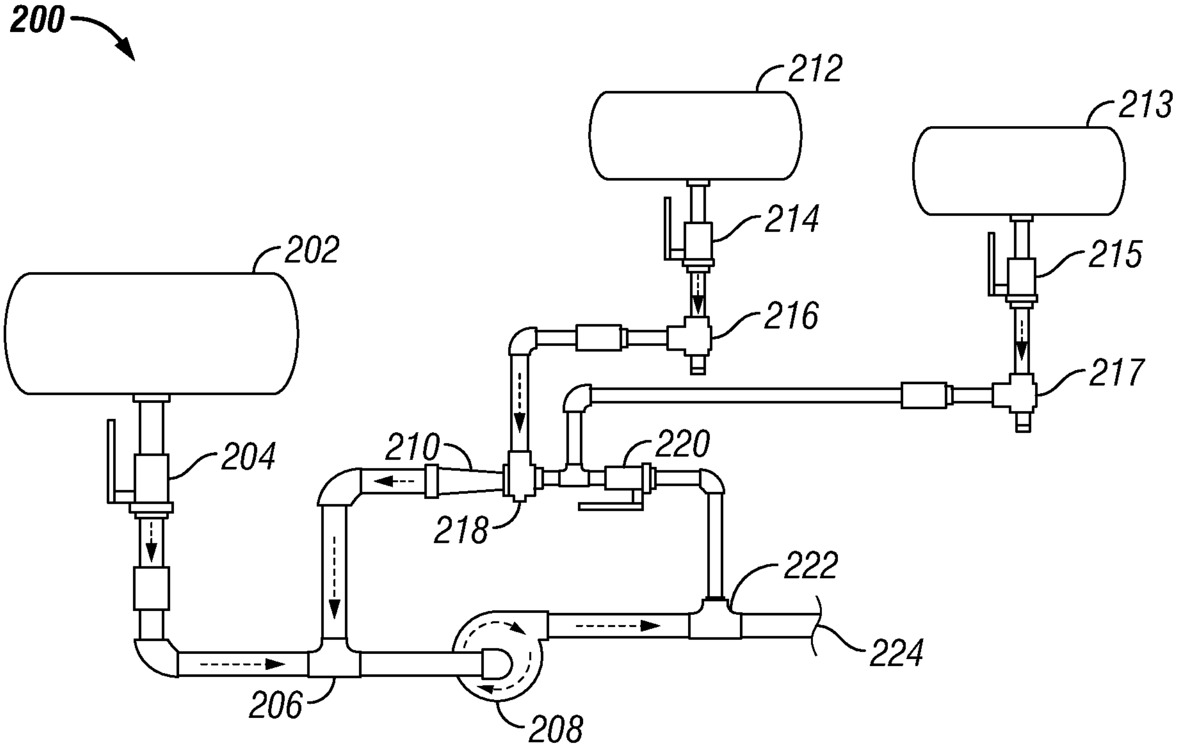
FIG. 2A is a schematic of an exemplary foam injection system according to an embodiment, showing a foam concentrate tank and a fluorinated additive tank.

FIG. 2A is a schematic of another foam injection system 200 according to an embodiment, showing a foam concentrate tank 212 and a fluorinated additive tank 213. As shown in FIG. 2A, the foam injection system 200 may comprise a water tank 202, a water shut-off valve 204, a first "T" 206, a fire or water pump 208, a proportioner 210, a foam concentrate container or tank 212, a foam concentrate shut-off valve 214, a foam concentrate metering valve 216, a second "T" 218, a foam solution shut-off valve 220, a third "T" 222 and a foam solution discharge 224. In an embodiment, an outlet to the foam concentrate metering valve 216 may be fluidly connected to the proportioner 210.

In an embodiment, the water tank 202 may be a pressurized water tank, in which case, the water pump 208 may not be needed.

In an embodiment, the system further comprises a fluorinated additive container or tank 213, a fluorinated additive shut-off valve 215 and a fluorinated additive metering valve 217. See e.g., FIG. 2A. In an embodiment, an outlet to the fluorinated additive metering valve 217 may be fluidly connected to the proportioner 210.

In an embodiment, a nozzle (not shown) may be fluidly connected to the foam solution discharge 224.

Figure 2B:
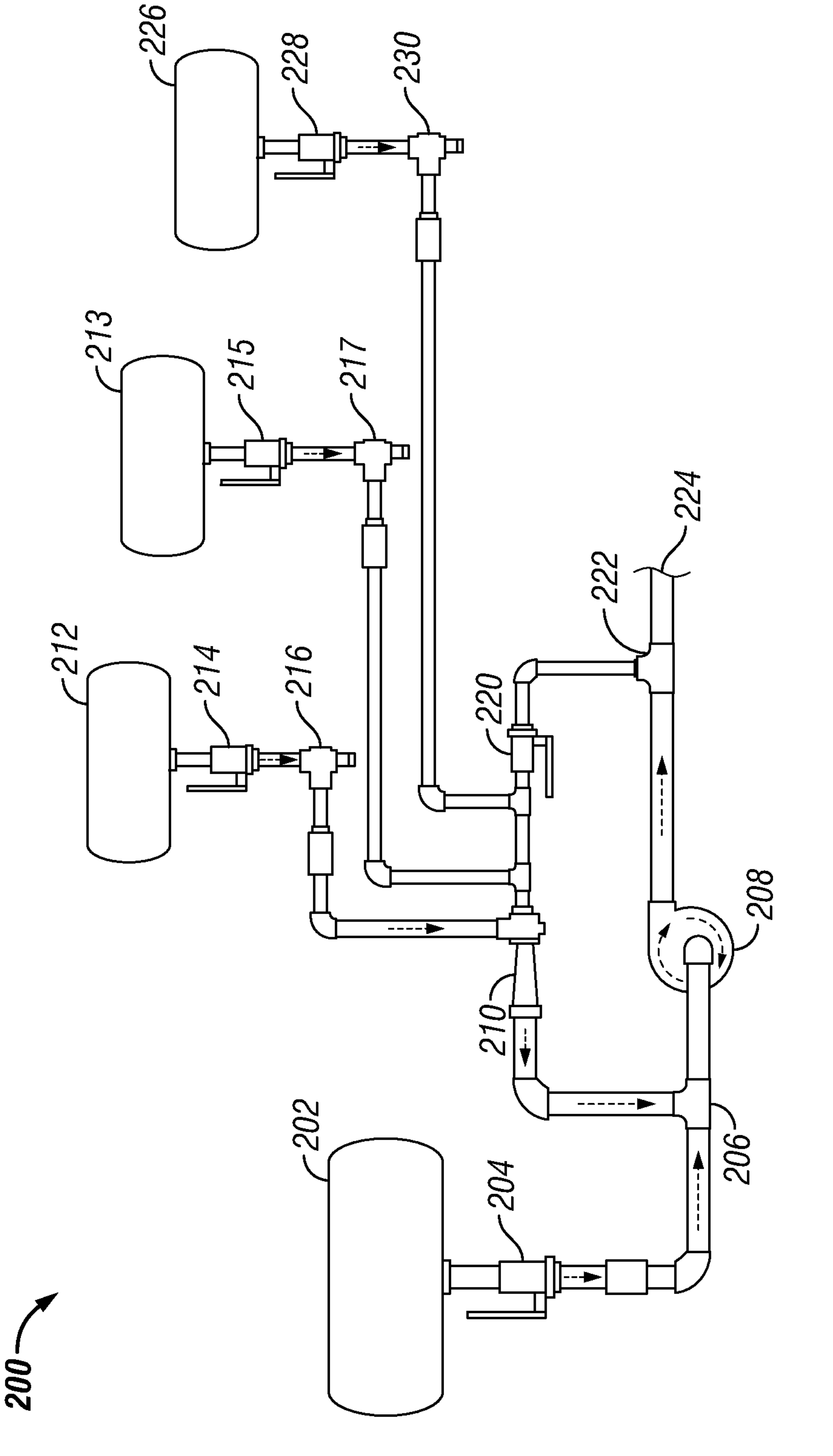
FIG. 2B is a schematic of an exemplary foam injection system according to an embodiment, showing a foam concentrate tank, a fluorinated additive tank and an other fire suppression additive tank.

FIG. 2B is a schematic of an exemplary foam injection system according to an embodiment, showing a foam concentrate tank, a fluorinated additive tank and an other fire suppression additive tank. As shown in FIG. 2B, the foam injection system 200 may comprise a water tank 202, a water shut-off valve 204, a first "T" 206, a fire or water pump 208, a proportioner 210, a foam concentrate container or tank 212, a foam concentrate shut-off valve 214, a foam concentrate metering valve 216, a second "T" 218, a foam solution shut-off valve 220, a third "T" 222 and a foam solution discharge 224. In an embodiment, an outlet to the foam concentrate metering valve 216 may be fluidly connected to the proportioner 210.

In an embodiment, the water tank 202 may be a pressurized water tank, in which case, the water pump 208 may not be needed.

In an embodiment, the system further comprises a fluorinated additive container or tank 213, a fluorinated additive shut-off valve 215 and a fluorinated additive metering valve 217. See e.g., FIG. 2B. In an embodiment, an outlet to the fluorinated additive metering valve 217 may be fluidly connected to the proportioner 210.

In an embodiment, the system 200 further comprises an other fire suppression additive container or tank 226, an other fire suppression additive shut-off valve 228 and an other fire suppression additive metering valve 230. See e.g., FIG. 2B. In an embodiment, an outlet to the other fire suppression additive metering valve 230 may be fluidly connected to the proportioner 210.

In an embodiment, a nozzle (not shown) may be fluidly connected to the foam solution discharge 224.

Figure 2C:
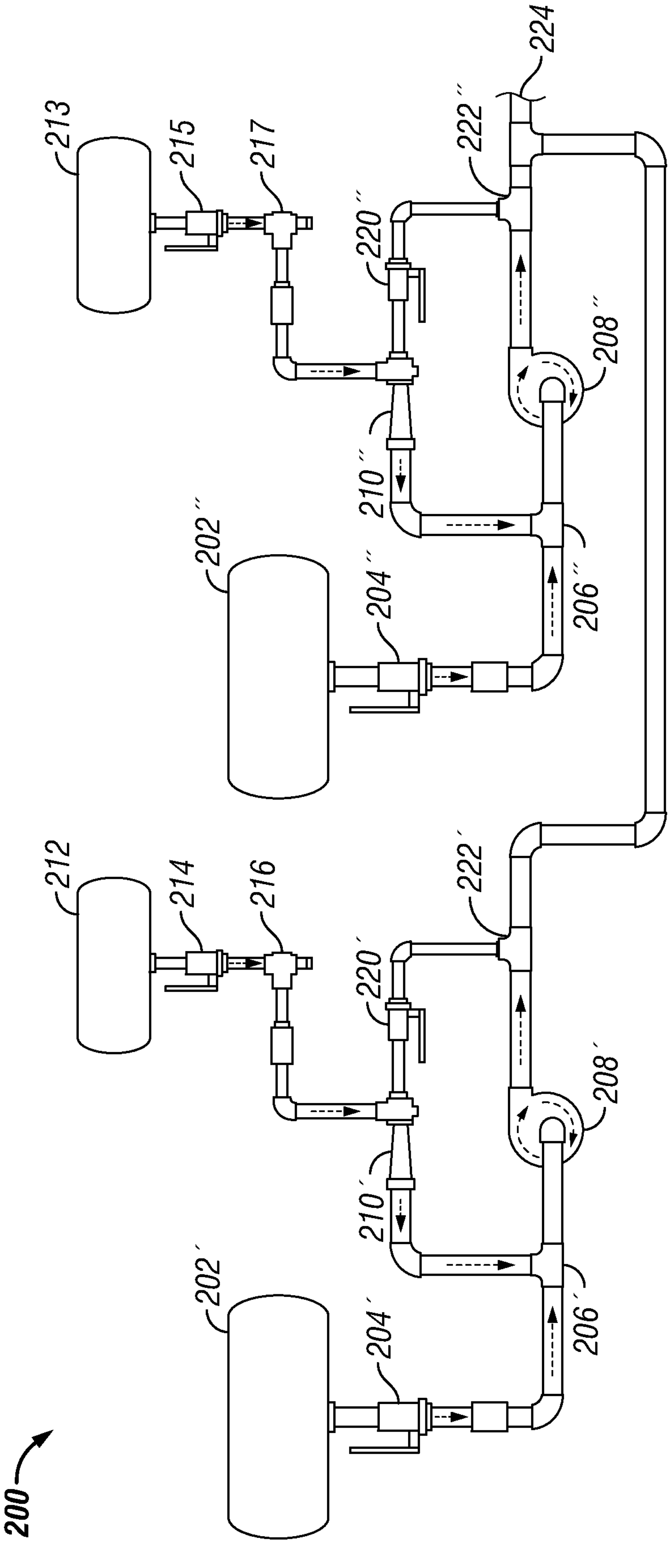
FIG. 2C is a schematic of an exemplary foam injection system according to an embodiment, showing a foam concentrate system and a fluorinated additive system.

FIG. 2C is a schematic of an exemplary foam injection system 200 according to an embodiment, showing a foam concentrate system 200' and a fluorinated additive system 200". As shown in FIG. 2C, the foam injection system 200 may comprise a foam concentrate system 200' and a fluorinated additive system 200".

In an embodiment, the foam concentrate system 200' may comprise a first water tank 202', a first water shut-off valve 204', a first, first "T" 206', a first fire or water pump 208', a first proportioner 210', a foam concentrate container or tank 212, a foam concentrate shut-off valve 214, a foam concentrate metering valve 216, a first, second "T" 218', a first foam solution shut-off valve 220', a first, third "T" 222' and a foam solution discharge 224. In an embodiment, an outlet to the foam concentrate metering valve 216 may be fluidly connected to the first proportioner 210'.

In an embodiment, the first water tank 202' may be a pressurized water tank, in which case, the first water pump 208' may not be needed.

In an embodiment, the fluorinated additive system 200" may comprise a second water tank 202", a second water shut-off valve 204", a second, first "T" 218", a second fire or water pump 208", a second proportioner 210", a fluorinated additive container or tank 213, a fluorinated additive shut-off valve 215, a fluorinated additive metering valve 217, a second, second "T" 218", a second foam solution shut-off valve 220", a second, third "T" 222" and a foam solution discharge 224. In an embodiment, an outlet to the fluorinated additive metering valve 217 may be fluidly connected to the second proportioner 210".

In an embodiment, the second water tank 202" may be a pressurized water tank, in which case, the second water pump 208" may not be needed.

In an embodiment, a nozzle (not shown) may be fluidly connected to the foam solution discharge 224.

Figure 2D:
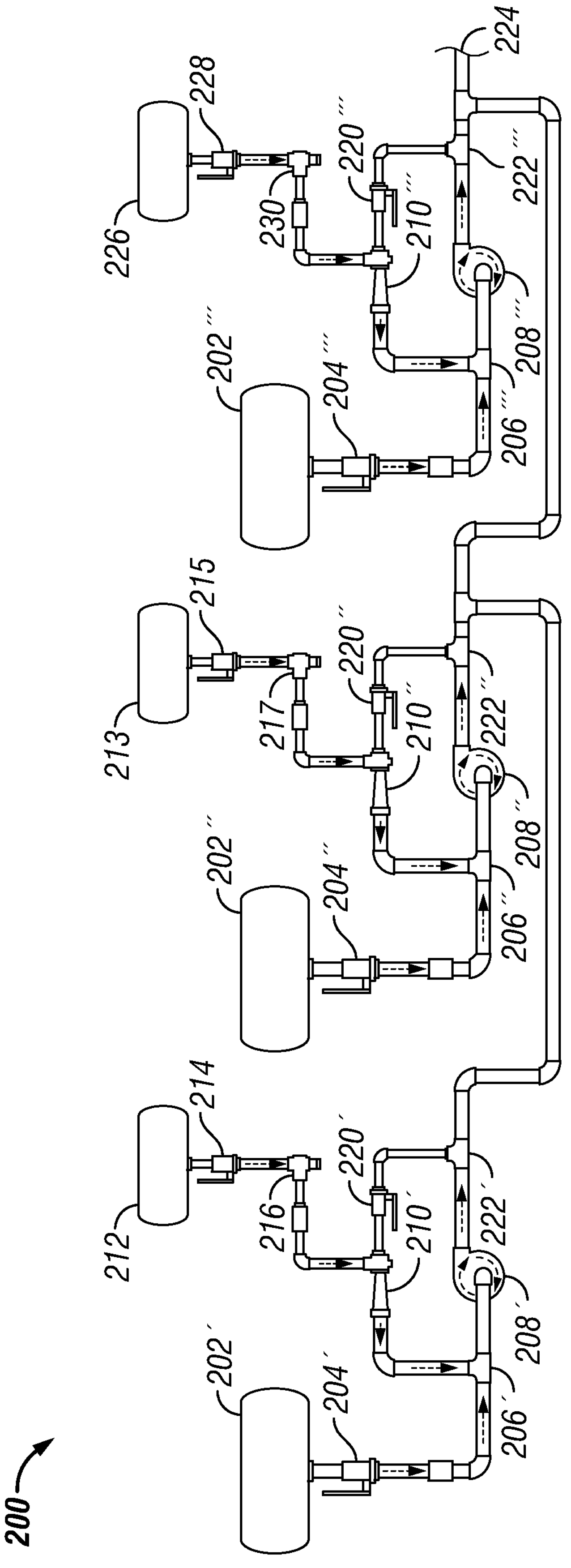
FIG. 2D is a schematic of an exemplary foam injection system according to an embodiment, showing a foam concentrate system, a fluorinated additive system and an other fire suppression additive system.

FIG. 2D is a schematic of an exemplary foam injection system 200 according to an embodiment, showing a foam concentrate system 200', a fluorinated additive system 200" and an other fire suppression additive system 200'". As shown in FIG. 2D, the foam injection system 200 may comprise a foam concentrate system 200', a fluorinated additive system 200" and another fire suppression additive system 200'".

In an embodiment, the foam concentrate system 200' may comprise a first water tank 202', a first water shut-off valve 204', a first, first "T" 206', a first fire or water pump 208', a first proportioner 210', a foam concentrate container or tank 212, a foam concentrate shut-off valve 214, a foam concentrate metering valve 216, a first, second "T" 218', a first foam solution shut-off valve 220', a first, third "T" 222' and a foam solution discharge 224. In an embodiment, an outlet to the foam concentrate metering valve 216 may be fluidly connected to the first proportioner 210'.

In an embodiment, the first water tank 202' may be a pressurized water tank, in which case, the first water pump 208' may not be needed.

In an embodiment, the fluorinated additive system 200" may comprise a second water tank 202", a second water shut-off valve 204", a second, first "T" 218", a second fire or water pump 208", a second proportioner 210", a fluorinated additive container or tank 213, a fluorinated additive shut-off valve 215, a fluorinated additive metering valve 217, a second, second "T" 218", a second foam solution shut-off valve 220", a second, third "T" 222" and a foam solution discharge 224. In an embodiment, an outlet to the fluorinated additive metering valve 217 may be fluidly connected to the second proportioner 210".

In an embodiment, the second water tank 202" may be a pressurized water tank, in which case, the second water pump 208" may not be needed.

In an embodiment, the other fire suppression additive system 200'" may comprise a third water tank 202'", a third water shut-off valve 204'", a third, first "T" 218'", a third fire or water pump 208'", a third proportioner 210'", an other fire suppression additive container or tank 226, an other fire suppression additive shut-off valve 228, an other fire suppression additive metering valve 230, a third, second "T" 218'", a third foam solution shut-off valve 220'", a third, third "T" 222'" and a foam solution discharge 224. In an embodiment, an outlet to the other fire suppression additive metering valve 230 may be fluidly connected to the third proportioner 210'".

In an embodiment, the third water tank 202'" may be a pressurized water tank, in which case, the third water pump 208'" may not be needed.

In an embodiment, a nozzle (not shown) may be fluidly connected to the foam solution discharge 224.

In an embodiment, the foam injection system may be a bladder-tank-type, a pump-driven-type, a water-powered pump-driven-type, etc. system.

Figure 3A:
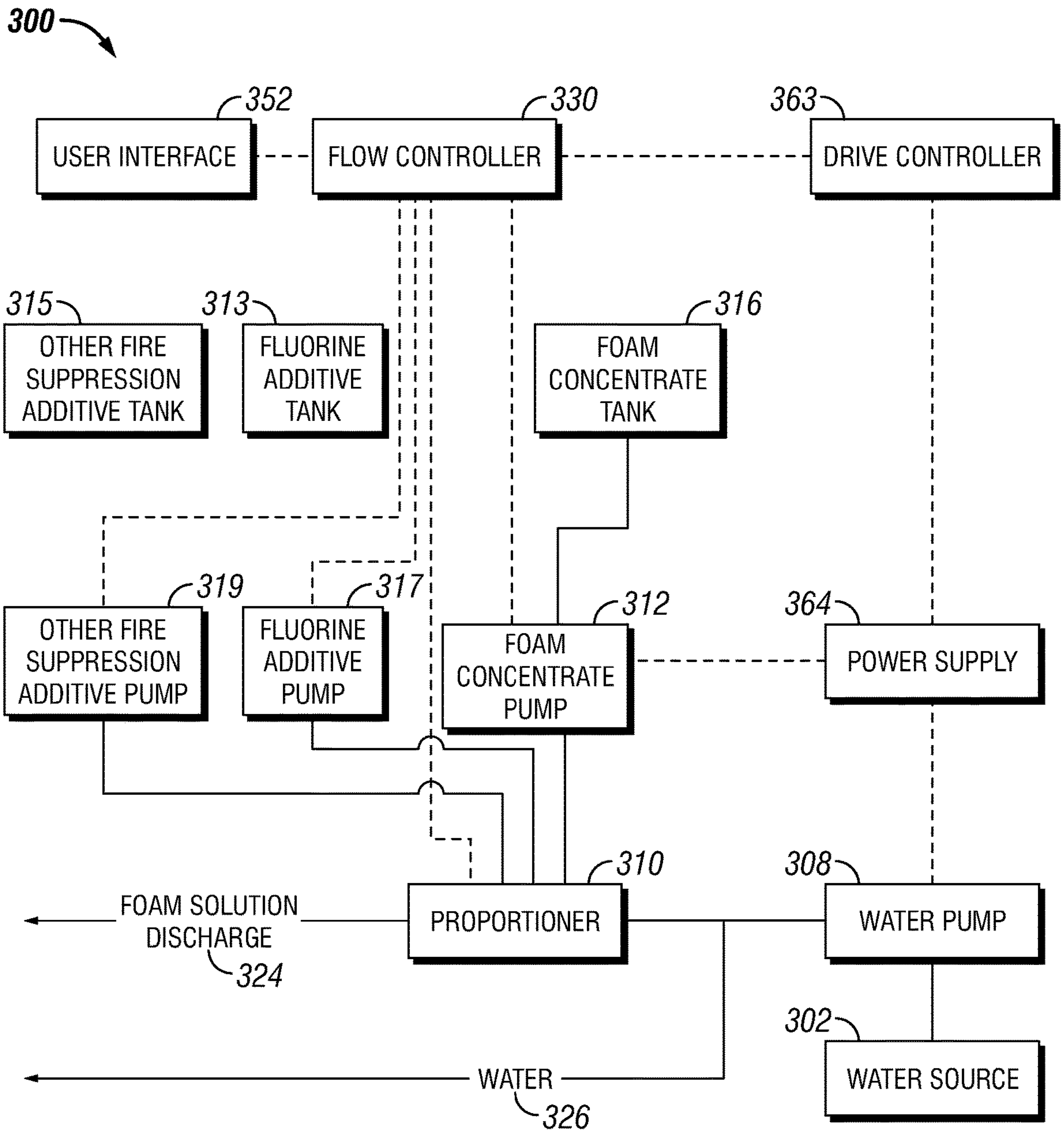
FIG. 3A is a block diagram of an exemplary foam injection system according to an embodiment, showing a foam concentrate tank, a fluorinated additive tank and an other fire suppression additive tank.
Figure 3B:
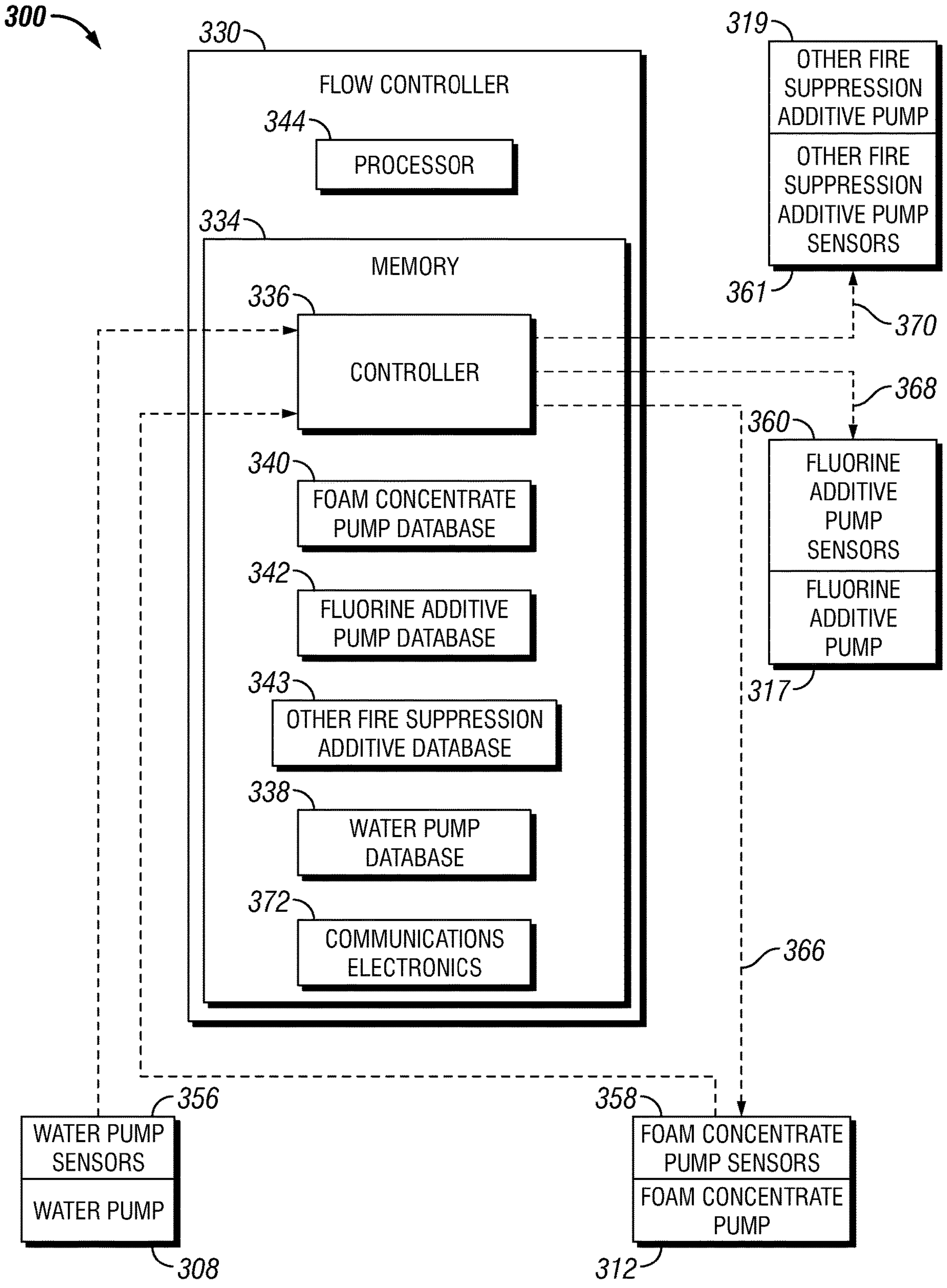
FIG. 3B is a block diagram of an exemplary foam injection system according to an embodiment, showing a flow controller for the foam injection system of FIG. 3A.

FIG. 3A is a block diagram of an exemplary foam injection system according to an embodiment, showing a foam concentrate tank, a fluorinated additive tank and an other fire suppression additive tank; and FIG. 3B is a block diagram of an exemplary foam injection system according to an embodiment, showing a flow controller for the foam injection system of FIG. 3A.

Referring to FIGS. 3A-3B, the foam injection system 300 may comprise a water source 302, a fire or water pump 308, a proportioner 310, a foam concentrate container or tank 312, a foam concentrate pump 316, a fluorinated additive container or tank 313, a fluorinated additive pump 317 and a foam solution discharge 324.

In an embodiment, the water source 302 may be a water tank, a fire hydrant or a municipal water supply line. In an embodiment, the water source 302 may be a pressurized water source, in which case, the water pump 308 would not be needed. The water source 302 may provide water at a positive pressure (e.g., a pressure sufficient to be used for firefighting applications). In an embodiment, water from the water source 302 may be provided directly for downstream usage (e.g. without use of a water pump 308). For example, the water source 302 may output water at a second flow rate for downstream usage. In an embodiment, the water source 302 may be a non-pressurized or low pressure water source, such as a body of water (e.g., pond, river), a low pressure high volume water pump, or a low pressure fire main.

In an embodiment, the system 300 may further comprise an optional other fire suppression additive container or tank 315 and an optional other fire suppression additive pump 319.

The system 300 may comprise at least one foam concentrate pump 316. The foam concentrate pump 316 may receive foam concentrate from at least one foam concentrate tank 312, and output the foam concentrate at a foam concentrate flow rate. The foam concentrate pump 316 may be a positive displacement pump. The foam concentrate pump 316 may be characterized by a displacement, such as a value in volume per revolution (e.g., gallons per revolution) representing an expected or theoretical volume of fluid that the foam concentrate pump 316 can displace (e.g., move) per revolution.

The foam concentrate pump 316 may be characterized by a pump speed (e.g., revolutions per minute (RPM)), which can be measured by a speed sensor. The flow controller 304 may control the pump speed of the foam concentrate pump 316, such as to operate the foam concentrate pump 316 as a dosing pump, as the pump speed of the foam concentrate pump 316, and thus the resulting magnitude of the foam concentrate flow rate, can determine a dose of foam concentrate outputted from the foam concentrate pump 316.

The foam concentrate pump 316 may be characterized by a volumetric efficiency. The volumetric efficiency may indicate a fraction of the displacement (e.g., theoretical or expected displacement) of the foam concentrate pump 316 corresponding to fluid outputted by the foam concentrate pump 316. The volumetric efficiency may correspond to factors such as viscosity, differential pressure through the foam concentrate pump 316, and pump speed of the foam concentrate pump 316. The differential pressure may be measured by at least one pressure sensor. As described with further reference to FIG. 3A, the flow controller 304 can determine the foam concentrate flow rate of the foam concentrate pump 316 based on the differential pressure and the pump speed.

The foam concentrate pump 316 may have a manual override. For example, the foam concentrate pump 316 may receive a user input (e.g., receive a manual override input via user interface 352 or via a user interface of the foam concentrate pump 316) indicating the pump speed and adjust the pump speed based on the received user input. The foam concentrate pump 316 can switch from a first state in which the foam concentrate pump 316 operates responsive to a flow control signal from the flow controller 304 to a second state in which the foam concentrate pump 316 operates responsive to the user input.

The system 300 may comprise at least one fluorinated additive pump 317. The fluorinated additive pump 317 may receive fluorinated additive from at least one fluorinated additive tank 313, and output the fluorinated additive at a fluorinated additive flow rate. The fluorinated additive pump 317 may be a positive displacement pump. The fluorinated additive pump 317 may be characterized by a displacement, such as a value in volume per revolution (e.g., gallons per revolution) representing an expected or theoretical volume of fluid that the fluorinated additive pump 317 can displace (e.g., move) per revolution.

The fluorinated additive pump 317 may be characterized by a pump speed (e.g., revolutions per minute (RPM)), which can be measured by a speed sensor. The flow controller 304 may control the pump speed of the fluorinated additive pump 317, such as to operate the fluorinated additive pump 317 as a dosing pump, as the pump speed of the fluorinated additive pump 317, and thus the resulting magnitude of the fluorinated additive flow rate, can determine a dose of fluorinated additive outputted from the fluorinated additive pump 317.

The fluorinated additive pump 317 may be characterized by a volumetric efficiency. The volumetric efficiency may indicate a fraction of the displacement (e.g., theoretical or expected displacement) of the fluorinated additive pump 317 corresponding to fluid outputted by the fluorinated additive pump 317. The volumetric efficiency may correspond to factors such as viscosity, differential pressure through the fluorinated additive pump 317, and pump speed of the fluorinated additive pump 317. The differential pressure may be measured by at least one pressure sensor. As described with further reference to FIG. 3A, the flow controller 304 may determine the fluorinated additive flow rate of the fluorinated additive pump 317 based on the differential pressure and the pump speed.

The fluorinated additive pump 317 may have a manual override. For example, the fluorinated additive pump 317 may receive a user input (e.g., receive a manual override input via user interface 352 or via a user interface of the fluorinated additive pump 317) indicating the pump speed and adjust the pump speed based on the received user input. The fluorinated additive pump 317 may switch from a first state in which the fluorinated additive pump 317 operates responsive to a flow control signal from the flow controller 304 to a second state in which the fluorinated additive pump 317 operates responsive to the user input.

The system 300 may comprise at least one optional other fire suppression additive pump 319. The other fire suppression additive pump 319 may receive other fire suppression additive from at least one fire suppression additive tank 315, and output the other fire suppression additive at another fire suppression additive flow rate. The other fire suppression additive pump 319 may be a positive displacement pump. The other fire suppression additive pump 319 may be characterized by a displacement, such as a value in volume per revolution (e.g., gallons per revolution) representing an expected or theoretical volume of fluid that the other fire suppression additive pump 319 can displace (e.g., move) per revolution.

The other fire suppression additive pump 319 may be characterized by a pump speed (e.g., revolutions per minute (RPM)), which can be measured by a speed sensor. The flow controller 304 may control the pump speed of the other fire suppression additive pump 319, such as to operate the other fire suppression additive pump 319 as a dosing pump, as the pump speed of the other fire suppression additive pump 319, and thus the resulting magnitude of the other fire suppression additive flow rate, can determine a dose of other fire suppression additive outputted from the other fire suppression additive pump 319.

The other fire suppression additive pump 319 may be characterized by a volumetric efficiency. The volumetric efficiency may indicate a fraction of the displacement (e.g., theoretical or expected displacement) of the other fire suppression additive pump 319 corresponding to fluid outputted by the other fire suppression additive pump 319. The volumetric efficiency may correspond to factors such as viscosity, differential pressure through the other fire suppression additive pump 319, and pump speed of the other fire suppression additive pump 319. The differential pressure may be measured by at least one pressure sensor. As described with further reference to FIG. 3A, the flow controller 304 may determine the other fire suppression additive flow rate of the other fire suppression additive pump 319 based on the differential pressure and the pump speed.

The other fire suppression additive pump 319 may have a manual override. For example, the other fire suppression additive pump 319 may receive a user input (e.g., receive a manual override input via user interface 352 or via a user interface of the other fire suppression additive pump 319) indicating the pump speed and adjust the pump speed based on the received user input. The other fire suppression additive pump 319 may switch from a first state in which the other fire suppression additive pump 319 operates responsive to a flow control signal from the flow controller 304 to a second state in which the other fire suppression additive pump 319 operates responsive to the user input.

The system 300 may comprise at least one water pump 308. The water pump 308 may receive water from a water source 302. The water source 302 may be a pressurized water source, in which case, the water pump 308 may not be needed, as discussed above. Alternatively, the water pump may receive water from a water source 302, such as a lake, a river or other body of water. The water pump 308 may output the water from the water supply 302 at a second flow rate (e.g., upon pumping the water outputted by the water source 302). The water pump 308 can be a centrifugal pump. The water pump 308 can be characterized by a drive power, such as a power (e.g., horsepower) of an input shaft of the water pump 308. The water pump 308 may be characterized by a pump speed (e.g., RPM). The water pump 308 may be characterized by a differential pressure, which can be measured by one or more pressure sensors. As described with further reference to FIG. 3B, the flow controller 330 can determine the second flow rate based on the differential pressure of the water pump 308, the pump speed of the water pump 308 and the power of the input shaft of the water pump 308.

Similar to the foam injection systems of FIGS. 1A-2D, the system 300 may comprise various pipes or tubing fluidly connecting components such as the foam concentrate pump 316, the foam concentrate tank 312, the fluorinated additive pump 317, the fluorinated additive tank 313, the other fire suppression additive pump 319, the other fire suppression additive tank 315, the water pump 308, and the water source 302.

The system 300 may comprise at least one drive 362. The drive 362 can provide mechanical power to at least one of the foam concentrate pumps 316, the fluorinated additive pump 317, the other fire suppression additive pump, and the water pump 308. For example, the drive 362 may drive at least one of the foam concentrate pump 316, the fluorinated additive pump 317, the other fire suppression additive pump 319, and the water pump 308 (e.g., cause a shaft of the respective pump to rotate). The drive 362 may be of any of a variety of drive types to drive the foam concentrate pump 316, the fluorine additive pump 317, the other fire suppression additive pump 319, and the water pump 308. The drive 362 may be diesel-powered, hydraulically powered, or electrically powered. The drive 362 may comprise a motor.

The system 300 may comprise at least one drive controller 363, such as an electrical interface that receives electrical power from a power source and provides the electrical power to the drive controller 363 to cause the drive controller 363 to rotate the shaft of the foam concentrate pump 312, the shaft of the fluorinated additive pump 317, the shaft of the other fire suppression additive pump 319 or the shaft of the water pump 308. The drive controller 363 may provide electrical power to the drive 362 responsive to a control signal from the flow controller 330, such as a control signal indicating a desired flow rate of operation of the foam concentrate pump 312, the fluorinated additive pump 317, the other fire suppression additive pump 319 or the water pump 308.

In an embodiment, the drive 362 may be diesel drive that can drive the water pump 308 and, for example, the foam concentrate pump 316, and, for example, the foam concentrate pump 316 may be a hydraulically driven foam concentrate pump. In an embodiment, the drive 362 may be a diesel drive that can drive the foam concentrate pump 316, and, for example, the foam concentrate pump 316 may be a hydraulically driven foam concentrate pump. In an embodiment, the drive 362 may be a diesel drive that can drive the foam concentrate pump 316 as a hydraulically driven pump, or, for example, the foam concentrate pump 316 may be an electrically driven foam concentrate pump with a variable frequency drive.

The system 300 may output a foam solution 324 based on operation of the foam concentrate pump 312, the fluorinated additive pump 317 and/or the other fire suppression additive pump 319, and the water pump 308. For example, the system 300 may combine foam concentrate outputted by the foam concentrate pump 312, fluorinated additive outputted by the fluorinated additive pump, and/or other fire suppression additive outputted by the other fire suppression additive pump 319, and water outputted by the water pump 120 to provide the foam solution 324. The system 300 may directly inject the foam concentrate outputted by the foam concentrate pump 312, the fluorinated additive outputted from the fluorinated additive pump 317 and/or the other fire suppression additive outputted from the other fire suppression additive pump 319 into a pipe or tubing in which the water outputted by the water pump 308 flows to provide the foam solution 324. The foam solution 324 may have a ratio of water and foam concentrate corresponding to a target ratio (e.g., based on control of the foam concentrate flow rate outputted by the foam concentrate pump 316). The foam solution 324 may have a ratio of water and fluorinated additive corresponding to a target ratio (e.g., based on control of the fluorinated additive flow rate outputted by the fluorinated additive pump 317). The foam solution 324 may have a ratio of water and other fire suppression additive corresponding to a target ratio (e.g., based on control of the other fire suppression additive flow rate outputted by the other fire suppression pump 319). The system 300 can output water 326 as a second flow rate separate from a first flow rate of the foam solution 324, such as to address fire conditions that can be effectively addressed using water.

The system 300 may comprise at least one mixing point or proportioner 310. The mixing point or proportioner 310 may comprise a collection point, junction point (e.g., "T"), valve, manifold, nozzle, or other component that may receive foam concentrate from the foam concentrate pump 112, fluorinated additive from a fluorinated additive pump 317 and/or other fire suppression additive from the other fire suppression additive pump 319, and water from the water pump 308 and output the foam solution 324.

Referring to FIG. 3B and further to FIG. 3A, the flow controller 304 is depicted. The flow controller 304 may be implemented using a programmable logic controller (PLC). The flow controller 304 may comprise a processor 344 and memory 334. The processor 344 may be implemented as a specific purpose processor, an application specific integrated circuit (ASIC), one or more field programmable gate arrays (FPGAs), a group of processing components, or other suitable electronic processing components. The memory 334 may be one or more devices (e.g., RAM, ROM, flash memory, hard disk storage) for storing data and computer code for completing and facilitating the various user or client processes, layers, and modules described in the present disclosure. The memory 334 may be or include volatile memory or non-volatile memory and may include database components, object code components, script components, or any other type of information structure for supporting the various activities and information structures of the inventive concepts disclosed herein. The memory 334 may be communicably connected to the processor 344. The memory may comprise computer code or instruction modules for executing one or more processes described herein. The memory 334 may comprise various circuits, software engines, and/or modules that cause the processor 344 to execute the systems and methods described herein.

The flow controller 304 may comprise a controller 336. The controller 336 may generate control signals to control operation of various components of the system 300, such as the foam concentrate pump 316, the fluorinated additive pump 317, and the other fire suppression additive pump 319. For example, the controller 336 may control a first flow rate of foam concentrate outputted by the foam concentrate pump 316 to achieve a target ratio based on determining a second flow rate of water outputted by the water pump 308 or the water source 302.

The controller 336 may receive foam concentrate pump sensor data regarding the foam concentrate pump 316 from one or more sensors 358 associated with the foam concentrate pump 316. The one or more sensors 358 may include any of a variety of sensors that measure parameters associated with the foam concentrate outputted the foam concentrate pump 316, or operation of the foam concentrate pump 316, such as temperature, pressure or flow rate sensors. For example, the controller 336 may receive a discharge pressure of the foam concentrate pump 316 from at least one pressure sensor 358. The foam concentrate pressure sensor 358 may comprise a pressure transducer. The foam concentrate pressure sensor 358 may detect the discharge pressure of the foam concentrate pump 316. The foam concentrate pressure sensor 358 may provide an indication of the differential pressure to the controller 336. The one or more sensors 358 may include various sensors, such a sensors that can detect a dynamic head (e.g., total dynamic head) associated with, for example, the foam concentrate pump 316, or a temperature sensor associated with, for example, the foam concentrate of the foam concentrate pump 316.

The one or more sensors 358 may comprise a foam concentrate pump speed sensor 358. The foam concentrate pump speed sensor 358 may detect a pump speed of the foam concentrate pump 316, such as pump speed in RPM. The foam concentrate pump speed sensor 358 may comprise a circuit that reads the pump speed from the foam concentrate pump 312 (e.g., a tachometer). The foam concentrate pump speed sensor 358 may comprise a sensor that measures the rate of rotation of a shaft of the foam concentrate pump 312 (e.g., Hall effect sensor).

The controller 336 may receive fluorinated additive pump sensor data regarding the fluorinated additive pump 317 from one or more sensors 360 associated with the fluorinated additive pump 317. The one or more sensors 360 may include any of a variety of sensors that measure parameters associated with the fluorinated additive outputted the fluorinated additive pump 317, or operation of the fluorinated additive pump 317, such as temperature, pressure or flow rate sensors. For example, the controller 336 may receive a discharge pressure of the fluorinated additive pump 317 from at least one pressure sensor 360. The fluorinated additive pressure sensor 360 may comprise a pressure transducer. The fluorinated additive pressure sensor 360 may detect the discharge pressure of the fluorinated additive pump 317. The fluorinated additive pressure sensor 360 may provide an indication of the differential pressure to the controller 336.

The one or more sensors 360 may comprise a fluorinated additive pump speed sensor 360. The fluorinated additive pump speed sensor 360 may detect a pump speed of the fluorinated additive pump 317, such as pump speed in RPM. The fluorinated additive pump speed sensor 360 may comprise a circuit that reads the pump speed from the fluorinated additive pump 317 (e.g., a tachometer). The fluorinated additive pump speed sensor 360 may comprise a sensor that measures the rate of rotation of a shaft of the fluorinated additive pump 317 (e.g., Hall effect sensor).

The controller 336 may receive other fire suppression additive pump sensor data regarding the other fire suppression additive pump 319 from one or more sensors 361 associated with the other fire suppression additive pump 319. The one or more sensors 361 may include any of a variety of sensors that measure parameters associated with the other fire suppression additive outputted the other fire suppression additive pump 319, or operation of the other fire suppression additive pump 319, such as temperature, pressure or flow rate sensors. For example, the controller 336 may receive a discharge pressure of the other fire suppression additive pump 319 from at least one pressure sensor 361. The other fire suppression additive pressure sensor 361 may comprise a pressure transducer. The other fire suppression additive pressure sensor 361 may detect the discharge pressure of the other fire suppression additive pump 319. The other fire suppression additive pressure sensor 361 may provide an indication of the differential pressure to the controller 336.

The one or more sensors 361 may comprise another fire suppression additive pump speed sensor 361. The other fire suppression additive pump speed sensor 361 may detect a pump speed of the other fire suppression additive pump 319, such as pump speed in RPM. The other fire suppression additive pump speed sensor 361 may comprise a circuit that reads the pump speed from the other fire suppression additive pump 319 (e.g., a tachometer). The other fire suppression additive pump speed sensor 361 may comprise a sensor that measures the rate of rotation of a shaft of the other fire suppression additive pump 319 (e.g., Hall effect sensor).

The controller 336 may receive water pump sensor data regarding at least one of the water source 302 and the water pump 308 from one or more sensors 356 associated with at least one of the water source 302 and the water pump 308. The one or more sensors 356 may include any of a variety of sensors that measure parameters associated with the water outputted by the water source 302 or the water pump 308, or operation of the water pump 308, such as temperature, pressure or flow rate sensors. For example, the sensors 356 may comprise an engine speed sensor of the water pump 308, such as a tachometer or Hall effect sensor, that measures or otherwise provides a water pump speed of the water pump 308 (e.g., water pump shaft rotation speed). The sensors 356 may comprise an engine power sensor 356, such as an engine control unit (ECU) that outputs shaft torque, which the controller 336 may use to determine the engine power (e.g., shaft input power). The sensors 356 may comprise at least one pressure sensor 356, such as at least one pressure transducer, that can determine a differential pressure of the water pump 308 (e.g., based on an inlet pressure and outlet pressure).

The flow controller 330 may maintain a foam concentrate pump database 340. The foam concentrate pump database 340 may comprise data regarding operation of the foam concentrate pump 316. For example, the foam concentrate pump database 340 may comprise a lookup table that maps the pump speed and discharge pressure of the foam concentration pump 316 to volumetric efficiency. The controller 330 may use the pump speed and discharge pressure of the foam concentrate pump 316 received from the one or more sensors 358 to perform a lookup in the foam concentrate pump database 340 and identify the corresponding volumetric efficiency. The foam concentrate pump database 340 may comprise an indication of the displacement (e.g., theoretical displacement) of the foam concentration pump 316.

The flow controller 330 may maintain a fluorinated additive pump database 342. The fluorinated additive pump database 342 may comprise data regarding operation of the fluorinated additive pump 317. For example, the fluorinated additive pump database 342 may comprise a lookup table that maps the pump speed and discharge pressure of the fluorinated additive pump 317 to volumetric efficiency. The controller 330 may use the pump speed and discharge pressure of the fluorinated additive pump 317 received from the one or more sensors 360 to perform a lookup in the fluorinated additive pump database 342 and identify the corresponding volumetric efficiency. The fluorinated additive pump database 342 may comprise an indication of the displacement (e.g., theoretical displacement) of the fluorinated additive pump 317.

The flow controller 330 may maintain another fire suppression additive pump database 343. The other fire suppression additive pump database 343 may comprise data regarding operation of the other fire suppression additive pump 319. For example, the other fire suppression additive pump database 343 may comprise a lookup table that maps the pump speed and discharge pressure of the other fire suppression additive pump 319 to volumetric efficiency. The controller 330 may use the pump speed and discharge pressure of the other fire suppression additive pump 319 received from the one or more sensors 361 to perform a lookup in the other fire suppression additive pump database 343 and identify the corresponding volumetric efficiency. The other fire suppression additive pump database 343 may comprise an indication of the displacement (e.g., theoretical displacement) of the other fire suppression additive pump 319.

The flow controller 330 may maintain a water pump database 338. The water pump database 338 may comprise data regarding operation of the water pump 308. For example, the water pump database 338 may comprise a plurality of lookup tables that map differential pressure and shaft input power to respective values of the second flow rate of the water pump 308. The plurality of lookup tables can each correspond to a respective water pump speed of the water pump 308.

The controller 336 may determine the foam concentrate flow rate outputted by the foam concentrate pump 316 based on various parameters regarding the foam concentrate and/or the foam concentrate pump 316. For example, the controller 336 may determine the foam concentrate flow rate outputted by the foam concentrate pump 316 based on at least one of the foam concentrate pump speed, the discharge pressure of the foam concentrate pump 316, the displacement of the foam concentrate pump 316, and the volumetric efficiency of the foam concentrate pump 316, such as by using a positive displacement foam concentration pump model. As such, the controller 336 need not rely on relatively complex or physically extensive flowmeters to determine the foam concentrate flow rate (e.g., flow meters may not be practical due to viscosity and non-Newtonian behaviors of the foam concentrate). For example, the controller 336 may determine the foam concentrate flow rate based on a foam concentrate pump model that correlates the at least one of the foam concentrate pump speed, discharge pressure, and volumetric efficiency to corresponding to foam concentrate flow rate values (e.g., the foam concentrate pump model may be a function such as a regression model).

The controller 336 may use the foam concentrate pump speed and the discharge pressure (or dynamic head) to retrieve a corresponding volumetric efficiency of the foam concentrate pump 316 from the foam concentrate pump database 340 (e.g., by performing bilinear interpolation using the foam concentrate pump speed and the discharge pressure (or dynamic head) from the foam concentrate pump 316). The controller 336 may determine the foam concentrate flow rate based on the foam concentrate pump speed, the theoretical displacement, and the volumetric efficiency, such as by applying these parameters (e.g., as measured by the sensors 358 or retrieved from the foam concentrate pump database 340) in the equation foam concentrate flow rate=foam concentrate pump speed*(displacement*volumetric efficiency). In an embodiment, the volumetric efficiency may be updated based on a foam concentrate temperature detected by the sensors 358.

The controller 336 may determine the fluorinated additive flow rate outputted by the foam concentrate pump 317 based on various parameters regarding the fluorinated additive and/or the fluorinated additive pump 317. For example, the controller 336 may determine the fluorinated additive flow rate outputted by the fluorinated additive pump 317 based on at least one of the fluorinated additive pump speed, the discharge pressure of the fluorinated additive pump 317, the displacement of the fluorinated additive pump 317, and the volumetric efficiency of the fluorinated additive pump 317, such as by using a positive displacement fluorinated additive pump model. As such, the controller 336 need not rely on relatively complex or physically extensive flowmeters to determine the fluorinated additive flow rate (e.g., flow meters may not be practical due to viscosity and non-Newtonian behaviors of the fluorinated additive). For example, the controller 336 may determine the fluorinated additive flow rate based on a fluorinated additive pump model that correlates the at least one of the fluorinated additive pump speed, discharge pressure, and volumetric efficiency to corresponding to fluorinated additive flow rate values (e.g., the fluorinated additive pump model may be function such as a regression model).

The controller 336 may use the fluorinated additive pump speed and the discharge pressure (or dynamic head) to retrieve a corresponding volumetric efficiency of the fluorinated additive pump 317 from the fluorinated additive pump database 342 (e.g., by performing bilinear interpolation using the fluorinated additive pump speed and the discharge pressure (or dynamic head) from the fluorinated additive pump 317). The controller 336 may determine the fluorinated additive flow rate based on the fluorinated additive pump speed, the theoretical displacement, and the volumetric efficiency, such as by applying these parameters (e.g., as measured by the sensors 360 or retrieved from the fluorinated additive pump database 342) in the equation fluorinated additive flow rate=fluorinated additive pump speed*(displacement*volumetric efficiency). In an embodiment, the volumetric efficiency may be updated based on a fluorinated additive temperature detected by the sensors 360.

The controller 336 may determine the other fire suppression additive flow rate outputted by the other fire suppression additive pump 319 based on various parameters regarding the other fire suppression additive and/or the other fire suppression additive pump 319. For example, the controller 336 may determine the other fire suppression additive flow rate outputted by the other fire suppression additive pump 319 based on at least one of the other fire suppression additive pump speed, the discharge pressure of the other fire suppression additive pump 319, the displacement of the other fire suppression additive pump 319, and the volumetric efficiency of the other fire suppression additive pump 319, such as by using a positive displacement other fire suppression additive pump model. As such, the controller 336 need not rely on relatively complex or physically extensive flowmeters to determine the other fire suppression additive flow rate (e.g., flow meters may not be practical due to viscosity and non-Newtonian behaviors of the other fire suppression additive). For example, the controller 336 may determine the other fire suppression additive flow rate based on an other fire suppression additive pump model that correlates the at least one of the other fire suppression additive pump speed, discharge pressure, and volumetric efficiency to corresponding to other fire suppression additive flow rate values (e.g., the other fire suppression additive pump model may be function such as a regression model).

The controller 336 may use the other fire suppression additive pump speed and the discharge pressure (or dynamic head) to retrieve a corresponding volumetric efficiency of the other fire suppression additive pump 319 from the other fire suppression additive pump database 343 (e.g., by performing bilinear interpolation using the other fire suppression additive pump speed and the discharge pressure (or dynamic head) from the other fire suppression additive pump 319). The controller 336 may determine the other fire suppression additive flow rate based on the other fire suppression additive pump speed, the theoretical displacement, and the volumetric efficiency, such as by applying these parameters (e.g., as measured by the sensors 361 or retrieved from the other fire suppression additive pump database 343) in the equation other fire suppression additive flow rate=other fire suppression additive pump speed*(displacement*volumetric efficiency). In an embodiment, the volumetric efficiency may be updated based on an other fire suppression additive temperature detected by the sensors 361.

The controller 336 may determine the water flow rate outputted by the water pump 308 based on various parameters regarding the water source 302 and/or the water pump 308. For example, the controller 336 may determine the water flow rate outputted by the water pump 308 based on at least one of the water pump speed, the differential pressure of the water pump 308, and the shaft input power of the water pump 308, such as by using a positive displacement water pump model. As such, the controller 336 need not rely on relatively complex or physically extensive flowmeters to determine the water flow rate. For example, the controller 336 may determine the water flow rate based on a water pump model that correlates the at least one of the water pump speed, the differential pressure of the water pump 308, and the shaft input power of the water pump 308 to corresponding water flow rate values (e.g., the water pump model can be a function such as a regression model). In an embodiment, the water pump model may be a pump curve model, such as one or more polynomial equations relating the water pump speed as an input to the water flow rate and an output. The water pump model may account for factors such as low flow or cavitation effect.

In an embodiment, the controller 336 may receive the water flow rate from a flow meter (e.g., a magnetic flow meter). However, the flow meter may be larger than desired in some cases.

The controller 336 may identify, based on the water pump speed, one or more lookup tables of the water pump database 338 having respective pump speeds that correspond to the water pump speed. As an example, if the water pump database 338 includes lookup tables corresponding to pump speeds of 500 rpm, 750 rpm, and 1000 rpm, and the water pump speed of the water pump 308 is 875 rpm, the controller 336 may identify the 750 rpm and 1000 rpm lookup tables based on the water pump speed of 875 rpm. Using the identified lookup tables, the controller 336 may determine the water flow rate. For example, as described above, each lookup table may map differential pressure and shaft input power to flow rate values. The controller 336 may use the differential pressure and shaft input power (e.g., as measured by the sensors 356) to retrieve the corresponding water flow rate from each identified lookup table. The controller 336 may interpolate between the water flow rates retrieved from each identified lookup table based on the water pump speed by applying weights to each retrieved water flow rate; for example, if the water pump speed is 875 rpm and the water flow rates are retrieved from the 750 rpm and 1000 rpm lookup tables, the controller 336 may apply a weight of 0.5 to each retrieved water flow rate (based on the value of 875 being halfway between 750 and 1000) to determine the water flow rate of the water pump 308.

The controller 336 may identify a target ratio of water and foam concentrate. The target ratio can correspond to a target concentration of foam concentrate in the foam solution 324 to be outputted by the system 300. For example, if the target concentration is three percent foam concentrate and the controller 336 determines the water flow rate to be 1000 gallons per minute (GPM), the controller 336 may determine, based on the target concentration (or corresponding target ratio), the foam concentrate flow rate (e.g., a target value of the foam concentrate flow rate to achieve the target ratio) to be 30 GPM. The controller 336 can maintain the target ratio in memory 334. In an embodiment, the target ratio of water and foam concentrate may be a predefined or default value.

The controller 336 may identify a target ratio of water and fluorinated additive. The target ratio can correspond to a target concentration of fluorinated additive in the foam solution 324 to be outputted by the system 300. For example, if the target concentration is one percent fluorinated additive and the controller 336 determines the water flow rate to be 1000 gallons per minute (GPM), the controller 336 may determine, based on the target concentration (or corresponding target ratio), the fluorinated additive flow rate (e.g., a target value of the fluorinated additive flow rate to achieve the target ratio) to be 10 GPM. The controller 336 can maintain the target ratio in memory 334. In an embodiment, the target ratio of water and fluorinated additive may be a predefined or default value.

The controller 336 may identify a target ratio of water and other fire suppression additive. The target ratio can correspond to a target concentration of other fire suppression additive in the foam solution 324 to be outputted by the system 300. For example, if the target concentration is three percent other fire suppression additive and the controller 336 determines the water flow rate to be 1000 gallons per minute (GPM), the controller 336 may determine, based on the target concentration (or corresponding target ratio), the other fire suppression additive flow rate (e.g., a target value of the other fire suppression additive flow rate to achieve the target ratio) to be 30 GPM. The controller 336 can maintain the target ratio in memory 334. In an embodiment, the target ratio of water and other fire suppression additive may be a predefined or default value.

The controller 336 may receive the target ratio(s) based on a user input received from the user interface 352. For example, the user interface 352 may receive user input indicating at least one of the target ratio or the target concentration. The user interface 352 may present user interface elements corresponding to options regarding the target ratio or target concentration (e.g., to adjust the target ratio or target concentration; to set the target ratio or target concentration to one or more predetermined values). The user interface 352 may present user interface elements corresponding to predetermined target ratios for particular classes of foam (e.g., fixed concentration options for class B foams). In an embodiment, the target ratio(s) may be a predefined or default value.

The controller 336 may control the foam concentrate flow rate based on the water flow rate and the target ratio of water and foam concentrate. For example, the controller 336 may generate a foam concentrate flow control signal 366 and provide the foam concentrate flow control signal 366 to the foam concentrate pump 316 to control operation of the foam concentrate pump 316. The controller 336 may generate the foam concentrate flow control signal 366 to indicate a target value of the foam concentrate flow rate that the controller 336 determines based on the water flow rate and the target ratio. The controller 336 may use the foam concentrate flow control signal 366 to cause the foam concentrate pump 316 to adjust the foam concentrate flow rate so that a ratio of the foam concentrate flow rate to the water flow rate corresponds to the target ratio. For example, the controller 336 may use the foam concentrate flow control signal 366 to control the foam concentrate pump speed for the foam concentrate pump 316.

The controller 336 may control the fluorinated additive flow rate based on the water flow rate and the target ratio of water and fluorinated additive. For example, the controller 336 may generate a fluorinated additive flow control signal 368 and provide the fluorinated additive flow control signal 368 to the fluorinated additive pump 317 to control operation of the fluorinated additive pump 317. The controller 336 may generate the fluorinated additive flow control signal 368 to indicate a target value of the fluorinated additive flow rate that the controller 336 determines based on the water flow rate and the target ratio. The controller 336 may use the fluorinated additive flow control signal 368 to cause the fluorinated additive pump 317 to adjust the fluorinated additive flow rate so that a ratio of the fluorinated additive flow rate to the water flow rate corresponds to the target ratio. For example, the controller 336 may use the fluorinated additive flow control signal 368 to control the fluorinated additive pump speed for the fluorinated additive pump 317.

The controller 336 may control the other fire suppression additive flow rate based on the water flow rate and the target ratio of water and other fire suppression additive. For example, the controller 336 may generate another fire suppression additive flow control signal 370 and provide the other fire suppression additive flow control signal 370 to the other fire suppression additive pump 319 to control operation of the other fire suppression additive pump 319. The controller 336 may generate the other fire suppression additive flow control signal 370 to indicate a target value of the other fire suppression additive flow rate that the controller 336 determines based on the water flow rate and the target ratio. The controller 336 may use the other fire suppression additive flow control signal 370 to cause the other fire suppression additive pump 319 to adjust the other fire suppression additive flow rate so that a ratio of the other fire suppression additive flow rate to the water flow rate corresponds to the target ratio. For example, the controller 336 may use the other fire suppression additive flow control signal 370 to control the other fire suppression pump speed for the other fire suppression pump 319.

The flow controller 330 may comprise communications electronics 372. The communications electronics 372 may be used to communicate with the user interface 352, the sensors 356, 358, 360, 361, the pumps 308, 316, 317, 319, and various other remote devices. For example, the controller 336 may provide the foam concentrate flow control signal 366 to the foam concentrate pump 316 via the communications electronics 372; the controller 336 may provide the fluorinated additive flow control signal 368 to the fluorinated additive pump 317 via the communications electronics 372 and/or the controller 336 may provide the other fire suppression additive flow control signal 370 to the other fire suppression additive pump 319 via the communications electronics 372. The communications electronics 372 may comprise wired or wireless interfaces (e.g., jacks, antennas, transmitters, receivers, transceivers, wire terminals, etc.) for conducting data communications with various systems, devices, or networks. For example, the communications electronics 372 may comprise an Ethernet card and port for sending and receiving data via an Ethernet-based communications network. The communications electronics 372 may comprise a Wi-Fi transceiver for communicating via a wireless communications network. The communications electronics 372 may communicate via local area networks (e.g., a building LAN), wide area networks (e.g., the Internet, a cellular network), and/or conduct direct communications (e.g., NFC, Bluetooth). The communications electronics 372 may conduct wired and/or wireless communications. For example, the communications electronics 372 may comprise one or more wireless transceivers (e.g., a Wi-Fi transceiver, a Bluetooth transceiver, a NFC transceiver, a cellular transceiver).

In an embodiment, a foam injection system comprises: a foam concentrate pump fluidly connected to a foam concentrate tank; a fluorinated additive pump fluidly connected to a fluorinated additive tank; a water pump fluidly connected to a water source; and a flow controller comprising one or more processors and computer-readable instructions that when executed by the one or more processors, cause the one or more processors to: determine a water flow rate outputted by the water pump; determine a foam concentrate flow rate outputted by the foam concentrate pump; identify a target ratio of water and foam concentrate; identify a target ratio of water and fluorinated additive; control the foam concentrate flow rate based on the water flow rate and the target ratio of water and foam concentrate; and control the fluorinated additive flow rate based on the water flow rate and the target ratio of water and fluorinated additive.

In an embodiment, the system further comprises: an other fire suppression additive pump fluidly connected to an other fire suppression additive tank; and computer readable instructions that when executed by the one or more processors, cause the one or more processors to: determine an other fire suppression additive flow rate outputted by the other fire suppression additive pump; identify a target ratio of water and other fire suppression additive; control the other fire suppression additive flow rate based on the water flow rate and the target ratio of water and other fire suppression additive.

In an embodiment, the system further comprises: the flow controller determining the foam concentrate flow rate based on a foam concentrate pump speed of the foam concentrate pump, a discharge pressure of the foam concentrate pump, a displacement of the foam concentrate pump, and a volumetric efficiency of the foam concentrate pump.

In an embodiment, the system further comprises: the flow controller determining the water flow rate based on a water pump speed of the water pump, a differential pressure of the water pump, and a shaft input power of the water pump.

In an embodiment, the system further comprises: the flow controller determining the fluorinated additive flow rate based on a fluorinated additive pump speed of the fluorinated additive pump, a discharge pressure of the fluorinated additive pump, a displacement of the fluorinated additive pump, and a volumetric efficiency of the fluorinated additive pump.

In an embodiment, the system further comprises: the flow controller determining the other fire suppression additive flow rate based on an other fire suppression additive pump speed of the other fire suppression additive pump, a discharge pressure of the other fire suppression additive pump, a displacement of the other fire suppression additive pump, and a volumetric efficiency of the other fire suppression additive pump.

In an embodiment, the foam concentrate pump comprises a positive displacement pump. In an embodiment, the foam concentrate pump comprises a manual override input.

In an embodiment, the fluorinated additive pump comprises a positive displacement pump. In an embodiment, the fluorinated additive pump comprises a manual override input.

In an embodiment, the other fire suppression additive pump comprises a positive displacement pump. In an embodiment, the other fire suppression additive pump comprises a manual override input.

In an embodiment, the system further comprises: a mixing point or proportioner that receives the water from the water pump and the foam concentrate from the foam concentrate pump and outputs a foam solution.

In an embodiment, the system further comprises: a mixing point or proportioner that receives the water from the water pump and the foam concentrate from the foam concentrate pump and outputs a foam solution; and one or more pipes that provide a first flow rate of the water from the water pump to the mixing point or proportioner and a second flow rate of the water from the water pump to a separate outlet from the mixing point or proportioner.

In an embodiment, the system further comprises: a mixing point or proportioner that receives the water from the water pump and the fluorinated additive from the fluorinated additive pump and outputs a fluorinated additive solution.

In an embodiment, the system further comprises: a mixing point or proportioner that receives the water from the water pump and the other fire suppression additive from the other fire suppression additive pump and outputs another fire suppression additive solution.

In an embodiment, the system further comprises: the foam concentrate pump directly injecting the foam concentrate into the water from the water pump.

In an embodiment, the system further comprises: the fluorinated additive pump directly injecting the fluorinated additive into the water from the water pump.

In an embodiment, the system further comprises: the other fire suppression additive pump directly injecting the other fire suppression additive into the water from the water pump.

Alternative Computing Device for Foam Injection System

Figure 4:
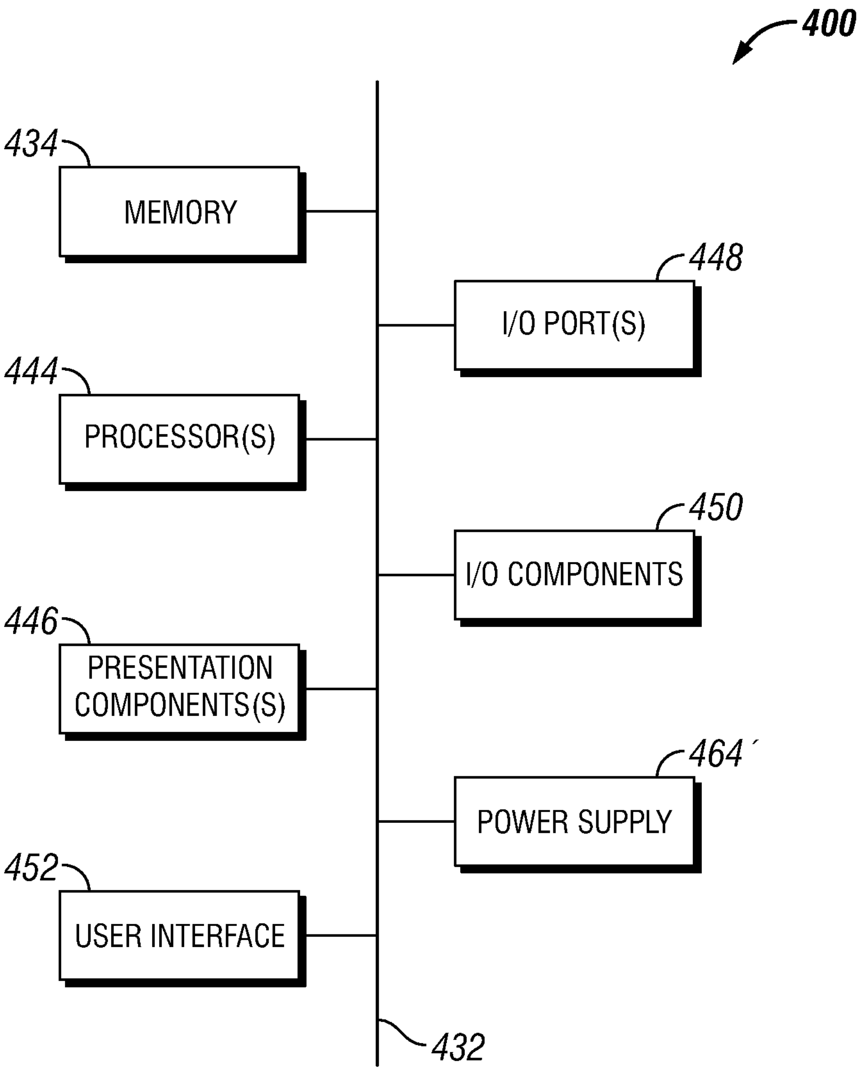
FIG. 4 is a block diagram of an exemplary computing device for the foam injection system of FIGS. 1A-3B.

FIG. 4 illustrates a schematic diagram of an alternative computing device for the foam injection system 100, 200, 300 according to an embodiment of the present invention. Referring to the drawings in general, and initially to FIGS. 1A-4 and to FIGS. 3B and 4 in particular, an exemplary operating environment for implementing embodiments of the present invention is shown and designated generally as a computing device 400 for the foam injection system 100, 200, 300. The computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

Embodiments of the invention may be described in the general context of computer code or machine-executable instructions stored as program modules or objects and executable by one or more computing devices, such as a laptop, server, mobile device, tablet, etc. Generally, program modules including routines, programs, objects, components, data structures, etc., refer to code that perform particular tasks or implement particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks may be performed by remote-processing devices that may be linked through a communications network.

With continued reference to FIG. 4, the computing device 400 of the foam injection system 100, 200, 300 includes a bus 432 that directly or indirectly couples the following devices: memory 434, one or more processors 444, one or more presentation components 446, one or more input/output (I/O) ports 448, I/O components 450, a user interface 452 and an illustrative power supply 464'. The bus 432 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be fuzzy. For example, one may consider a presentation component such as a display device to be an I/O component. Additionally, many processors have memory. The inventors recognize that such is the nature of the art, and reiterate that the diagram of FIG. 4 is merely illustrative of an exemplary computing device that can be used in connection with one or more embodiments of the present invention. Further, a distinction is not made between such categories as "workstation," "server," "laptop," "mobile device," etc., as all are contemplated within the scope of FIG. 4 and reference to "computing device."

The computing device 400 of the foam injection system 100, 200, 300 typically includes a variety of computer-readable media. Computer-readable media can be any available media that can be accessed by the computing device 400 and includes both volatile and nonvolatile media, removable and non-removable media. By way of example, and not limitation, computer-readable media may comprise computer-storage media and communication media. The computer-storage media includes volatile and nonvolatile, removable and non-removable media implemented in any method or technology for storage of information such as computer-readable instructions, data structures, program modules or other data. Computer-storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 400.

The memory 434 includes computer-storage media in the form of volatile and/or nonvolatile memory. The memory 434 may be removable, non-removable, or a combination thereof. Suitable hardware devices include solid-state memory, hard drives, optical-disc drives, etc.

The memory 434 includes a controller 436, and one or more foam pump database 438, fluorinated additive pump database 440 and dual polysaccharide pump database 442.

The computing device 400 of the foam injection system 100, 200, 300 includes one or more processors 444 that read data from various entities such as the memory 434 or the I/O components 450.

The presentation component(s) 446 present data indications to a user or other device. In an embodiment, the computing device 400 outputs present data indications including water flow rate, foam concentrate flow rate, fluorinated additive flow rate, dual polysaccharide concentrate flow rate and/or the like to a presentation component 446. Suitable presentation components 446 include a display device, speaker, printing component, vibrating component, and the like.

The user interface 452 allows the user to input/output information to/from the computing device 400. Suitable user interfaces 452 include keyboards, key pads, touch pads, graphical touch screens, and the like. For example, the user may input a target ratio of water and foam concentrate, a target ratio of water and fluorinated additive and/or a target ratio of water and other fire suppression additive into the computing device 400 or output a water flow rate, a foam concentrate flow rate, a fluorinated additive flow rate, and/or a dual polysaccharide concentrate flow rate to the presentation component 316 such as a display. In some embodiments, the user interface 452 may be combined with the presentation component 446, such as a display and a graphical touch screen. In some embodiments, the user interface 452 may be a portable hand-held device. The use of such devices is well-known in the art.

The one or more I/O ports 448 allow the computing device 400 to be logically coupled to other devices in the foam injection system 100, 200, 300 including:

- the pump 108, the proportioner 110, the foam concentrate control/metering valve 116, the fluorinated additive control valve 118, the other fire suppression additive (e.g., dual polysaccharide foam concentrate) control valve 119 (see FIGS. 1A-1D),
- the pump 208, the proportioner 210, the foam concentrate metering valve 216, the fluorinated additive metering valve 217, the other fire suppression additive (e.g., dual polysaccharide foam concentrate) metering valve 228 (see FIGS. 2A-2D),
- the water pump 308, the mixing point or proportioner 310, the foam concentrate pump 316, fluorinated additive pump 317, the other fire suppression additive (e.g., dual polysaccharide foam concentrate) pump 328 (see e.g., FIGS. 3A-3B), and other I/O components 450, some of which may be built in. Examples of other I/O components 450 include a printer, scanner, wireless device, and the like.

In an embodiment, a non-transitory computer-readable medium comprises processor-executable instructions that when executed by one or more processors, cause the one or more processors to: determine a foam concentrate flow rate outputted by a foam concentrate pump; determine a water flow rate outputted by a water pump; determine a fluorinated additive flow rate outputted by a fluorinated additive pump; identify a target ratio of water and foam concentrate; identify a target ratio of water and fluorinated additive; control the foam concentrate flow rate based on the water flow rate and the target ratio of water and foam concentrate; and control the fluorinated additive flow rate based on the water flow rate and the target ratio of water and fluorinated additive.

In an embodiment, the method further comprises: optionally, determine an other fire suppression additive flow rate outputted by an other fire suppression additive pump; optionally, identify a target ratio of water and other fire suppression additive; and optionally, control the other fire suppression additive flow rate based on the water flow rate and the target ratio of water and other fire suppression additive.

In an embodiment, the method further comprises: instructions that cause the one or more processors to: adjust the foam concentrate flow rate so that a ratio of the foam concentrate flow rate to the water flow rate corresponds to the target ratio of water and foam concentrate.

In an embodiment, the method further comprises: instructions that cause the one or more processors to: adjust the fluorinated additive flow rate so that a ratio of the fluorinated additive flow rate to the water flow rate corresponds to the target ratio of water and fluorinated additive.

In an embodiment, the method further comprises: instructions that cause the one or more processors to: optionally, adjust the other fire suppression additive flow rate so that a ratio of the other fire suppression additive flow rate to the water flow rate corresponds to the target ratio of water and other fire suppression additive.

In an embodiment, the method further comprises: instructions that cause the one or more processors to: determine the foam concentrate flow rate based on a foam concentrate pump speed of the foam concentrate pump, a discharge pressure of the foam concentrate pump, a displacement of the foam concentrate pump, and a volumetric efficiency of the foam concentrate pump.

In an embodiment, the method further comprises: instructions that cause the one or more processors to: determine the water flow rate based on a water pump speed of the water pump, a differential pressure of the water pump, and a shaft input power of the water pump.

In an embodiment, the method further comprises: instructions that cause the one or more processors to: determine the fluorinated additive flow rate based on a fluorinated additive pump speed of the fluorinated additive pump, a discharge pressure of the fluorinated additive pump, a displacement of the fluorinated additive pump, and a volumetric efficiency of the fluorinated additive pump.

In an embodiment, the method further comprises: instructions that cause the one or more processors to: optionally, determine the other fire suppression additive flow rate based on an other fire suppression additive pump speed of the other fire suppression additive pump, a discharge pressure of the other fire suppression additive pump, a displacement of the other fire suppression additive pump, and a volumetric efficiency of the other fire suppression additive pump.

Method for Controlling Foam Injection System

Figure 5A:
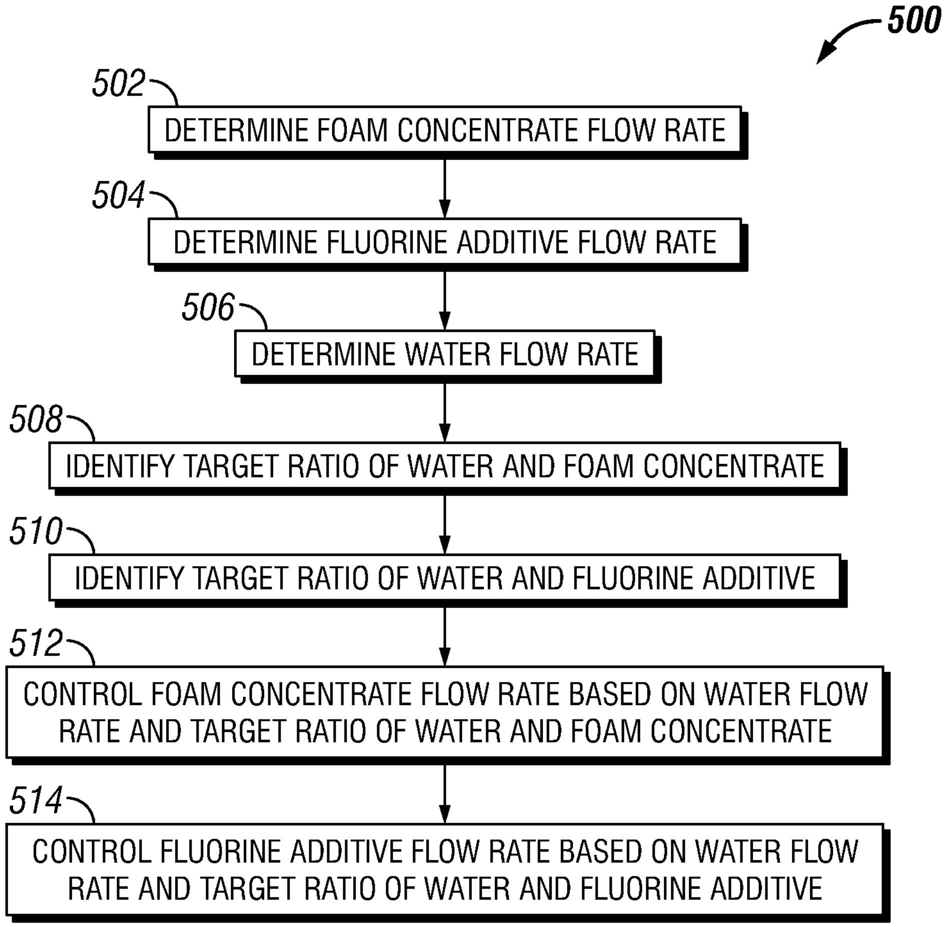
FIG. 5A is a flow diagram of a method for controlling the foam injection system of FIGS. 1A-3B.
Figure 5B:
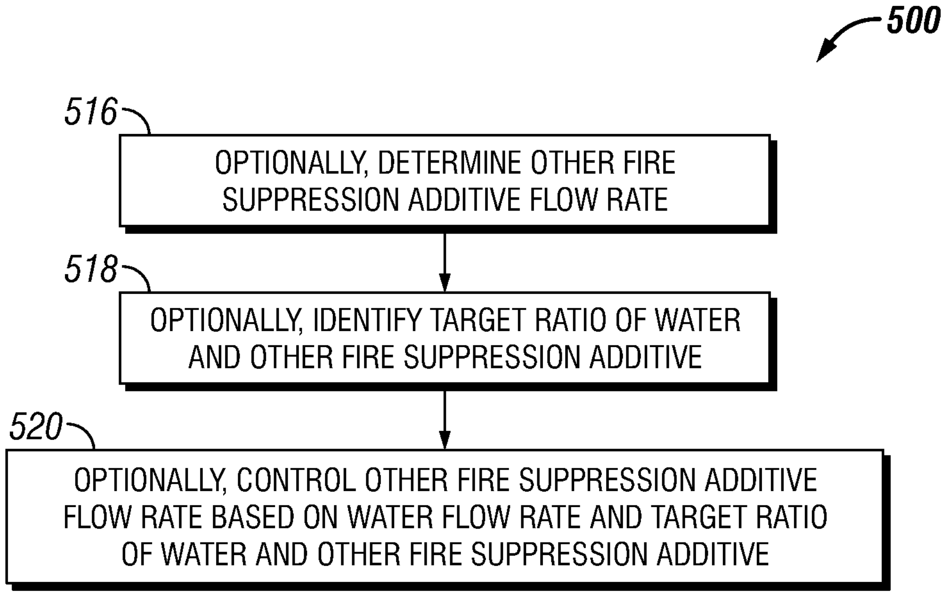
FIG. 5B is a flow diagram of a method for controlling the foam injection system, showing optional steps.

FIG. 5A is a flow diagram of a method for controlling a foam injection system; and FIG. 5B is a flow diagram of a method for controlling the foam injection system, showing optional steps. At least one embodiment relates to a method of controlling a foam injection system 500 comprising: (a) determining a foam concentrate flow rate 502; (b) determining a fluorinated additive flow rate 504; (c) determining a water flow rate 506; (d) identifying a target ratio of water and foam concentrate 508; (e) identifying a target ratio of water and fluorinated additive 510; (f) controlling the foam concentrate flow rate based on the water flow rate and the target ratio of water and foam concentrate 512; and (g) controlling the fluorinated additive flow rate based on the water flow rate and the target ratio of water and fluorinated additive 514.

In an embodiment, the water flow rate outputted by the water source or water pump coupled to the water supply may be determined. In an embodiment, the water flow rate may be determined using a flow meter. In an embodiment, the water flow rate may be determined based on operation of the water pump, as discussed above.

In an embodiment, the target ratio of water and foam concentrate may be identified. The target ratio may correspond to a target concentration of foam concentrate in the foam solution to be discharged. The target ratio may be retained in memory. The target ratio may be determined based on operator input indicating the target ratio (or target concentration).

In an embodiment, a target foam concentration flow rate may be determined based on the target ratio of water and foam concentrate and the water flow rate. The target foam concentrate flow rate may correspond to the foam concentrate flow rate outputted by the foam concentrate pump so that a ratio of foam concentrate and water meets the target ratio of water and foam concentrate. The target foam concentrate flow rate may be achieved by controlling the foam concentrate pump speed of the foam concentrate pump. The target foam concentrate flow rate may be determined by applying the target ratio of water and foam concentrate to the water flow rate.

In an embodiment, the foam concentrate pump may be controlled to achieve the target foam concentrate flow rate. For example, the foam concentrate pump may be controlled by identifying a target parameter of operation of the foam concentrate pump (e.g., foam concentrate pump speed), determining the foam concentration flow rate (e.g., a current or actual foam concentration flow rate), and adjusting the foam concentration pump speed to achieve the target foam concentration flow rate based on the determined foam concentration flow rate. Various processes or algorithms may be applied to control the target parameter of operation for the foam concentration pump, such as a proportional-integral-derivate (PID) algorithm.

In an embodiment, the foam concentrate flow rate may be determined based on various parameters regarding operation of the foam concentrate pump. For example, the foam concentrate pump may be characterized by parameter such as displacement, pump speed, discharge pressure and volumetric efficiency. The parameters may be received from the foam concentrate pump or from the one or more sensors associated with the foam concentrate pump. The foam concentrate flow rate may be determined based on at least one of the foam concentrate pump speed, the discharge pressure of the foam concentrate pump, the displacement of the foam concentrate pump and the volumetric efficiency of the foam concentrate pump. For example, the foam concentrate flow rate may be determined by applying at least one of the foam concentration pump speed, the discharge pressure of the foam concentrate pump, the displacement of the foam concentrate pump and the volumetric efficiency of the foam concentrate pump to a foam concentration pump model (e.g., a function such as a regression model). The foam concentrate flow rate may be determined by retrieving, from one or more lookup tables, the volumetric efficiency (e.g., using the foam concentrate pump speed and discharge pressure of the foam concentrate pump) and determining a foam concentrate flow rate based on the volumetric efficiency of the foam concentrate pump, displacement of the foam concentrate pump and the foam concentrate pump speed.

In an embodiment, a target foam concentrate pump speed may be determined based on the target foam concentrate flow rate. To control the foam concentrate pump, a flow control signal may be generated that indicates the target foam concentrate pump speed, and that, when transmitted to the foam concentrate pump, causes the foam concentrate pump to output the foam concentrate at the target foam concentrate flow rate. For example, the PID algorithm may be used to generate the foam concentrate flow control signal to indicate the target foam concentrate flow rate. In an embodiment, the foam concentrate flow control signal may be generated and transmitted in an iterative manner (e.g., by performing a control loop), such that the target foam concentrate pump speed may be determined based on the target foam concentrate flow rate, the current or actual foam concentrate flow rate may be based on operation of the foam concentrate pump (e.g., based on at least one of the foam concentrate pump speed, the discharge pressure of the foam concentrate pump, the displacement of the foam concentrate pump, and the volumetric efficiency of the foam concentrate pump), and the target foam concentrate pump speed may be iteratively adjusted until the current or actual foam concentrate flow rate meets the target foam concentrate flow rate.

In an embodiment, the foam concentrate may be injected into the water outputted from the water pump. A mixing point or proportioner may receive the water from the water pump and the foam concentrate from the foam concentrate pump. The mixing point or proportioner may be used to combine the foam concentrate and water to achieve the target ratio of water and foam concentrate to form a foam solution to be discharge to address a hazard.

In an embodiment, the foam concentrate pump may be operated in a manual override mode. For example, the foam concentrate pump may receive input from an operator indicating the foam concentrate pump speed and adjust the foam concentrate pump speed based on the received operator input. In an embodiment, the foam concentrate pump may switch from a first state in which the foam concentrate pump operates responsive to a foam concentrate flow control signal from the flow controller to a second state in which the foam concentrate pump operates responsive to operator input.

In an embodiment, the target ratio of water and fluorinated additive may be identified. The target ratio may correspond to a target concentration of fluorinated additive in the foam solution to be discharged. The target ratio may be retained in memory. The target ratio may be determined based on operator input indicating the target ratio (or target concentration).

In an embodiment, a target fluorinated additive flow rate may be determined based on the target ratio of water and fluorinated additive and the water flow rate. The target fluorinated additive flow rate may correspond to the fluorinated additive flow rate outputted by the fluorinated additive pump so that a ratio of fluorinated additive and water meets the target ratio of water and fluorinated additive. The target fluorinated additive flow rate may be achieved by controlling the fluorinated additive pump speed of the fluorinated additive pump. The target fluorinated additive flow rate may be determined by applying the target ratio of water and fluorinated additive to the water flow rate.

In an embodiment, the fluorinated additive pump may be controlled to achieve the target fluorinated additive flow rate. For example, the fluorinated additive pump may be controlled by identifying a target parameter of operation of the fluorinated additive pump (e.g., fluorinated additive pump speed), determining the fluorinated additive flow rate (e.g., a current or actual fluorinated additive flow rate), and adjusting the fluorinated additive pump speed to achieve the target fluorinated additive flow rate based on the determined fluorinated additive flow rate. Various processes or algorithms may be applied to control the target parameter of operation for the fluorinated additive pump, such as a proportional-integral-derivate (PID) algorithm.

In an embodiment, the fluorinated additive flow rate may be determined based on various parameters regarding operation of the fluorinated additive pump. For example, the fluorinated additive pump may be characterized by parameters such as displacement, pump speed, discharge pressure and volumetric efficiency. The parameters may be received from the fluorinated additive pump or from the one or more sensors associated with the fluorinated additive pump. The fluorinated additive flow rate may be determined based on at least one of the fluorinated additive pump speed, the discharge pressure of the fluorinated additive pump, the displacement of the fluorinated additive pump and the volumetric efficiency of the fluorinated additive pump. For example, the fluorinated additive flow rate may be determined by applying at least one of the fluorinated additive pump speed, the discharge pressure of the fluorinated additive pump, the displacement of the fluorinated additive pump and the volumetric efficiency of the fluorinated additive pump to a fluorinated additive pump model (e.g., a function such as a regression model). The fluorinated additive flow rate may be determined by retrieving, from one or more lookup tables, the volumetric efficiency (e.g., using the fluorinated additive pump speed and discharge pressure of the fluorinated additive pump) and determining a fluorinated additive flow rate based on the volumetric efficiency of the fluorinated additive pump, displacement of the fluorinated additive pump and the fluorinated additive pump speed.

In an embodiment, a target fluorinated additive pump speed may be determined based on the target fluorinated additive flow rate. To control the fluorinated additive pump, a flow control signal may be generated that indicates the target fluorinated additive pump speed, and that, when transmitted to the fluorinated additive pump, causes the fluorinated additive pump to output the fluorinated additive at the target fluorinated additive flow rate. For example, the PID algorithm may be used to generate the fluorinated additive flow control signal to indicate the target fluorinated additive flow rate. In an embodiment, the fluorinated additive flow control signal may be generated and transmitted in an iterative manner (e.g., by performing a control loop), such that the target fluorinated additive pump speed may be determined based on the target fluorinated additive flow rate, the current or actual fluorinated additive flow rate may be based on operation of the fluorinated additive pump (e.g., based on at least one of the fluorinated additive pump speed, the discharge pressure of the fluorinated additive pump, the displacement of the fluorinated additive pump, and the volumetric efficiency of the fluorinated additive pump), and the target fluorinated additive pump speed may be iteratively adjusted until the current or actual fluorinated additive flow rate meets the target fluorinated additive flow rate.

In an embodiment, the fluorinated additive may be injected into the water outputted from the water pump. A mixing point or proportioner may receive the water from the water pump and the fluorinated additive from the fluorinated additive pump. The mixing point or proportioner may be used to combine the fluorinated additive and water to achieve the target ratio of water and fluorinated additive to form a foam solution to be discharge to address a hazard.

In an embodiment, the fluorinated additive pump may be operated in a manual override mode. For example, the fluorinated additive pump may receive input from an operator indicating the fluorinated additive pump speed and adjust the fluorinated additive pump speed based on the received operator input. In an embodiment, the fluorinated additive pump may switch from a first state in which the fluorinated additive pump operates responsive to a fluorinated additive flow control signal from the flow controller to a second state in which the fluorinated additive pump operates responsive to operator input.

In an embodiment, the method 500 further comprises, optionally, determining an other fire suppression additive flow rate 516; optionally, identifying a target ratio of water and other fire suppression additive 518; and optionally, controlling the other fire suppression additive flow rate based on the water flow rate and the target ratio of water and other fire suppression additive 520.

In an embodiment, the target ratio of water and foam other fire suppression additive may be identified. The target ratio may correspond to a target concentration of other fire suppression additive in the foam solution to be discharged. The target ratio may be retained in memory. The target ratio may be determined based on operator input indicating the target ratio (or target concentration).

In an embodiment, a target other fire suppression additive flow rate may be determined based on the target ratio of water and other fire suppression additive and the water flow rate. The target other fire suppression additive flow rate may correspond to the other fire suppression additive flow rate outputted by the other fire suppression additive pump so that a ratio of other fire suppression additive and water meets the target ratio of water and other fire suppression additive. The target other fire suppression additive flow rate may be achieved by controlling the other fire suppression additive pump speed of the other fire suppression pump. The target other fire suppression flow rate may be determined by applying the target ratio of water and other fire suppression additive to the water flow rate.

In an embodiment, the other fire suppression additive pump may be controlled to achieve the target other fire suppression additive flow rate. For example, the other fire suppression additive pump may be controlled by identifying a target parameter of operation of the other fire suppression additive pump (e.g., other fire suppression additive pump speed), determining the other fire suppression additive flow rate (e.g., a current or actual other fire suppression additive flow rate), and adjusting the other fire suppression additive pump speed to achieve the target other fire suppression additive flow rate based on the determined other fire suppression additive flow rate. Various processes or algorithms may be applied to control the target parameter of operation for the other fire suppression additive pump, such as a proportional-integral-derivate (PID) algorithm.

In an embodiment, the other fire suppression additive flow rate may be determined based on various parameters regarding operation of the other fire suppression additive pump. For example, the other fire suppression additive pump may be characterized by parameters such as displacement, pump speed, discharge pressure and volumetric efficiency. The parameters may be received from the other fire suppression additive pump or from the one or more sensors associated with the other fire suppression additive pump. The other fire suppression additive flow rate may be determined based on at least one of the other fire suppression additive pump speed, the discharge pressure of the other fire suppression additive pump, the displacement of the other fire suppression additive pump and the volumetric efficiency of the other fire suppression additive pump. For example, the other fire suppression additive flow rate may be determined by applying at least one of the other fire suppression additive pump speed, the discharge pressure of the other fire suppression additive pump, the displacement of the other fire suppression additive pump and the volumetric efficiency of the other fire suppression additive pump to an other fire suppression additive pump model (e.g., a function such as a regression model). The other fire suppression additive flow rate may be determined by retrieving, from one or more lookup tables, the volumetric efficiency (e.g., using the other fire suppression additive pump speed and discharge pressure of the other fire suppression additive pump) and determining an other fire suppression additive flow rate based on the volumetric efficiency of the other fire suppression additive pump, displacement of the other fire suppression additive pump and the other fire suppression additive pump speed.

In an embodiment, a target other fire suppression additive pump speed may be determined based on the target other fire suppression additive flow rate. To control the other fire suppression additive pump, a flow control signal may be generated that indicates the target other fire suppression additive pump speed, and that, when transmitted to the other fire suppression additive pump, causes the other fire suppression additive pump to output the other fire suppression additive at the target other fire suppression additive flow rate. For example, the PID algorithm may be used to generate the other fire suppression additive flow control signal to indicate the target other fire suppression additive flow rate. In an embodiment, the other fire suppression additive flow control signal may be generated and transmitted in an iterative manner (e.g., by performing a control loop), such that the target other fire suppression additive pump speed may be determined based on the target other fire suppression additive flow rate, the current or actual other fire suppression additive flow rate may be based on operation of the other fire suppression additive pump (e.g., based on at least one of the other fire suppression additive pump speed, the discharge pressure of the other fire suppression additive pump, the displacement of the other fire suppression additive pump, and the volumetric efficiency of the other fire suppression additive pump), and the target other fire suppression additive pump speed may be iteratively adjusted until the current or actual other fire suppression additive flow rate meets the target other fire suppression additive flow rate.

In an embodiment, the other fire suppression additive may be injected into the water outputted from the water pump. A mixing point or proportioner may receive the water from the water pump and the other fire suppression additive from the other fire suppression additive pump. The mixing point or proportioner may be used to combine the other fire suppression additive and water to achieve the target ratio of water and other fire suppression additive to form a foam solution to be discharge to address a hazard.

In an embodiment, the other fire suppression additive pump may be operated in a manual override mode. For example, the other fire suppression additive pump may receive input from an operator indicating the other fire suppression additive pump speed and adjust the other fire suppression additive pump speed based on the received operator input. In an embodiment, the other fire suppression additive pump may switch from a first state in which the other fire suppression additive pump operates responsive to an other fire suppression additive flow control signal from the flow controller to a second state in which the other fire suppression additive pump operates responsive to operator input.

In an embodiment, the method comprises: determining, by one or more processors, a foam concentrate flow rate of foam outputted by a foam concentrate pump; determining, by the one or more processors, a water flow rate outputted by a water pump; determining, by the one or more processors, a fluorinated additive flow rate, outputted by a fluorinated additive pump; identifying, by the one or more processors, a target ratio of water and foam concentrate; determining, by the one or more processors, identifying, by the one or more processors, a target ratio of water and fluorinated additive; controlling, by the one or more processors, the foam concentrate flow rate based on the water flow rate and the target ratio of water and foam concentrate; and controlling, by the one or more processors, the fluorinated additive flow rate based on the water flow rate and the target ratio of water and fluorinated additive.

In an embodiment, the method further comprises, optionally, determining, by the one or more processors, an other fire suppression additive flow rate outputted by an other fire suppression additive pump; optionally, identifying, by the one or more processors, a target ratio of water and other fire suppression additive; and optionally, controlling, by the one or more processors, the other fire suppression additive flow rate based on the water flow rate and the target ratio of water and other fire suppression additive.

In an embodiment, the method further comprises: determining, by the one or more processors, the foam concentrate flow rate based on a foam concentrate pump speed of the foam concentrate pump, a discharge pressure of the foam concentrate pump, a displacement of the foam concentrate pump, and a volumetric efficiency of the foam concentrate pump.

In an embodiment, the method further comprises: determining, by the one or more processors, the water flow rate based on a water pump speed of the water pump, a differential pressure of the water pump, and a shaft input power of the water pump.

In an embodiment, the method further comprises: determining, by the one or more processors, the fluorinated additive flow rate based on a fluorinated additive pump speed of the fluorinated additive pump, a discharge pressure of the fluorinated additive pump, a displacement of the fluorinated additive pump, and a volumetric efficiency of the fluorinated additive pump.

In an embodiment, the method further comprises: optionally, determining, by the one or more processors, the other fire suppression additive flow rate based on an other fire suppression additive pump speed of the other fire suppression additive pump, a discharge pressure of the other fire suppression additive pump, a displacement of the other fire suppression additive pump, and a volumetric efficiency of the other fire suppression additive pump.

In an embodiment, the foam concentrate pump comprises a positive displacement pump. In an embodiment, the foam concentrate pump comprises a manual override input.

In an embodiment, the fluorinated additive pump comprises a positive displacement pump. In an embodiment, the fluorinated additive pump comprises a manual override input.

In an embodiment, the other fire suppression additive pump comprises a positive displacement pump. In an embodiment, the other fire suppression additive pump comprises a manual override input.

In an embodiment, the method further comprises: receiving, by a mixing point or proportioner, the water from the water pump and the foam concentrate from the foam concentrate pump; and outputting, by the mixing point or proportioner, a foam solution.

In an embodiment, the method further comprises: receiving, by a mixing point or proportioner, the water from the water pump and the fluorinated additive from the fluorinated additive pump; and outputting, by the mixing point or proportioner, a fluorinated additive solution.

In an embodiment, the method further comprises: optionally, receiving, by a mixing point or proportioner, the water from the water pump and the other fire suppression additive from the other fire suppression additive pump; and outputting, by the mixing point or proportioner, an other fire suppression additive solution.

In an embodiment, the method further comprises: receiving, by a mixing point or proportioner, the water from the water pump and the foam concentrate from the foam concentrate pump; and providing, via one or more pipes, a first water flow from the water pump to the mixing point or proportioner and a second water flow from the water pump to a separate outlet from the mixing point or proportioner.

In an embodiment, the method further comprises: directly injecting, by the foam concentrate pump, the foam concentrate into the water from the water pump.

In an embodiment, the method further comprises: directly injecting, by the fluorinated additive pump, the fluorinated additive into the water from the water pump.

In an embodiment, the method further comprises: directly injecting, by the other fire suppression additive pump, the other fire suppression additive into the water from the water pump.

Decision Tree for Hazard Response Management

Figure 6:
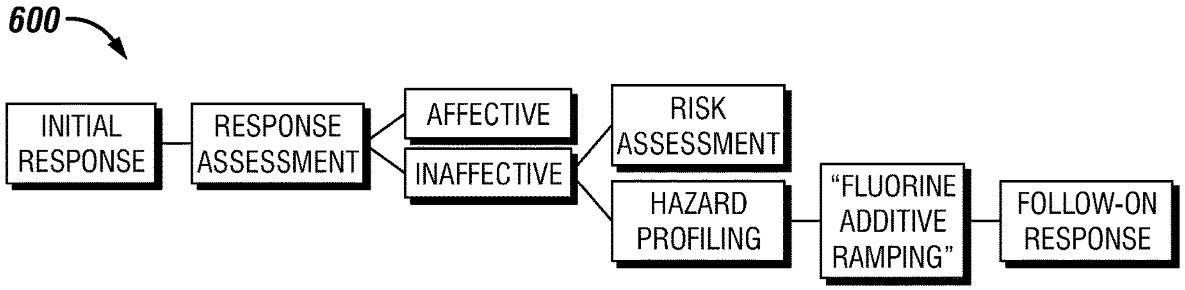
FIG. 6 is an exemplary decision tree for a hazard response management according to an embodiment.

FIG. 6 is an exemplary decision tree for a hazard response management according to an embodiment.

As shown in FIG. 6, an initial hazard response is accessed if the initial hazard response is affective in extinguishing or suppressing the hazard. If not, the hazard risk is accessed and the hazard is profiled, as discussed further below. In an embodiment, the hazard may be a flammable liquid fire or flammable vapor.

In an embodiment, an initial amount of fluorinated additive is added or injected into the foam solution, as discussed further below.

In an embodiment, the initial amount of fluorinated additive may be decreased or increased as needed.

Method of Proportioning Finished Foam

Figure 7:
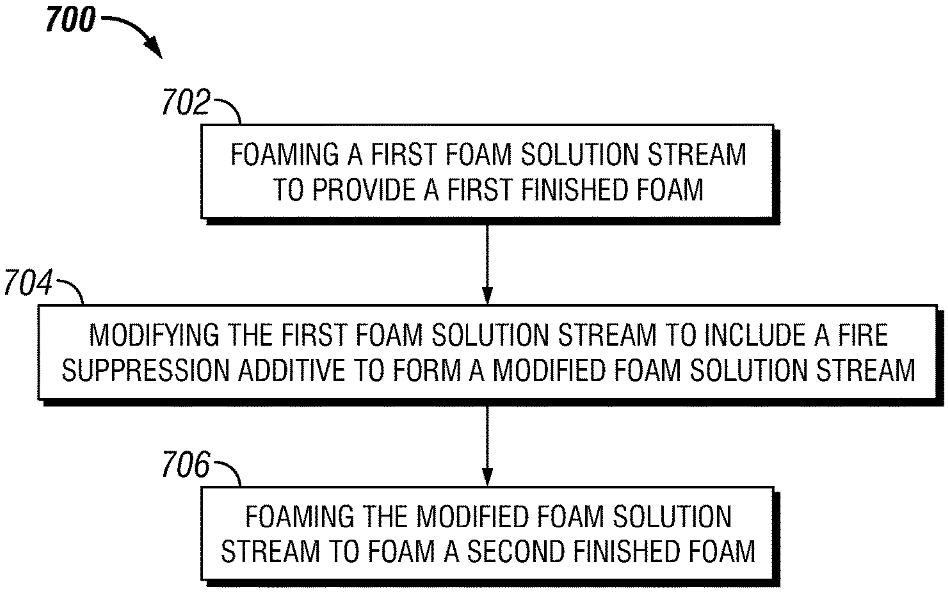
FIG. 7 is a flow diagram of an exemplary method of proportioning a finished foam.

FIG. 7 is a flow diagram of an exemplary method of proportioning a finished foam. As shown in FIG. 7, the method of proportioning a finished foam 700 comprises: foaming a first foam solution stream to provide a first finished foam 702; modifying the first foam solution stream to include a fire suppression additive to form a modified foam solution stream 704; and foaming the modified foam solution stream to foam a second finished foam 706.

Figure 8A:
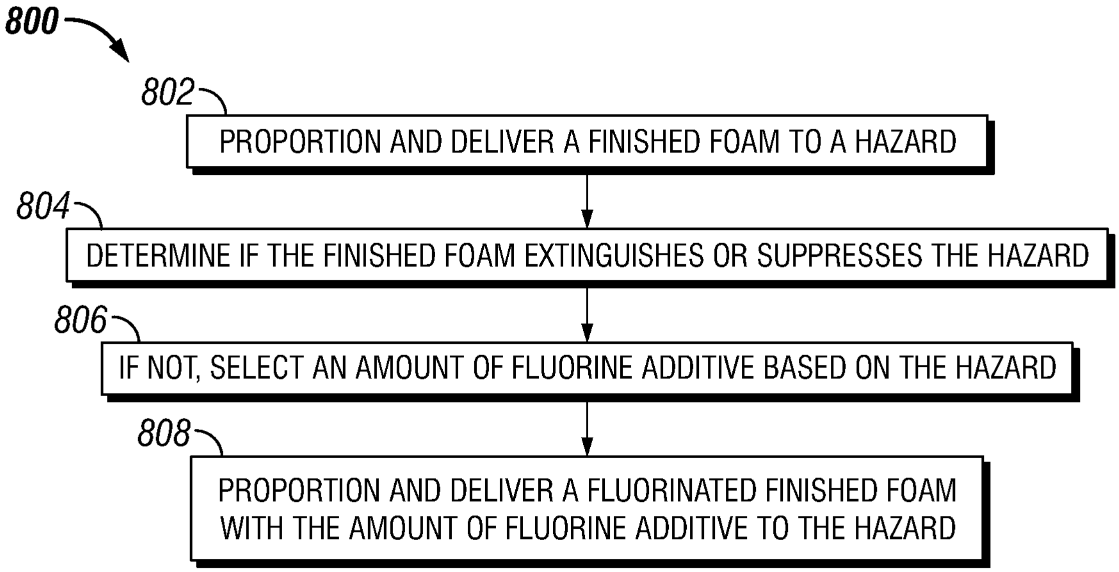
FIG. 8A is a flow diagram of an exemplary method of proportioning a finished foam.
Figure 8B:
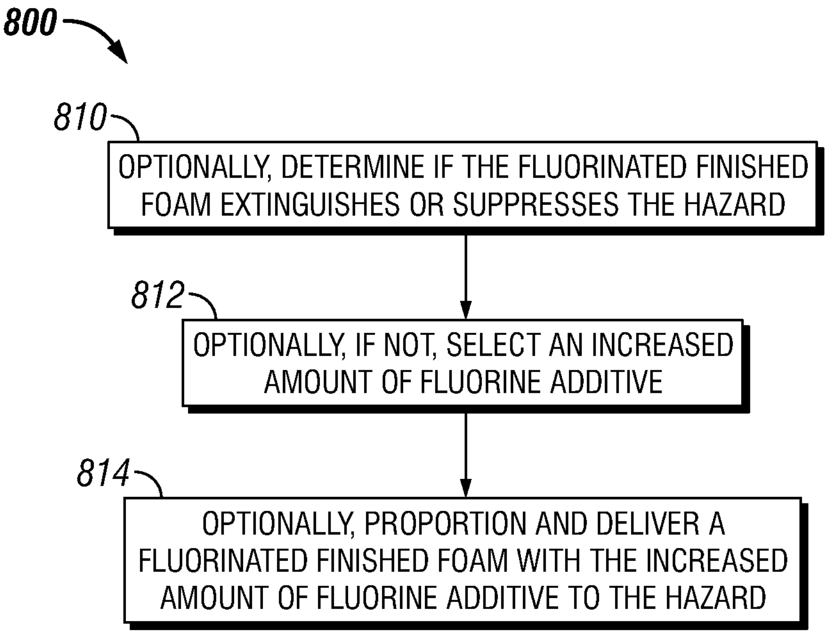
FIG. 8B is a flow diagram of an exemplary method of proportioning a finished foam, showing optional steps.

FIG. 8A is a flow diagram of an exemplary method of proportioning a finished foam; and FIG. 8B is a flow diagram of an exemplary method of proportioning a finished foam, showing optional steps. At least one embodiment relates to a method of proportioning a finished foam at or near a hazard 800 comprising: (a) proportioning and delivering the finished foam to the hazard 802; (b) determining if the finished foam extinguishes or suppresses the hazard 804; (c) if not, selecting an amount of a fluorinated additive 806; and (d) proportioning a fluorinated finished solution with the amount of the fluorinated additive to form a fluorinated finished foam with the amount of the fluorinated additive 808*a*.

In an embodiment, the method 800 further comprises: (e) delivering the fluorinated finished foam with the amount of the fluorinated additive to the hazard 808*b*.

In an embodiment, the method 800 may further comprise: (g) optionally, determining if the fluorinated finished foam with the amount of the fluorinated additive extinguishes or suppresses the hazard 810; (h) optionally, if not, selecting an increased amount of the fluorinated additive based on the type of hazard 812; and (i) optionally, proportioning a fluorinated foam solution with the increased amount of the fluorinated additive to form a fluorinated finished foam with the increased amount of the fluorinated additive 814*a*.

In an embodiment, the method 800 further comprises: (j) optionally, delivering the fluorinated finished foam with the increased amount of the fluorinated additive to the hazard 814*b*.

Figure 9A:
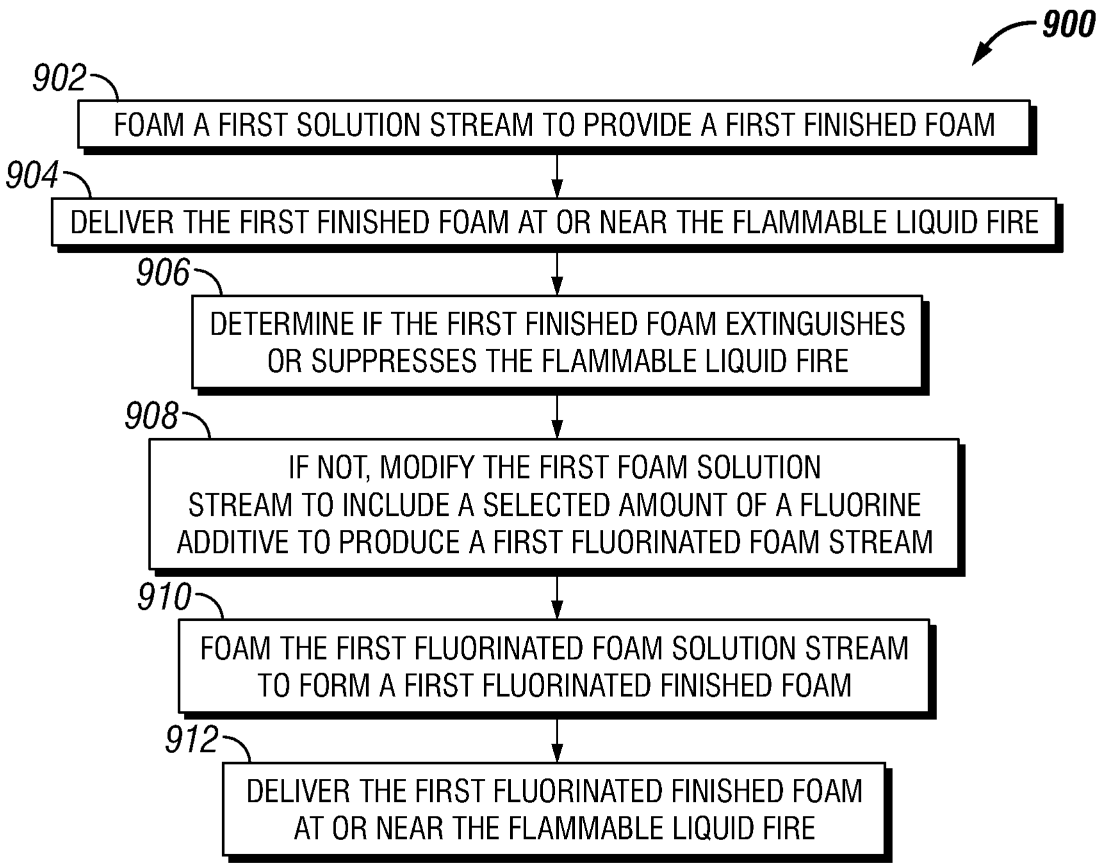
FIG. 9A is a flow diagram of an exemplary method of fighting a flammable liquid fire.
Figure 9B:
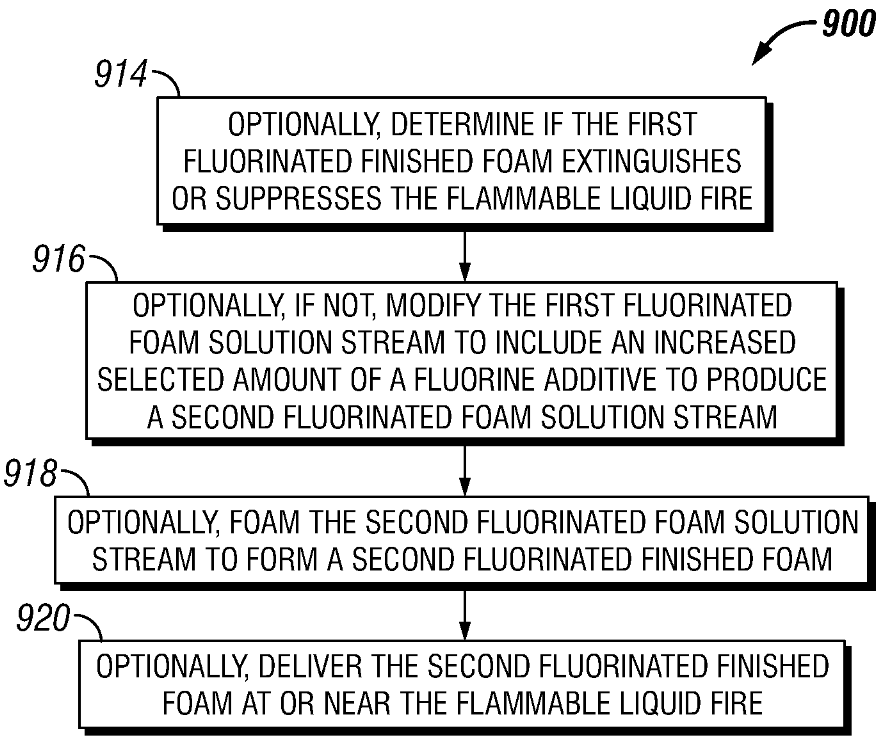
FIG. 9B is a flow diagram of an exemplary method of proportioning a finished foam, showing optional steps.

FIG. 9A is a flow diagram of an exemplary method of fighting a flammable liquid fire; and FIG. 9B is a flow diagram of an exemplary method of proportioning a finished foam, showing optional steps. At least one embodiment relates to a method of fighting a flammable liquid fire 900 comprising: (a) foaming a first foam solution stream to provide a first finished foam 902; (b) delivering the first finished foam at or near the flammable liquid fire 904; (c) determining if the first finished foam extinguishes or suppresses the flammable liquid fire 906; (d) if not, modifying the first foam solution stream to include a selected amount of a fluorinated additive to product a first fluorinated foam solution stream 908; and (e) foaming the first fluorinated foam solution stream to form a first fluorinated finished foam 910.

In an embodiment, the method 900 further comprises: (f) delivering the first finished fluorinated foam at or near the flammable liquid fire 912.

In an embodiment, the method 900 may further comprise: (g) optionally, determining if the first fluorinated finished foam extinguishes or suppresses the flammable liquid fire 914; (h) optionally, if not, modifying the first fluorinated foam solution stream to include a selected increased amount of a fluorinated additive to produce a second fluorinated foam solution stream 916; and (i) optionally, foaming the second fluorinated foam solution stream to form a second fluorinated finished foam 918.

In an embodiment, the method 900 may further comprise: (j) optionally, delivering the second fluorinated finished foam at or near the flammable liquid fire 920.

Another embodiment relates to a method of proportioning a finished foam comprising: (a) providing a foam proportioning system; (b) mixing a base foam concentrate and water in the foam proportioning system at or near a hazard to form a foam solution; (c) mixing the foam solution and air through a nozzle fluidly connected to an outlet of the foam proportioning system to form a finished foam; (d) delivering the finished foam to the hazard; (e) determining if the finished foam extinguishes or suppresses the hazard; (f) if not, designating a Class B hazard profile and selecting an amount of a fluorinated additive based on the Class B hazard profile; (g) mixing the amount of the fluorinated additive, the base foam concentrate and water in the foam proportioning system to form a fluorinated foam solution; and (h) mixing the fluorinated foam solution and air through the nozzle to form a fluorinated finished foam.

In an embodiment, the method further comprises: (i) delivering the fluorinated finished foam to the hazard.

In an embodiment, the method comprises: (d) targeting the hazard using a non-fluorinated base foam concentrate and delivering a non-fluorinated finished foam to the hazard.

In an embodiment, the method comprises: (d) targeting the hazard using a non-fluorinated base foam concentrate and delivering a non-fluorinated finished foam to the hazard; and (i) delivering a fluorinated finished foam to the hazard without retargeting the hazard.

In an embodiment, the method further comprises: (h) determining if the fluorinated finished foam extinguishes or suppresses the hazard; (i) if not, selecting an increased amount of the fluorinated additive; (j) mixing the fluorinated additive, the non-fluorinated base foam concentrate and water in the foam proportioning system at or near a hazard to form a fluorinated foam solution; and (k) mixing the non-fluorinated foam solution and air through the nozzle to form a fluorinated finished foam.

In an embodiment, the method further comprises: (l) delivering a fluorinated finished foam to the target.

In an embodiment, the base foam concentrate is a low performing fluorinated base foam concentrate.

In an embodiment, the base foam concentrate is a non-fluorinated base foam concentrate.

In an embodiment, a non-fluorinated base foam concentrate does not have any fluorinated additive or fluorine.

In an embodiment, a fluorinated additive has from about 0.5 wt. % to about 25 wt. % of fluorine, and any range or value there between. In an embodiment, the fluorinated additive has from about 5 wt. % to about 20 wt. % of fluorine. In an embodiment, the fluorinated additive has about 10 wt. % of fluorine.

In an embodiment, the fluorinated foam solution has from about 0.05 wt. % to about 10 wt. % of base foam concentrate plus fluorinated additive, and any range or value there between. In an embodiment, the fluorinated foam solution has from about 1 wt. % to about 6 wt. % of base foam concentrate plus fluorinated additive.

In an embodiment, the base foam concentrate plus fluorinated additive has from about 0.5 wt. % to about 35 wt. % of fluorinated additive, and any range or value there between. In an embodiment, the base foam concentrate plus fluorinated additive has from about 1 wt. % to about 30 wt. % of fluorinated additive.

In an embodiment, the base foam concentrate plus fluorinated additive has from about 0.01 wt. % to about 10 wt. % of fluorine, and any range or value there between. In an embodiment, the base foam concentrate plus fluorinated additive has from about 0.05 wt. % to about 6 wt. % of fluorine.

In an embodiment, a fluorinated finished foam has from about 0.0001 wt. % to about 0.5 wt. % of fluorine, and any range or value there between. In an embodiment, the fluorinated finished foam has from about 0.0005 wt. % to about 0.36 wt. % of fluorine, and any range or value there between.

In an embodiment, the amount of fluorinated additive added or injected into the foam solution is selected based on a minimum amount of the fluorinated additive required to achieve fuel shedding and film formation.

In an embodiment, the amount of fluorinated additive is selected based on a chemical volatility formula.

Yet another embodiment relates to a method of proportioning a finished foam comprises: (a) providing a portable, mobile, or fixed foam proportioning system; (b) using the portable, mobile, or fixed foam proportioning system to proportion a base foam concentrate with Type I, Type II, or Type III applications for delivering a non-fluorinated finished foam for the purposes of Class B hazard response operations; c) delivering a non-fluorinated finished foam to a hazard; (d) if the non-fluorinated finished foam is ineffective in extinguishing or suppressing the hazard due to chemistry and volatility of the hazard, designate a Class B hazard profile; (e) selecting an amount of fluorinated additive to non-fluorinated base foam solution to enhance foam suppression and/or extinguishing performance based on the Class B hazard profile; (f) using the portable, mobile, or fixed foam proportioning system to proportion the base foam concentrate and the amount of fluorinated additive with Type I, Type II, or Type III applications for delivering a fluorinated finished foam for the purposes of Class B hazard response operations; and (g) delivering the fluorinated finished foam to the hazard.

In an embodiment, the Class B hazard profile includes hydrocarbons and polar solvents, as discussed further below.

Types of Foam Applications

Class B hazards are those involving flammable liquids or gases in a "thin-skinned" or pooling occurrence (<1"), as a fuel-in-depth (>1"), or as a fuel-in-motion or pressure-fed fuel incident.

Most methods of fire extinguishment or preventative vapor suppression of fuels-in-depth such as with Bulk Storage Tanks include various means to deliver a mixed or "finished foam" application to the fuel surface to develop a resilient, suffocating foam blanket that breaks the chemical reaction supporting the fire—or, to suppress vapor emissions within the tank vicinity to reduce risk from hazardous chemical exposure, and/or from potential ignition sources.

Type II—Subsurface Foam Application

- One method of fire suppression for bulk storage of flammable liquids (largely out of use today) include a subsurface foam injection system that delivers a fluorinated foam application (such as early fluoroproteins) internally from the tank bottom—whereby the fluorinated foam chemistry defends against fuel contamination as the foam rises to the fuel surface.
- Subsurface systems may be less susceptible to violent ignition events that can damage the tank walls or tank roof elements.
- Subsurface systems are not suitable for foam destructive fuels or for some high viscosity fuels.
- Subsurface systems are not used for the primary protection of floating roof tanks because the roof will prevent complete foam distribution once reaching the surface.
- Only Fluorine-based foams such as Fluoroprotein Foam Concentrates (FP), Film Forming Fluoroprotein Foam Concentrates (FFFP) and Aqueous Film-Forming Foam Concentrates (AFFF) can tolerate severe mixing with fuel as seen with subsurface application, however, mixing ratios are difficult to monitor and to maintain.

Type II—Interior Wall, Gentle Foam Application

- Type II fixed and semi-fixed systems include end-of-line devices such as foam makers, foam pourers, foam chambers, and other Type II devices usually affixed to or near the tank rim. Fixed systems are complete closed systems that include the end-of-line devices and the dedicated plumbing and pump resources intended for charging the system with water/foam in an emergency event. Semi-fixed systems offer the end-of-line device with plumbing reaching down and away from the tank to a remote connection point for charging the system with water/foam solution via mobile response assets such as fire department apparatus or other portable equipment. When charged with water-foam solution, Type II end-of-line devices are intended to aerate the foam at a rate of 8:1 or higher and generally "cascade" a foam application slowly down the tank wall interior resulting in a gentle application of finished foam onto the fuel surface to inhibit fuel loading.
- Type II foam typical application rates vary from about 0.1 gpm/ft$^2$ to about 0.3 gpm/ft$^2$ with most foam discharge devices.
- Type II foam applications rely primarily on molecular weight of the foam blanket and "stacking gravity forces" to move across the surface with very little lateral transit force.
- Type II end-of-line assets are often compromised or altogether missing as result of a violent ignition event.

Type III Foam Application

- The Type III foam application includes elevated or ground-based delivery of enriched foam to the fuel surface "over the top" of the tank wall.
- Inherent in a Type III foam application is use of a lower viscosity foam to allow a greater transit force to move the foam blanket across the fuel surface while aerating in transit to achieve a 4:1-6:1 expansion.
- Effective Type III foam applications "from an elevated distance or a long distance requiring a high arc" must also inhibit fuel loading to survive "plunging" into the fuel source.
- The Type III foam application densities typically range from about 0.16 gpm/ft$^2$ to about 0.22 gpm/ft$^2$ or more based on tank size and respective surface area of fuel.
- Effective Type III foam applications rely on foam chemistry and placement (e.g., using Williams' FootPrint methodology to maximize both initial coverage in the landing zone as well as effective spreading coefficient in all directions).

Class B Hazard Profiles

As discussed above, Class B hazards are those involving flammable liquids or gases in a "thin-skinned" or pooling occurrence (<1"), as a fuel-in-depth (>1"), or as a fuel-in-motion or pressure-fed fuel incident.

Figure 11:
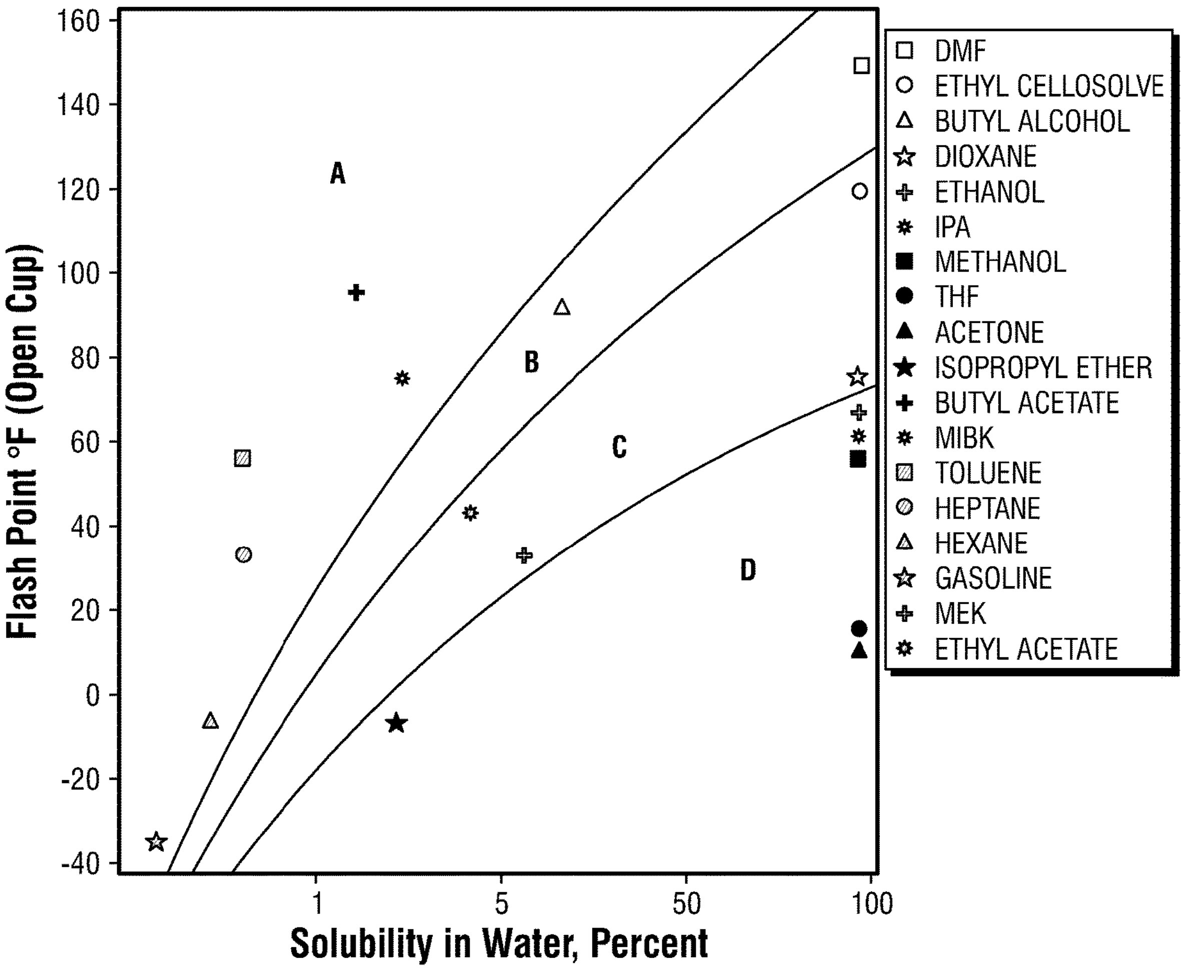
FIG. 11 is an exemplary chart of Solubility in Water (%) vs. Flash Point (° F.) for common flammable liquids, separating these common flammable liquids into Categories A, B, C and D.

FIG. 11 is a chart 1100 of Solubility in Water (%) vs. Flash Point (° F.) for common flammable liquids, separating these common flammable liquids into Categories A, B, C and D. If a flammable liquid is not included on the chart of FIG. 11, the category of the flammable liquid can be estimated using the flammable liquids flash point and water solubility. Flash point and solubility data for various flammable liquids may be found in a NFPA Hazardous Materials Handbook and in other similar sources.

In an embodiment, an initial foam application rate (gpm/$ft^2$) may be selected based on the flammable liquid's category.

For example, "Light Water" ATC and Aqueous Film-Forming Foam (AFFF) may be used on 10% Gasohol and unleaded gasoline using the foam application rates as gasoline. However, burn back resistance in these foam applications may be lowered, requiring additional foam application after fire extinguishment. Further, phase separation of the alcohol components may occur when water is added to the blends, requiring special design considerations for fixed installations.

In an embodiment, the foam solution has from about 1 wt. % to about 6 wt. % of a base foam concentrate in water, and any range or value there between. In an embodiment, the foam solution has about 6 wt. % of a base foam concentrate in water. In an embodiment, the foam solution has about 3 wt. % of a base foam concentrate in water. In an embodiment, the foam solution has about 1 wt. % of a base foam concentrate in water.

In an embodiment, the initial foam application rate may be, for example, about 0.1 gpm/$ft^2$ for a tank containing gasoline, hexane, heptane, VMP Naphtha, n-Butanol, Butyl Acetate, MIBK, Methyl Methacrylate, Acetic Acid, and Gasohol (0-10%).

In an embodiment, the initial foam application rate may be decreased or increased as needed.

Fluorinated Additive

In an embodiment, if a firefighter uses a non-fluorinated base foam concentrate or a lower performing fluorinated base foam concentrate on a hazard and the firefighter cannot extinguish or suppress the hazard, using a foam proportioning system, the firefighter needs to add or inject an amount of fluorinated additive into the foam solution to achieve an oleophopic blanket with the ability to form an aqueous film.

The fluorinated additive may be any suitable fluorinated additive, and aqueous solutions thereof. For example, a suitable fluorinated additive includes, but is not limited to fluorosurfactants containing a perfluoroalkyl group (typically a $C_6$-perfluoroalkyl group), fluoropolymers, and combinations thereof. Such fluorosurfactants may include one or more anionic, nonionic, cationic and/or amphoteric fluoro surfactants. Suitable examples include $C_6$-fluorotelomer-based fluorosurfactants, alkyl sodium sulfonate type anionic fluorosurfactants, fluoroalkyl ammonium chloride type cationic fluorosurfactants and 6:2 fluorotelomer sulfonamide alkylbetaine fluorosurfactants. Suitable fluoropolymer fluorinated additives include anionic and nonionic fluoropolymer surfactants, including poly-perfluoroalkylated polyacrylamide type fluorosurfactants and $C_6$-short chain perfluoro-based fluoropolymer surfactants (e.g., poly-perfluoroalkylated polyamino acid polymers having perfluoro $C_6$-alkyl substituents).

Table 1 below lists a number of exemplary commercially available fluorosurfactants and fluoropolymers suitable for use in the present methods:

TABLE 1

| Fluorosurfactants | Fluoropolymers |
|---|---|
| Dynax DX1030 | Dynax DX5011 |
| Dynax DX1060 | Dynax DX5022 |
| Capstone 1157 | Chemguard FS-818-66 |
| Dupont Forfac 1157N | Chemguard FP-326 |
| C1157-D | Chemguard FS-226 |
| Chemguard S-103A-6 | Chemguard FS-229 |
| Chemguard S-106A-6 | Dynax DX2200 |
| Chemguard FS-157 | Chemguard FS-221 |
| C1183 | Chemguard FP-5100 |
| Dynax DX1080 | |

In an embodiment, the fluorinated additive comprises and additive selected from the group consisting of DX1030, DX1060, 1157, 1157N, C1157-D, S-103A-6, S-106A-6, FS-157, C1183, DX1080, DX5011, DX5022, FS-818-66, FP-326, FS-226, FS-229, DX2200, FS-221, FP-5100 and their equivalents, and combinations thereof.

Perfluorinated Surfactant

In an embodiment, the fluorinated additive may comprise a perfluorinated surfactant. As used herein the term "perfluorinated surfactant" means fluorinated surfactant whose structure contains one more perfluoroalkyl groups and may or may not also include hydrocarbon subunits (e.g., a $—(CH_2)_n$-subunit).

In an embodiment, the fluorinated additive may comprise a perfluorinated surfactant and a diluting agent. In an embodiment, the fluorinated additive may comprise a perfluorinated surfactant and water.

In an embodiment, the fluorinated additive may comprise a perfluorinated surfactant, wherein the perfluorinated carbon chains range from C4 to C24 in length, and a diluting agent. In an embodiment, the fluorinated additive may comprise a perfluorinated surfactant, wherein the perfluorinated carbon chains range from C4 to C24 in length, and water. Where the fluorinated additive includes a perfluorinated carbon chain, the perfluorinated portion of the fluorinated additive is typically a $C_6$-perfluoroalkyl group.

Fluoropolymer

In an embodiment, the fluorinated additive may comprise a fluoropolymer.

In an embodiment, the fluorinated additive may comprise a fluoropolymer and a diluting agent. In an embodiment, the fluorinated additive may comprise a fluoropolymer and water.

Diluting Agent

In an embodiment, a fluorinated additive may also have a diluting agent to dissolve a perfluorinated surfactant and/or a fluoropolymer.

The diluting agent may be any suitable diluting agent that dissolves the perfluorinated surfactant and/or fluoropolymer. For example, a suitable diluting agent includes, but is not limited to, fresh water, brackish water, sea water, and combinations thereof. In an embodiment, the diluting agent may be water. In an embodiment, the diluting agent may be a water stream.

Amount of Fluorinated Additive

In an embodiment, a non-fluorinated base foam concentrate does not have any fluorinated additive or fluorine.

In an embodiment, a fluorinated additive has from about 0.5 wt. % to about 25 wt. % of fluorine, and any range or value there between. In an embodiment, the fluorinated additive has from about 5 wt. % to about 20 wt. % of fluorine. In an embodiment, the fluorinated additive has about 10 wt. % of fluorine.

In an embodiment, the fluorinated foam solution has from about 0.05 wt. % to about 10 wt. % of base foam concentrate plus fluorinated additive, and any range or value there between. In an embodiment, the fluorinated foam solution has from about 1 wt. % to about 6 wt. % of base foam concentrate plus fluorinated additive.

In an embodiment, the base foam concentrate plus fluorinated additive has from about 0.5 wt. % to about 35 wt. % of fluorinated additive, and any range or value there between. In an embodiment, the base foam concentrate plus fluorinated additive has from about 1 wt. % to about 30 wt. % of fluorinated additive.

In an embodiment, the base foam concentrate plus fluorinated additive has from about 0.01 wt. % to about 10 wt. % of fluorine, and any range or value there between. In an embodiment, the base foam concentrate plus fluorinated additive has from about 0.05 wt. % to about 6 wt. % of fluorine.

In an embodiment, a fluorinated finished foam has from about 0.0001 wt. % to about 0.5 wt. % fluorine, and any range or value there between. In an embodiment, the fluorinated finished foam has from about 0.0005 wt. % to about 0.36 wt. % fluorine, and any range or value there between.

In an embodiment, the amount of fluorinated additive added or injected into the foam solution may be based on a minimum amount of the fluorinated additive required to achieve fuel shedding and film formation. Different Class B hydrocarbons require different amounts of fluorinated additive (e.g., perfluorinated surfactants) to achieve these fuel sheading and film formation characteristics.

In an embodiment, an initial amount of fluorinated additive may be selected based on a minimum amount of fluorinated additive required to achieve the fuel sheading and film formation characteristics.

In an embodiment, the initial amount of fluorinated additive may be decreased or increased as needed.

In an embodiment, the amount of fluorinated additive added or injected into the foam solution may be based on a "chemical volatility formula" that factors, for example, surface tension, vapor suppression, and lower and upper flammable ranges. Table 2 below shows an exemplary "chemical volatility range" and "chemical volatility formula" for common flammable liquids:

TABLE 2

| No. Carbon Atoms | Flammable Liquid | Surface Tension at 20° C. (mN/m) | Chemical Volatility Range | Chemical Volatility Formula |
|---|---|---|---|---|
| 6 | n-Hexane (HEX) | 18.43 | 1.50 | "X" wt. % of fluorinated additive |
| 7 | n-Heptane | 20.14 | 2.35 | |
| 8 | n-Octane (OCT) | 21.63 | | |
| 9 | n-Nonane | 22.38 | | |
| 10 | n-Decane (DEC) | 23.83 | | |
| 11 | n-Undecane | 24.66 | | |
| 12 | n-Dodecane (DDEC) | 25.35 | | |
| | Naphtha | | 2.75 | "X + 1.25" wt. % of fluorinated additive |
| | High Octane Gasoline | | 3.00 | |
| 6 | Cyclohexane | 24.95 | 3.85 | "X + 2" wt. % of fluorinated additive |
| 7 | Toluene | | 4.25 | |
| 6 | Benzene | | 8.85 | |

In an embodiment, an initial amount of fluorinated additive may be selected based on a "chemical volatility formula" that factors, for example, surface tension, vapor suppression, and lower and upper flammable ranges. For example, a heptane hazard may require an initial amount of fluorinated additive of X wt. %, a naptha hazard may require an initial amount of fluorinated additive of X+1 wt. %, and a cyclohexane hazard may require an initial fluorinated additive of X+2 wt. % and so on.

In an embodiment, the initial amount of fluorinated additive may be decreased or increased as needed.

Other Fire Suppression Additive

In an embodiment, if a firefighter uses a non-fluorinated base foam concentrate or a lower performing fluorinated base foam concentrate on a hazard and the firefighter cannot extinguish or suppress the hazard, using a foam proportioning system, the firefighter needs to add or inject an amount of fluorinated additive and/or add or inject an amount of other fire suppression additive into the foam solution to achieve an oleophopic blanket with the ability to form an aqueous film.

The other fire suppression additive may be any suitable other fire suppression additive, and aqueous solutions thereof. For example, a suitable other fires suppression additive includes, but is not limited to, mixtures, surfactants, stabilizing agents, suppressants, pH modifiers, and combinations thereof. Table 3 below shows commercially available mixtures, surfactants, stabilizing agents, suppressants and pH modifiers:

TABLE 3

| Mixtures | Surfactants | Stabilizing Agents | Suppressants | pH Modifiers |
|---|---|---|---|---|
| Dynax DX1020 | Sodium octyl sulfate | Polysaccharides | Potassium acetate | Hydrochloric acid |
| Dynax DX1025 | Diethylene glycol butyl ether | Diutan gum | Potassium carbonate | Sodium hydroxide |
| Dynax DX1026 | Alkylpolyglycoside | Xanthan gum | Potassium citrate | Potassium bicarbonate |

TABLE 3-continued

| Mixtures | Surfactants | Stabilizing Agents | Suppressants | pH Modifiers |
|---|---|---|---|---|
| | Decyl sulfate | Guar gum | Potassium bicarbonate | Citric acid |
| | Octyl sulfate | Magnesium sulfate | Disodium phosphate | |
| | Alkyl sulfo betaine | Rhamsan gum | Sodium sulfate | |
| | Lauryl dipropionate | Rheozan | | |
| | | Konjac gum | | |
| | | ASX-T | | |

In an embodiment, the other fire suppression additive may be selected from the group consisting of DX1020, DX1025, DX1026, ASX-T, sodium octyl sulfate, diethylene glycol butyl ether, alkylpolyglycoside, decyl sulfate, octyl sulfate, alkyl sulfo betaine, lauryl dipropionate, polysaccharides (e.g., diutan gum, xanthan gum, guar gum, succinoglycan, rahmsan gum, and konjac gum), inorganic salts (e.g., magnesium sulfate, potassium acetate, potassium carbonate, potassium citrate, potassium bicarbonate, disodium phosphate, and sodium sulfate), acrylic- and acrylamide-based polymers (e.g., polyacrylamidomethylpropane sulfonic acid), and their equivalents, and combinations thereof.

Figure 10:
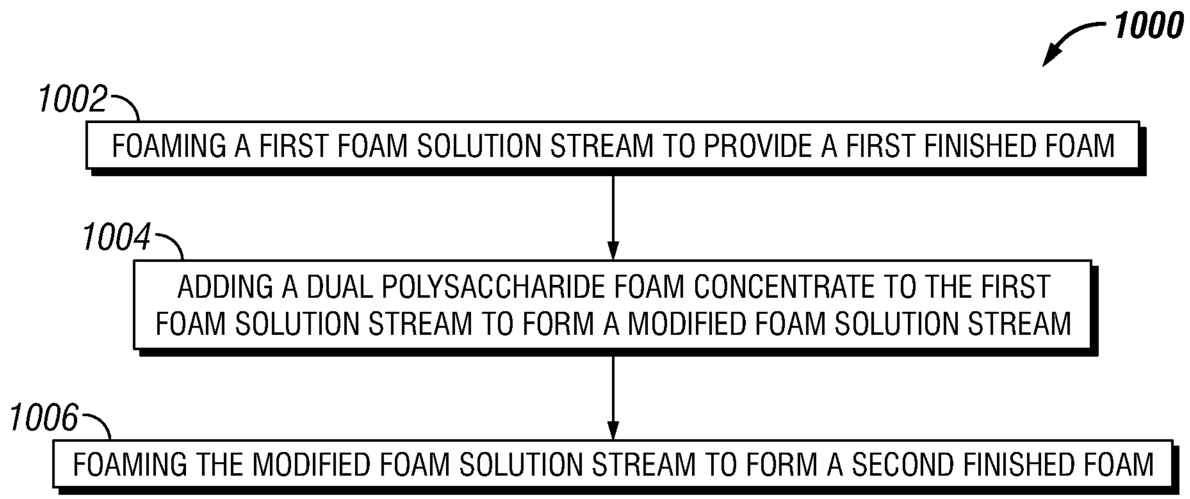
FIG. 10 is a flow diagram of an exemplary method of proportioning a finished foam.

FIG. 10 is a flow diagram of an exemplary method of proportioning a finished foam. In an embodiment, a method of forming a fire fighting foam 1000 comprises foaming a first foam solution stream to provide a first finished foam 1002, wherein the first foam solution stream comprises a non-fluorinated base foam concentrate, such as a polysaccharide-based foam concentrate, and a dilution water stream. The first foam solution stream may be modified by adding a selected amount of a fluorinated additive 1004. The polysaccharide-based foam concentrate may include a suspension system comprising water and at least one suspension agent, such as a glycol, polyethylene glycol and/or a glycol ether; a first polysaccharide that is soluble in the suspension system; and a second polysaccharide that is insoluble in the suspension system, but soluble in water alone. The modified foam solution may be foamed to form a second finished foam 1006.

Soluble Polysaccharides

In an embodiment, the other fire suppression additive may comprise a soluble polysaccharide, and aqueous solutions thereof (i.e., suspension system).

In an embodiment, a polysaccharide foam concentrate may comprise a soluble polysaccharide, and aqueous solutions thereof (i.e., suspension system).

The soluble polysaccharide may be any suitable soluble polysaccharide. For example, a suitable soluble polysaccharide includes, but is not limited to, agar, sodium alginate, carrageenan, gum arabic, gum guaicum, neem gum, *Pistacia lentiscus*, gum chatti, caranna, galacto-mannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, pysllium seed husks, gellan gum, xanthan gum, acacia gum, cassia gum, diutan gum, fenugreek gum, ghatti gum, hydroxyeth-ylcellulose, hydroxypropylmethylcellulose, karaya gum, konjac gum, pectin, propylene glycol alginate, other natural gums and their derivatives, and combinations thereof. In an embodiment, the soluble polysaccharide may be a natural gum or a natural gum derivative, and combinations thereof.

In an embodiment, the soluble polysaccharide may be agar, sodium alginate, carrageenan, gum arabic, gum guaicum, neem gum, *Pistacia lentiscus*, gum chatti, caranna, galacto-mannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, pysllium seed husks, gellan gum, and xanthan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, and combinations thereof.

In an embodiment, the soluble polysaccharide may be xanthan gum. Xanthan gum is a known polysaccharide secreted by bacterium *Xanthomonas campestris* comprising pentasaccharide repeating units, having glucose, mannose, and glucuronic acid in a molar ratio of 2.0:2.0:1.0, respectively.

Polysaccharide-Based Additive

In an embodiment, the other fire suppression additive may comprise a first polysaccharide and a second polysaccharide, typically present with an aqueous solution (i.e., the polysaccharides are dissolved and/or dispersed in the aqueous suspension system). In an embodiment, the first polysaccharide may be a soluble polysaccharide. In an embodiment, the second polysaccharide may be an insoluble polysaccharide (e.g., insoluble in the suspension system but soluble in water alone).

In an embodiment, a polysaccharide foam concentrate may comprise a first polysaccharide and a second polysaccharide, and solutions thereof (i.e., a suspension system). In an embodiment, the first polysaccharide may be a soluble polysaccharide. In an embodiment, the second polysaccharide may be an insoluble polysaccharide (i.e., insoluble in the suspension system but soluble in water alone).

Soluble Polysaccharides

In an embodiment, the other fire suppression additive may comprise a soluble polysaccharide dissolved in an aqueous solution (the "suspension system"). In an embodiment, the soluble polysaccharide component may include one or more polysaccharides that are soluble in the suspension system.

In an embodiment, a polysaccharide-based foam concentrate may comprise a soluble polysaccharide as an aqueous solution thereof. In an embodiment, the soluble polysaccharide may include one or more polysaccharides that are soluble in the suspension system.

The soluble polysaccharide may be any suitable soluble polysaccharide. For example, a suitable soluble polysaccharide includes, but is not limited to, agar, sodium alginate, carrageenan, gum arabic, gum guaicum, neem gum, *Pistacia lentiscus*, gum chatti, caranna, galacto-mannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, pysllium seed husks, gellan gum, xanthan gum, acacia gum, cassia gum, diutan gum, fenugreek gum, ghatti gum, hydroxyeth-ylcellulose, hydroxypropylmethylcellulose, karaya gum, konjac gum, pectin, propylene glycol alginate, other natural gums and their derivatives, and combinations thereof. In an embodiment, the soluble polysaccharide may be a natural gum or a natural gum derivative, and combinations thereof.

In an embodiment, the soluble polysaccharide may be agar, sodium alginate, carrageenan, gum arabic, gum guaicum, neem gum, *Pistacia lentiscus*, gum chatti, caranna, galacto-mannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, pysllium seed husks, gellan gum, and xanthan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, and combinations thereof.

In an embodiment, the soluble polysaccharide may be xanthan gum. Xanthan gum is a known polysaccharide secreted by bacterium *Xanthomonas campestris* comprising pentasaccharide repeating units, having glucose, mannose, and glucuronic acid in a molar ratio of 2.0:2.0:1.0, respectively.

In an embodiment, a polysaccharide foam concentrate may include a dissolved component and an un-dissolved component.

In an embodiment, a polysaccharide foam concentrate may include a hydrated xanthan component and an un-hydrated konjac component.

Insoluble Polysaccharides

In an embodiment, the insoluble polysaccharide may include one or more polysaccharides that are insoluble in the suspension system but that are soluble in water alone. In an embodiment, the insoluble polysaccharide may include one or more polysaccharides that is partially insoluble in the suspension system having water and at least one organic solvent but that are soluble in water alone.

In an embodiment, the insoluble polysaccharide includes, but is not limited to, agar, sodium alginate, carrageenan, gum arabic, gum guaicum, neem gum, *Pistacia lentiscus*, gum chatti, caranna, galacto-mannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, pysllium seed husks, gellan gum, xanthan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, other natural gums and their derivatives, and combinations thereof. In an embodiment, the insoluble polysaccharide may be a natural gum or a natural gum derivative, and combinations thereof.

In an embodiment, the insoluble polysaccharide includes, but is not limited to, agar, sodium alginate, carrageenan, gum arabic, gum guaicum, neem gum, *Pistacia lentiscus*, gum chatti, caranna, galactomannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, pysllium seed husks, gellan gum, and xanthan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, and combinations thereof.

In an embodiment, a polysaccharide foam concentrate may include a hydrated component and an un-hydrated component.

In an embodiment, a polysaccharide foam concentrate may include a hydrated xanthan component and an un-hydrated konjac component.

Combinations of Soluble and Insoluble Polysaccharides

In an embodiment, the soluble polysaccharide is xanthan gum and the insoluble polysaccharide is konjac gum. Xanthan gum requires less water in order to hydrate than konjac gum.

Diluting Agent

In an embodiment, a polysaccharide foam concentrate may also have a diluting agent to dissolve an insoluble polysaccharide that is insoluble in a suspension system of water and one or more suspension agents but is insoluble in water alone.

In an embodiment, a polysaccharide foam concentrate comprises a suspension system having water and at least one suspension agent. The polysaccharide foam concentrate may also have a soluble polysaccharide that is soluble in the suspension system. The polysaccharide foam concentrate may also have a second, insoluble polysaccharide that is insoluble in the suspension system. However, the insoluble polysaccharide is soluble in water alone. The polysaccharide foam concentrate may also have at least one diluting agent. The diluting agent dissolves the insoluble polysaccharide that is insoluble in the suspension system of water and one or more suspension agents.

The diluting agent may be any suitable diluting agent that dissolves the insoluble polysaccharide in the suspension system. For example, a suitable diluting agent includes, but is not limited to, fresh water, brackish water, sea water, and combinations thereof. In an embodiment, the diluting agent may be water. In an embodiment, the diluting agent may be a water stream.

Suspension Agents

In an embodiment, the other fire suppression additive may comprise a suspension agent, and solutions thereof. In an embodiment, the suspension agent may comprise an organic solvent, a water soluble polymer and a salt.

In an embodiment, a polysaccharide foam concentrate may comprise a suspension agent, and solutions thereof. In an embodiment, the suspension agent may comprise an organic solvent, a water soluble polymer and a salt.

The organic solvent may be any suitable water soluble solvent. For example, a suitable organic solvent, includes, but is not limited to, acetone and other ketones, methanol ethanol, isopropanol, propanol and other alcohols, diethylene glycol n-butyl ether, dipropylene glycol n-propyl ether, hexylene glycol, ethylene glycol, dipropylene glycol, tripropylene glycol, dipropylene glycol monobutyl ether, dipropylene glycol monomethyl ether, ethylene glycol monobutyl ether, tripropylene glycol methyl ether, dipropylene glycol monopropyl ether, propyl-ene glycol, glycerol, and other glycols or glycol ethers, and combinations thereof. In an embodiment, the organic solvent may be a glycol or a glycol ether. In an embodiment, the organic solvent may be a glycol. In an embodiment, the organic solvent may be a glycol ether.

The water soluble polymer may be any suitable water soluble polymer. For example, suitable water soluble polymers include, but are not limited to, polyethylene glycol (PEG), polyacrylic acid, polyethyleneimine, polyvinyl alcohol, polyacrylamides, carboxyvinyl polymers, poly(vinylpyrrolidinone) (PVP) and copolymers thereof, poly-oxypropylene, and combinations thereof. In an embodiment, the water soluble polymer may be a polyethylene glycol (PEG) including, but not limited to, a molecular weight (MW) range from about 200 MW to about 10,000 MW, and any range or value there between. In an embodiment, the water-soluble polymer may be a polyethylene glycol (PEG) 200 MW, PEG 400 MW, PEG 500 MW, PEG 1,000 MW, PEG 2,000 MW, PEG 5,000 MW, PEG 10,000 MW, and combinations thereof.

The salt may be any suitable salt. For example, a suitable salt includes, but is not limited to a metallic salt, a metallic salt comprising an anion and a cation, a salt comprising an anion and a cation, and combinations thereof.

In an embodiment, the cation of the metallic salt may be aluminum, sodium, potassium, calcium, copper, iron, magnesium, potassium, and calcium.

In an embodiment, the cation of the salt may be ammonium.

Dual Suspension Agents

In an embodiment, the other fire suppression additive may comprise a first suspension agent and a second suspension agent, and solutions thereof. In an embodiment, the first suspension agent may comprise an organic solvent, a water soluble polymer and a salt. In an embodiment, the second suspension agent may comprise an organic solvent, a water soluble polymer and a salt.

In an embodiment, a dual polysaccharide foam concentrate may comprise a first suspension agent and a second suspension agent, and solutions thereof. In an embodiment, the first suspension agent may comprise an organic solvent, a water soluble polymer and a salt. In an embodiment, the second suspension agent may comprise an organic solvent, a water soluble polymer and a salt.

In an embodiment, the first suspension agent and the second suspension agent may be water soluble.

In an embodiment, the first suspension agent may be water soluble and the second suspension agent may be insoluble in water but miscible in an organic solvent and water solution.

The organic solvent may be any suitable organic solvent. For example, a suitable organic solvent includes, but is not limited to, acetone and other ketones, methanol ethanol, isopropanol, propanol and other alcohols, diethylene glycol n-butyl ether, dipropylene glycol n-propyl ether, hexylene glycol, ethylene glycol, dipropylene glycol, tripropylene glycol, dipropylene glycol monobutyl ether, dipropylene glycol monomethyl ether, ethylene glycol monobutyl ether, tripropylene glycol methyl ether, dipropylene glycol monopropyl ether, propylene glycol, glycerol, and other glycols or glycol ethers, and combinations thereof. In an embodiment, the organic solvent may be a glycol or a glycol ether. In an embodiment, the organic solvent may be a glycol. In an embodiment, the organic solvent may be a glycol ether.

The water soluble polymer may be any suitable water soluble polymer. For example, suitable water soluble polymers include, but are not limited to, polyethylene glycol (PEG), polyacrylic acid, polyethyleneimine, polyvinyl alcohol, polyacrylamides, carboxyvinyl polymers, poly(vinylpyrrolidinone) (PVP) and copolymers thereof, poly-oxypropylene, and combinations thereof. In an embodiment, the water soluble polymer may be a polyethylene glycol (PEG) including, but not limited to, a molecular weight (MW) range from about 200 MW to about 10,000 MW, and any range or value there between. In an embodiment, the water-soluble polymer may be a polyethylene glycol (PEG) 200 MW, PEG 400 MW, PEG 500 MW, PEG 1,000 MW, PEG 2,000 MW, PEG 5,000 MW, PEG 10,000 MW, and combinations thereof.

The salt may be any suitable salt. For example, a suitable salt includes, but is not limited to a metallic salt, a metallic salt comprising an anion and a cation, a salt comprising an anion and a cation, and combinations thereof.

In an embodiment, the cation of the metallic salt may be aluminum, sodium, potassium, calcium, copper, iron, magnesium, potassium, and calcium.

In an embodiment, the cation of the salt may be ammonium.

Foaming Agents

In an embodiment, a polysaccharide foam concentrate may also have a foaming agent. The foaming agent may be any suitable foaming agent. For example, a suitable foaming agent includes, but is not limited to, a surfactant.

Additional Additive

In an embodiment, a polysaccharide foam concentrate may also have an additional additive. The additional additive may be any suitable additional additive. For example, suitable additional additive include, but are not limited to, antimicrobial agents, buffers to regulate pH (e.g., tris(2-hydroxyethyl)amine, trisodium phosphate, or sodium citrate), corrosion inhibitors (e.g., tolyltriazole, 2-mercaptobenzothiazole or sodium nitrite), flame retardant materials (e.g., inorganic salts (e.g., phosphates or sulfates) or organic salts (e.g., acetate salts)), humectants, multivalent ion salts to lower the critical micelle concentration (e.g., magnesium sulfate), preservatives.

Shearing and Hydration

Shear thinning causes a fluid's viscosity (i.e., the measure of a fluid as resistance to flow) to decrease with an increasing rate of shear stress. A shear thinning fluid may be referred to as pseudoplastic. All shear thinning compositions are thixotropic as they require a finite time to bring about the rearrangements needed in the microstructural elements that result in shear thinning.

In an embodiment, a polysaccharide foam concentrate comprises a suspension system for shear thinning or peudoplastic or thixotropic or bingham plastic or viscoplastic fluid.

Hydration is the process through which a compound, such as a polysaccharide, dissolves. In an embodiment, a soluble polysaccharide may be added to hydrate and dissolve in order to add increased viscosity to the foam concentrate composition. For example, the insoluble polysaccharide may be added as a finely divided powder, wherein the powder forms a permanent suspension with the viscosity provided by the soluble polysaccharide (i.e., the viscosity of the suspension is inversely proportional to the amount of shear applied to it). Because the insoluble polysaccharide particles are small and have a density close to that of the suspension, they apply almost zero shear to the suspension. When proportioned into water to form a polysaccharide foam concentrate, the insoluble polysaccharide will become soluble and rapidly hydrate, thereby providing viscosity.

In an embodiment, an insoluble polysaccharide may be suspended in a suspension system of a soluble polysaccharide, water, and an agent that prevents the insoluble polysaccharide from dissolving consisting of an organic solvent, salt, or polymer. The mixture of the soluble polysaccharide and the insoluble polysaccharide allows the insoluble polysaccharide to utilize the viscosity generated by the soluble polysaccharide to become soluble in the suspension system. The combination of the soluble and insoluble polysaccharides allows the insoluble polysaccharide particles to utilize the viscosity generated by the soluble polysaccharide to inhibit their movement through the solution. When the particles of insoluble polysaccharide are uniformly dispersed throughout the polysaccharide foam solution, they form a stable homogenous suspension.

The rate of hydration can influence the effectiveness of a polysaccharide foam concentrate. In an embodiment, the rate of hydration may be controlled by the particle size of the polysaccharide mixture. The rate of hydration decreases with increasing particle size of the insoluble polysaccharide. In other words, having too slow of a rate of hydration (i.e., having large particles of the insoluble polysaccharide) may result in undissolved insoluble polysaccharide particles.

In an embodiment, a soluble polysaccharide may provide a desired viscosity to a polysaccharide foam concentrate suspension. In an embodiment, an insoluble polysaccharide may not substantially change the desired viscosity to the suspension.

In an embodiment, the polysaccharide foam concentrate may have a desired viscosity from about 1000 cPs to about 6000 cPs, and any range or value there between.

Amount of Other Fire Suppression Additive

Amount of Soluble Polysaccharide

In an embodiment, a polysaccharide foam concentrate may have from about 0.1 wt. % to about 5.0 wt. % of a soluble polysaccharide, and any range or value there between. In an embodiment, a polysaccharide foam concentrate may have about 0.5 wt. % of a soluble polysaccharide.

In an embodiment, a polysaccharide foam concentrate may have from about 0.2 wt. % to about 0.8 wt. % of xanthan gum, and any range or value there between. In an embodiment, the polysaccharide foam concentrate may have about 0.5 wt. % of xanthan gum.

Amounts of Dual Polysaccharide

Amount of Soluble Polysaccharide

In an embodiment, a polysaccharide foam concentrate may have from about 0.05 to 5.0 wt. %, often about 0.1 to 2.0 wt. %, commonly about 0.1 to 1.0 wt. %, and typically about 0.2 to 0.8 wt. %, of a soluble polysaccharide, and any range or value there between. In an embodiment, the polysaccharide foam concentrate may have about 0.3 to 0.6 wt. % of the soluble polysaccharide.

In an embodiment, a polysaccharide foam concentrate may have from about 0.2 wt. % to about 0.8 wt. % xanthan gum, and any range or value there between. In an embodiment, the polysaccharide foam concentrate may have about 0.3 to 0.6 wt. % xanthan gum.

Amount of Insoluble Polysaccharide

In an embodiment, a polysaccharide-based foam concentrate may have from about 1 wt. % to about 15 wt. % of an insoluble polysaccharide, and any range or value there between. For example, the polysaccharide-based foam concentrate may include about 2 to 12 wt. %, often about 3 to 10 wt. %, commonly about 4 to 9 wt. %, and typically about 5 to 8 wt. % of the insoluble polysaccharide. In an embodiment, the polysaccharide foam concentrate may have about 5 wt. %, about 6 wt. % or about 7 wt. % of an insoluble polysaccharide.

Amount of Combinations of Soluble and Insoluble Polysaccharides

In an embodiment, a polysaccharide foam concentrate may have a weight ratio of water to 200 MW polyethylene glycol (PEG) from about 6:3 to about 2:8, and any range or value there between. In an embodiment, the polysaccharide foam concentrate may have a weight ratio of water to 200 MW PEG of about 6:4.

In an embodiment, a polysaccharide foam concentrate may have a weight ratio of water to 200 MW PEG from about 6:3 to about 2:8, with mixtures of about 0.5 wt. % xanthan gum and from about 4 wt. % to about 10 wt. % konjac gum, and any range or value there between.

In an embodiment, a polysaccharide foam concentrate may have a weight ratio of water to 200 MW PEG of about 6:4, with mixtures of about 0.4 weight xanthan gum and from about 4 wt. % to about 10 wt. % konjac gum, and any range or value there between.

In an embodiment, a polysaccharide foam concentrate may have a weight ratio of water to 200 MW PEG of about 6:4, with mixtures of about 0.3 weight xanthan gum and from about 4 wt. % to about 10 wt. % konjac gum, and any range or value there between.

Amount of Diluting Agent

In an embodiment, a polysaccharide foam concentrate may have from about 85 wt. % to about 99.5 wt. % of water, and any range or value there between. In an embodiment, the finished foam may have about 94 wt. % of water.

Amount of Suspension Agent

In an embodiment, a polysaccharide-based foam concentrate may have a weight ratio of water to suspension agent of from about 6:3 to about 2:8, and any range or value there between. Typically, the polysaccharide-based foam concentrate has a suspension system that includes at least about 20 wt. % and, more commonly, at least about 30 wt. % organic solvent (based on the total weight of the suspension system).

Amounts of Dual Suspension Agent

In an embodiment, a dual polysaccharide foam concentrate may have a weight ratio of a first suspension agent to a second suspension agent of from about 6:3 to about 2:8.

In an embodiment, a dual polysaccharide foam concentrate may have a weight ratio of water to a mixture of a first suspension agent and a second suspension agent of from about 6:3 to about 2:8.

SUMMARY

In an embodiment, a method of proportioning a finished foam at or near a hazard comprises: proportioning and delivering a first finished foam to the hazard; determining if the first finished foam extinguishes or suppresses the hazard; if not, selecting an amount of a fluorinated additive; and proportioning a foam solution with the selected amount of the fluorinated additive to form a fluorinated finished foam comprising the selected amount of the fluorinated additive.

In an embodiment, the foam solution is a non-fluorinated foam solution.

In an embodiment, the hazard is a Class B hazard.

In an embodiment, a method of forming a fire fighting foam comprises: foaming a first foam solution to provide a first finished foam, wherein the first foam solution stream comprises a base foam concentrate and dilution water; modifying the first foam solution to include a selected amount of a fluorinated additive to form a fluorinated foam solution; and foaming the fluorinated foam solution to form a second finished foam.

In an embodiment, the fluorinated additive comprises an additive selected from the group consisting of DX1030, DX1060, 1157, 1157N, C1157-D, S-103A-6, S-106A-6, FS-157, C1183, DX1080, DX5011, DX5022, FS-818-66, FP-326, FS-226, FS-229, DX2200, FS-221, FP-5100, and combinations thereof.

In an embodiment, the fluorinated additive comprises an anionic fluoropolymer, a nonionic fluoropolymer, or a combination thereof.

In an embodiment, the fluorinated additive comprises a poly-perfluoroalkylated polyacrylamide type fluorosurfactant, a poly-perfluoroalkylated polyamino acid polymer, and/or a $C_6$-short chain perfluoro-based fluoropolymer surfactant.

In an embodiment, the fluorinated additive comprises an anionic, nonionic, cationic and/or amphoteric fluorosurfactant, or a combination thereof.

In an embodiment, the fluorinated additive comprises a $C_6$-fluorotelomer-based nonionic fluorosurfactant, an alkyl sodium sulfonate type anionic fluorosurfactant, a fluoroalkyl ammonium chloride type cationic fluorosurfactant, a fluorotelomer sulfonamide alkylbetaine fluorosurfactant, a poly-perfluoroalkylated polyamino acid polymer, or a combination thereof.

In an embodiment, the method further comprises: (a) mixing the first foam solution and air through a nozzle fluidly connected to an outlet to form the first finished foam; (b) delivering the first finished foam to a hazard; (c) determining if the first finished foam extinguishes or suppresses the hazard; (d) if not, designating a Class B hazard profile and selecting an amount of the fluorinated additive based on the Class B hazard profile; (e) mixing the selected amount of the fluorinated additive, the base foam concentrate and dilution water in a foam proportioning system to form the fluorinated foam solution; and (f) mixing the fluorinated foam solution and air through a nozzle to form the second finished foam.

In an embodiment, the first finished foam is a non-fluorinated finished foam.

In an embodiment, the fluorinated additive has about 1 wt. % to about 25 wt. % fluorine. In an embodiment, the fluorinated additive has about 5 to 20 wt. % fluorine.

In an embodiment, the fluorinated finished foam has about 0.0001 wt. % to about 0.5 wt. % fluorine. In an embodiment, the fluorinated finished foam has about 0.0005 wt. % to about 0.4 wt. % fluorine.

In an embodiment, the method further comprises: (g) delivering the second finished foam to the hazard; (h) determining if the second finished foam extinguishes or suppresses the hazard; (i) if not, selecting an increased amount of the fluorinated additive based on the type of hazard; and (j) proportioning the increased amount of the fluorinated additive, the base foam concentrate and water in the foam proportioning system to form a third finished foam.

In an embodiment, the method comprises: (e-1) weighing a fluorinated additive container to obtain an initial weight or determining an initial pressure of the fluorinated additive container; (e-2) proportioning the base foam concentrate and water with the selected amount of the fluorinated additive to form the fluorinated foam solution; (e-3) weighing the fluorinated additive container to obtain a final weight or determining a final pressure of the fluorinated additive container; and (e-4) using the final weight and the initial weight or the initial pressure and the final pressure to determine a total amount of fluorinated additive.

In an embodiment, the foam proportioning system is a portable, mobile, or fixed foam proportioning system.

In an embodiment, the base foam concentrate is a non-fluorinated base foam concentrate.

In an embodiment, the base foam concentrate is a low performing fluorinated base foam concentrate.

In an embodiment, the hazard comprises hydrocarbons and/or polar solvent.

In an embodiment, a method of fighting a flammable liquid fire comprises: foaming a first foam solution to provide a first finished foam, where the first foam solution comprises a base foam concentrate and dilution water; delivering the first finished foam at or near the flammable liquid fire; modifying the first foam solution to include a selected amount of a fluorinated additive to provide a fluorinated foam solution; foaming the fluorinated foam solution to form a fluorinated finished foam; and delivering the fluorinated finished foam at or near the flammable liquid fire.

In an embodiment, the base foam concentrate is a non-fluorinated base foam concentrate.

In an embodiment, the dilution water comprises municipal water, brackish water and/or seawater.

In an embodiment, a foam injection system comprises: a foam concentrate pump fluidly connected to a foam concentrate tank; a fluorinated additive pump fluidly connected to a fluorinated additive tank; a water pump fluidly connected to a water source; and a flow controller comprising one or more processors and computer-readable instructions that when executed by the one or more processors, cause the one or more processors to: determine a water flow rate outputted by the water pump; determine a foam concentrate flow rate outputted by the foam concentrate pump; identify a target ratio of water and foam concentrate; identify a target ratio of water and fluorinated additive; control the foam concentrate flow rate based on the water flow rate and the target ratio of water and foam concentrate; and optionally, identify a target ratio of water and fluorinated additive; and control the optional fluorinated additive flow rate based on the water flow rate and the target ratio of water and fluorinated additive.

Another embodiment relates to a method of forming a fire fighting foam comprising: (a) foaming a first foam solution to provide a first finished foam, wherein the first foam solution stream comprises a base foam concentrate and dilution water; (b) modifying the first foam solution to include a selected amount of a fluorinated additive to form a fluorinated foam solution; and (c) foaming the fluorinated foam solution to form a second finished foam.

In an embodiment, the fluorinated additive comprises an additive selected from the group consisting of DX1030, DX1060, 1157, 1157N, C1157-D, S-103A-6, S-106A-6, FS-157, C1183, DX1080, DX5011, DX5022, FS-818-66, FP-326, FS-226, FS-229, DX2200, FS-221, and combinations thereof.

In an embodiment, the method comprises: mixing the first foam solution and air through a nozzle fluidly connected to an outlet to form the first finished foam; delivering the first finished foam to a hazard; determining if the first finished foam extinguishes or suppresses the hazard; if not, designating a Class B hazard profile and selecting an amount of the fluorinated additive based on the Class B hazard profile; mixing the selected amount of the fluorinated additive, the base foam concentrate and dilution water in a foam proportioning system to form the fluorinated foam solution; and mixing the fluorinated foam solution and air through a nozzle to form the second finished foam.

In an embodiment, the first finished foam is a non-fluorinated finished foam.

In an embodiment, the fluorinated additive has about 1 wt. % to about 25 wt. % fluorine; and the second finished foam has about 0.0001 wt. % to about 0.5 wt. % fluorine.

In an embodiment, the fluorinated additive has about 5 to 20 wt. % fluorine; and the second finished foam has about 0.0005 wt. % to about 0.4 wt. % fluorine.

Yet another embodiment relates to a method of fighting a flammable liquid fire comprising: foaming a first foam solution to provide a first finished foam, where the first foam solution comprises a base foam concentrate and dilution water; delivering the first finished foam at or near the flammable liquid fire; modifying the first foam solution to include a selected amount of a fluorinated additive to provide a fluorinated foam solution; foaming the fluorinated foam solution to form a second finished foam; and delivering the second finished foam at or near the flammable liquid fire.

In an embodiment, the base foam concentrate is a non-fluorinated base foam concentrate.

In an embodiment, the dilution water comprises municipal water, brackish water and/or seawater.

Still yet another embodiment relates to a foam injection system comprising: a foam concentrate pump fluidly connected to a foam concentrate tank; a fluorinated additive pump fluidly connected to a fluorinated additive tank; a water pump fluidly connected to a water source; and a flow controller comprising one or more processors and computer-readable instructions that when executed by the one or more processors, cause the one or more processors to: determine a water flow rate outputted by the water pump; determine a foam concentrate flow rate outputted by the foam concentrate pump; identify a target ratio of water and foam concentrate; identify a target ratio of water and fluorinated additive; control the foam concentrate flow rate based on the water flow rate and the target ratio of water and foam concentrate; optionally identify a target ratio of water and fluorinated additive; and control the optional fluorinated additive flow rate based on the water flow rate and the target ratio of water and fluorinated additive.

Still another embodiment relates to a method of proportioning a finished foam, the method comprising: (a) proportioning and delivering a first finished foam to a hazard; (b) selecting an amount of a fluorinated additive; and (c) proportioning a foam solution with the selected amount of the fluorinated additive to form a fluorinated finished foam comprising the selected amount of the fluorinated additive.

In an embodiment, the method further comprises: (d) delivering the fluorinated finished foam to the hazard; (e) determining if the fluorinated finished foam extinguishes or suppresses the hazard; (f) if not, selecting an increased amount of the fluorinated additive based on the type of hazard; and (g) proportioning the increased amount of the fluorinated additive with the foam solution to form a third finished foam.

In an embodiment, step (c) comprises: (c-1) weighing a fluorinated additive container to obtain an initial weight or determining an initial pressure of the fluorinated additive container; (c-2) proportioning the base foam concentrate and water with the selected amount of the fluorinated additive to form the fluorinated foam solution; (c-3) weighing the fluorinated additive container to obtain a final weight or determining a final pressure of the fluorinated additive container; and (c-4) using the final weight and the initial weight or the initial pressure and the final pressure to determine a total amount of fluorinated additive.

In an embodiment, the proportioning steps are conducted in a foam proportioning system, which is a portable, mobile, or fixed foam proportioning system.

In an embodiment, the foam solution is a non-fluorinated foam solution stream.

In an embodiment, the hazard is a Class B hazard.

Still another embodiment relates to a method of forming a fire fighting foam comprising: (a) foaming a first foam solution stream to provide a first finished foam, wherein the first foam solution stream comprises a base foam concentrate and dilution water; (b) modifying the first foam solution stream to include a selected amount of a fluorinated additive to form a fluorinated foam solution stream; and (c) foaming the fluorinated foam solution stream to form a second finished foam.

In an embodiment, the fluorinated additive comprises an additive selected from the group consisting of an anionic fluoropolymer, a nonionic fluoropolymer, an anionic fluorosurfactant, a nonionic fluorosurfactant, a cationic fluorosurfactant, an amphoteric fluorosurfactant, and combinations of two or more thereof.

In an embodiment, the fluorinated additive comprises a $C_6$-fluorotelomer-based nonionic fluorosurfactant, an alkyl sodium sulfonate type anionic fluorosurfactant, a fluoroalkyl ammonium chloride type cationic fluorosurfactant, a fluorotelomer sulfonamide alkylbetaine fluorosurfactant or a combination thereof.

In an embodiment, the fluorinated additive comprises a poly-perfluoroalkylated polyacrylamide type fluorosurfactant and/or a $C_6$-short chain perfluoro-based fluoropolymer surfactant.

In an embodiment, the fluorinated additive has about 1 wt. % to about 25 wt. % fluorine; and the second finished foam has about 0.0001 wt. % to about 0.5 wt. % fluorine.

In an embodiment, the first finished foam is a non-fluorinated finished foam.

In an embodiment, the base foam concentrate is a non-fluorinated base foam concentrate.

In an embodiment, the base foam concentrate is a low performing fluorinated base foam concentrate.

In an embodiment, the method comprises: (a) foaming the first foam solution stream to provide the first finished foam comprises mixing the first foam solution stream with air through a nozzle fluidly connected to an outlet to form the first finished foam; (b) modifying the first foam solution stream to form the fluorinated foam solution stream comprises: designating a Class B hazard profile for a hazard and selecting an amount of the fluorinated additive based on the Class B hazard profile; and mixing the selected amount of the fluorinated additive with the first foam solution stream in a foam proportioning system to form the fluorinated foam solution stream; and (c) foaming the fluorinated foam solution stream to form a second finished foam comprises mixing the fluorinated foam solution stream and air through the nozzle to form the second finished foam.

In an embodiment, the method further comprises: (d) delivering the second finished foam to the hazard; (e) determining if the second finished foam extinguishes or suppresses the hazard; (f) if not, selecting an increased amount of the fluorinated additive based on the type of hazard; and (g) proportioning the increased amount of the fluorinated additive, the base foam concentrate and water in the foam proportioning system to form a third finished foam.

In an embodiment, the fluorinated additive has about 5 to 20 wt. % fluorine; and the second finished foam has about 0.0005 wt. % to about 0.4 wt. % fluorine.

In an embodiment, the first foam solution stream is a non-fluorinated foam solution stream.

In an embodiment, the hazard is a Class B hazard.

In an embodiment, the hazard comprises hydrocarbons and/or polar solvent.

The embodiments and examples set forth herein are presented to best explain the present compositions and methods and their practical application and to thereby enable those skilled in the art to make and utilize the compositions and methods described herein. However, those skilled in the art will recognize that the foregoing description and examples have been presented for the purpose of illustration and example only. The description as set forth is not intended to be exhaustive or to limit the compositions and methods to the precise form disclosed.

Definitions

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the application, including the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The term "free of," as used herein, is used to describe foam concentrates, foam solutions and/or finished foams containing less than about 0.1 wt. % of a component or compound class, for example, less than about 0.1 wt. % of a fluorine containing additive or any additive, which contains a perfluoroalkyl group.

The term "simultaneously" means occurring at the same time or about the same time, including concurrently.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the foam injection system is shown in the various exemplary embodiments is illustrative only. Additionally, any element disclosed in one embodiment may be incorporated or utilized with any other embodiment disclosed herein.

It should be understood that the terminology used herein is for the purpose of description only and should not be regarded as limiting. Accordingly, it is not intended that the scope of the application, including the appended claims appended hereto be limited to the examples and descriptions set forth herein but rather also include, but are not necessarily limited to, all features which would be treated as equivalents thereof by those skilled in the art.

INCORPORATION BY REFERENCE

All patents and patent applications, articles, reports, and other documents cited herein are incorporated by reference to the extent they are not inconsistent with the technology described in this application. To the extent that any meaning or definition of a term in this written document conflicts with any meaning or definition of the term in a document incorporated by reference, the meaning or definition assigned to the term in this written document shall govern.

What is claimed is:

1. A foam injection system, comprising:
- a first pump coupled with a foam supply;
- a second pump coupled with an additive supply;
- at least one of a water supply and a water pump that receives water from the water supply; and
- a flow controller comprising one or more processors and computer-readable instructions that when executed by the one or more processors, cause the one or more processors to:
  - determine a first flow rate of foam outputted by the first pump;
  - determine a second flow rate of water outputted by the at least one of the water supply and the water pump;
  - identify a first target ratio of water and foam;
  - control the first flow rate based on the second flow rate and the first target ratio; and
  - control a third flow rate of additive outputted by the second pump based on the second flow rate and a second target ratio of water and additive.

2. The foam injection system of claim 1, wherein:
the flow controller is to determine the first flow rate based on a foam pump speed of the first pump, a discharge pressure of the first pump, a displacement of the first pump, and a volumetric efficiency of the first pump.

3. The foam injection system of claim 1, wherein:
the flow controller is to determine the second flow rate based on a water pump speed of the water pump, a differential pressure of the water pump, and a shaft input power of the water pump.

4. The foam injection system of claim 1, comprising:
the first pump comprises at least one of a positive displacement pump and a manual override input.

5. The foam injection system of claim 1, comprising:
a mixing point that receives the water from the at least one of the water supply and the water pump and the foam from the first pump and outputs a foam solution.

6. The foam injection system of claim 1, comprising:
a mixing point that receives the water from the at least one of the water supply and the water pump and the foam from the first pump and outputs a foam solution; and
one or more pipes that provide a first flow of the water from the at least one of the water supply and the water pump to the mixing point and a second flow of the water from the at least one of the water supply and the water pump to a separate outlet from the mixing point.

7. The foam injection system of claim 1, wherein:
the first pump is to directly inject the foam into the water from the at least one of the water supply and the water pump.

8. The foam injection system of claim 1, wherein:
the additive supply is a fluorinated additive supply.

9. A method, comprising:
determining, by one or more processors, a first flow rate of foam outputted by a first pump;
determining, by the one or more processors, a second flow rate of water outputted by at least one of a water supply and a water pump that receives water from the water supply;
identifying, by the one or more processors, a first target ratio of water and foam;
controlling, by the one or more processors, the first flow rate based on the second flow rate and the first target ratio; and
controlling, by the one or more processors, a third flow rate of additive outputted by a second pump coupled with an additive supply based on the second flow rate and a second target ratio of water and additive.

10. The method of claim 9, comprising:
determining, by the one or more processors, the first flow rate based on a foam pump speed of the first pump, a discharge pressure of the first pump, a displacement of the first pump, and a volumetric efficiency of the first pump.

11. The method of claim 9, comprising:
determining, by the one or more processors, the second flow rate based on a water pump speed of the water pump, a differential pressure of the water pump, and a shaft input power of the water pump.

12. The method of claim 9, wherein:
the first pump comprises at least one of a positive displacement pump and a manual override input.

13. The method of claim 9, comprising:
receiving, by a mixing point, the water from the at least one of the water supply and the water pump and the foam from the first pump; and
outputting, via the mixing point, a foam solution.

14. The method of claim 9, comprising:
receiving, by a mixing point, the water from the at least one of the water supply and the water pump and the foam from the first pump; and
providing, via one or more pipes, a first flow of the water from the at least one of the water supply and the water pump to the mixing point and a second flow of the water from the at least one of the water supply and the water pump to a separate outlet from the mixing point.

15. The method of claim 9, comprising:
directly injecting, by the first pump, the foam into the water from the at least one of the water supply and the water pump.

* * * * *